(12) United States Patent
Sasaki

(10) Patent No.: US 7,804,980 B2
(45) Date of Patent: Sep. 28, 2010

(54) ENVIRONMENT RECOGNITION DEVICE

(75) Inventor: Mikio Sasaki, Kariya (JP)

(73) Assignee: DENSO Corporation, Kariya (JP)

( * ) Notice: Subject to any disclaimer, the term of this patent is extended or adjusted under 35 U.S.C. 154(b) by 1084 days.

(21) Appl. No.: 11/502,485

(22) Filed: Aug. 10, 2006

(65) Prior Publication Data

US 2007/0047809 A1    Mar. 1, 2007

(30) Foreign Application Priority Data

Aug. 24, 2005  (JP) .............................. 2005-242931
Sep. 9, 2005   (JP) .............................. 2005-262306

(51) Int. Cl.
```
G06K 9/00    (2006.01)
G06K 9/62    (2006.01)
G06K 9/64    (2006.01)
G06K 9/68    (2006.01)
G06K 9/74    (2006.01)
G08G 1/16    (2006.01)
G08G 1/09    (2006.01)
B60Q 1/00    (2006.01)
```
(52) U.S. Cl. .................. 382/103; 382/104; 382/106; 382/107; 382/168; 382/170; 382/209; 382/217; 382/220; 382/228; 340/903; 340/905; 340/435

(58) Field of Classification Search ................ 382/103, 382/104, 106, 107, 168, 170, 209, 217, 220, 382/228; 340/905, 435, 903; 701/117
See application file for complete search history.

(56) References Cited

U.S. PATENT DOCUMENTS

| | | | | |
|---|---|---|---|---|
| 5,404,306 A | * | 4/1995 | Mathur et al. ............ | 701/117 |
| 5,535,314 A | * | 7/1996 | Alves et al. .............. | 382/165 |
| 5,687,249 A | * | 11/1997 | Kato ....................... | 382/104 |
| 5,706,355 A | * | 1/1998 | Raboisson et al. ........ | 382/104 |
| 5,742,699 A | * | 4/1998 | Adkins et al. ............ | 382/107 |
| 5,796,094 A | * | 8/1998 | Schofield et al. ......... | 250/208.1 |

(Continued)

FOREIGN PATENT DOCUMENTS

JP    03-174658    7/1991

(Continued)

OTHER PUBLICATIONS

Liu, et al. "Neural Network Based Online Feature Selection for Vehicle Tracking." LNCS—Advances in Neural Networks—ISNN 2005. 3497/2005. (2005): 226-231. Print.*

(Continued)

*Primary Examiner*—Matthew C Bella
*Assistant Examiner*—Michael A Newman
(74) *Attorney, Agent, or Firm*—Harness, Dickey & Pierce, PLC

(57) ABSTRACT

A color information creating part calculates the average color of captured image data in units of macro blocks, and determines to which color index the average color of each macro block corresponds. Color arrangement information formed by associating color information with the macro blocks is stored in a color index memory. A histogram creating part creates color histograms representative of the distribution of macro blocks added with color information corresponding to aimed color indexes. Based on the color arrangement information and the color histograms, a color application execution part recognizes objects, surroundings, or the situation of a driver's own vehicle without performing area splitting (shape acquisition) of an image.

32 Claims, 39 Drawing Sheets

U.S. PATENT DOCUMENTS

| | | | | |
|---|---|---|---|---|
| 5,805,727 | A * | 9/1998 | Nakano | 382/195 |
| 5,949,331 | A * | 9/1999 | Schofield et al. | 340/461 |
| 6,285,393 | B1 * | 9/2001 | Shimoura et al. | 348/119 |
| 6,317,691 | B1 * | 11/2001 | Narayan et al. | 701/301 |
| 6,553,130 | B1 * | 4/2003 | Lemelson et al. | 382/104 |
| 6,559,435 | B2 * | 5/2003 | Schofield et al. | 250/208.1 |
| 6,636,258 | B2 * | 10/2003 | Strumolo | 348/149 |
| 6,704,621 | B1 * | 3/2004 | Stein et al. | 701/1 |
| 6,754,369 | B1 * | 6/2004 | Sazawa | 382/105 |
| 6,822,563 | B2 * | 11/2004 | Bos et al. | 340/461 |
| 6,832,261 | B1 * | 12/2004 | Westbrook et al. | 709/236 |
| 6,882,287 | B2 * | 4/2005 | Schofield | 340/903 |
| 7,227,459 | B2 * | 6/2007 | Bos et al. | 340/461 |
| 7,365,769 | B1 * | 4/2008 | Mager | 348/113 |
| 7,471,832 | B2 * | 12/2008 | Luo et al. | 382/224 |
| 7,486,802 | B2 * | 2/2009 | Hougen | 382/104 |
| 7,526,103 | B2 * | 4/2009 | Schofield et al. | 382/104 |
| 2002/0034330 | A1 | 3/2002 | Lennon et al. | |
| 2004/0022440 | A1 | 2/2004 | Akahori | |
| 2004/0057599 | A1 * | 3/2004 | Okada et al. | 382/103 |

FOREIGN PATENT DOCUMENTS

| | | |
|---|---|---|
| JP | 06-348991 | 12/1994 |
| JP | 08-114416 | 5/1996 |
| JP | 10-027252 | 1/1998 |
| JP | 11-213165 | 8/1999 |
| JP | 2002-334330 | 11/2002 |
| JP | 2004-078939 | 3/2004 |

OTHER PUBLICATIONS

Perez, et al. "Color-Based Probabilistic Tracking." LNCS—Proceedings of the 7th European Conference on Computer Vision-Part I . 2350. (2002): 661-675. Print.*

Jacquot, et al. "Adaptive tracking of non rigid objects based color histograms and automatic parameter selection." Proceedings of the IEEE Workshop on Motion and Video Computing. 1. (2005): 99-110. Print.*

Song, et al. "Front Vehicle Tracking using Scene Analysis." Proceedings of the IEEE International Conference on Mechatronics & Automation. 1. (2005): 1323-1328. Print.*

Cabani, et al. "Color-based Detection of Vehicle lights." Intelligent Vehicles Symposium. (2005): 278-283. Print.*

Office action dated Jun. 1, 2010 in corresponding Japanese Application No. 2005-262306.

* cited by examiner

START (TEMPLATE CREATION)
→ READ COLOR INFORMATION ARRANGEMENT — S410
→ CREATE BINARY ARRANGEMENT Bshot(k,m,n) — S420
→ CREATE ADDITION VALUE ARRANGEMENT Bw(i,m,n) — S430
→ NORMALIZE AND BINARIZE Bw(i,m,n) — S440
→ STORE AS TEMPLATE Bw(i,m,n) — S450
→ END

SHOT SCREEN $B_{max}(k, m, n)$

WIPER TEMPLATES : Bw(i,m,n)

SELECT TEMPLATE OF MAXIMUM EVALUATION VALUE BY MATCHING OPERATION

THREE-DIMENSIONAL POSITION (x, y, z) OF OBJECT PROJECTED TO THIS POINT IS EXPRESSED IN UNITS OF m

FIG. 20C

```
***************Horizontal (X)****************
***************Horizontal (X)****************
  1   3   3   5   5   6   6   7   7   7   8   9   9  10  10  11  11  13  13  13  15  14
  1   2   3   4   5   5   6   6   7   7   8   9   9  10  10  11  12  13  13  14  15  17
  1   2   3   4   5   5   6   6   7   7   8   9   9  10  10  11  12  13  13  14  15  18
  1   2   3   4   5   5   6   6   7   7   8   9   9  10  11  11  12  13  15  14  15  17
  1   2   2   2   3   5   5   6   7   7   8   9  10  10  11  13  14  14  15  16  17  18
  1   2   1   2   3   3   5   6   7   7   8   9  10  11  13  13  14  15  17  17  18  18
  1   2   2   1   2   3   5   6   7   7   8   9  10  11  13  14  15  17  18  18  19  18
  1   1   2   2   2   2   3   5   6   7   8   9  10  13  14  15  17  18  18  18  18  18
  1   2   1   2   2   2   2   5   6   7   8  10  11  13  14  17  18  18  18  18  18  18
  1   1   2   2   1   2   2   3   5   7   8  10  13  14  17  18  18  18  19  18  18  18
  1   2   2   2   2   2   2   2   3   6   8  11  14  17  18  18  18  18  18  18  18  18
  2   2   2   1   2   2   2   2   2   3   8  13  18  18  18  18  18  18  18  18  19  20
  1   2   2   2   2   2   2   2   2   3   8  13  18  18  18  18  18  18  18  18  18  18
  0   1   2   2   2   2   2   3   6   7   8  10  11  14  15  17  18  18  18  18  18  18
  1   3   3   5   5   6   6   7   7   7   8   9   9  10  10  11  11  13  15  13  15  14
***************Vertical  (Y) ****************
***************Vertical  (Y) ****************
  7   7   9   7   9   7   9   7   9   9   7   9   7   9   7   9   7   9   9   7   9   7
  8   8   8   8   8   8   8   8   8   8   8   8   8   8   8   8   8   8   8   8   8   8
  6   7   7   7   7   7   7   7   7   7   7   7   7   7   7   7   7   7   7   7   7   6
  7   7   7   7   7   8   7   8   7   7   7   7   7   7   8   7   7   7   8   7   7   7
  6   6   7   8   7   7   8   7   7   7   7   7   8   7   7   7   8   7   7   7   7   6
  5   5   7   7   7   8   7   7   7   7   7   7   7   8   7   7   7   7   7   7   7   5
  5   5   6   7   7   7   7   7   7   8   7   7   7   7   7   7   7   7   7   7   7   5
  4   5   5   6   6   7   7   7   7   7   7   7   7   7   7   7   7   6   6   6   6   4
  4   4   5   5   5   6   7   7   7   7   7   7   7   7   7   7   7   6   5   5   5   4
  3   4   4   4   5   5   5   7   7   7   7   7   7   7   6   5   5   5   4   4   3
  3   3   3   3   4   4   4   5   7   7   7   7   7   7   5   4   4   4   3   3   3
  2   2   2   3   3   3   3   3   4   7   7   7   4   3   3   3   3   3   3   3   3
  2   2   2   2   2   2   2   2   1   0   0   0   1   1   2   2   2   2   2   2   2   2
  1   1   1   1   1   1   1   0   0   0   0   0   0   0   0   1   1   1   1   1   1   1
 -1  -1  -1  -1  -1  -1  -1  -1  -1  -1  -1  -1  -1  -1  -1  -1  -1  -1  -1  -1  -1  -1
***************Depth     (Z) ****************
***************Depth     (Z) ****************
 -11 200 200 200 200 200 200 200 200 200 200 200 200 200 200 200 200 200 200 200 200 -11
 -10 -10 200 200 200 200 200 200 200 200 200 200 200 200 200 200 200 200 200 200 200 -10
 -11 -10 200 200 200 200 200 200 200 200 200 200 200 200 200 200 200 200 200 200 200 -11
 -10 -10  -9 200 200 200 200 200 200 200 200 200 200 200 200 200 200 200 200 200 200 -10
 -10 -10  -9  -8 200 200 200 200 200 200 200 200 200 200 200 200 200 200 200 200 -8 -10
 -11 -10  -8  -8  -7 200 200 200 200 200 200 200 200 200 200 200 200 -7 200 -8 -11
 -10 -10  -9  -7  -7  -6 200 200 200 200 200 200 200 200 200 200 -6 -7 200 -7 -10
 -11  -9  -9  -8  -7  -6  -4 200 200 200 200 200 200 200 -3 -4 -6 -7 200 -8 -11
 -10 -10  -8  -8  -7  -6  -4   0 200 200 200 200 200   0 -3 -4 -6 -7 200 -8 -10
 -11  -9  -9  -8  -6  -6  -4   0 200 200 200 200   4   0 -3 -4 -6 -6 200 -8 -11
 -10 -10  -9  -8  -7  -6  -4   0   8 200 200  21  13   4   0 -3 -4 -6 -7 200 -8 -10
 -11 -10  -9  -7  -7  -6  -4   0   8  38  88  21  13   4   0 -3 -4 -6 -7 200 -7 200
 -11 -10  -9  -8  -7  -6  -4   0   8  21  21  21  13   4   0 -3 -4 -6 -7 200 -8 -11
  -9  -9  -9  -8  -7  -6  -4  -3  -3  -3  -3  -3  -3  -3  -3  -3 -4 -6 -7 200 -8 -9
 -11 -11 -10 -11 -10 -11 -10 -11 -10  -6 -11 -10 -11 -10 -11 -10 -11 -10 -9 -11 -10 -11
```

DISTANCE INFORMATION ESTIMATED
FROM ROAD STRUCTURE MODEL

```
***************Depth    (Z)****************
***************Depth    (Z)****************
 -11  200  200  200  200  200  200  200  200  200  200  200  200  200  200  200  200  200  200  200 -11
 -10  -10  200  200  200  200  200  200  200  200  200  200  200  200  200  200  200  200  200  200 -10
 -11  -10  200  200  200  200  200  200  200  200  200  200  200  200  200  200  200  200  200  200 -11
 -10  -10   -9  200  200  200  200  200  200  200  200  200  200  200  200  200  200  200  200  200 -10
 -10  -10   -9   -8  200  200  200  200  200  200  200  200  200  200  200  200  200  200  200   -8 -10
 -11  -10   -8   -8   -7  200  200  200  200  200  200  200  200  200  200  200  200   -7  200   -8 -11
 -10  -10   -9   -7   -7   -6  200  200  200  200  200  200  200  200  200  200   -6   -7  200   -7 -10
 -11   -9   -9   -8   -7   -6   -4  200  200  200  200  200  200  200   -3   -4   -6   -7  200   -8 -11
 -10  -10   -8   -8   -7   -6   -4    0  200  200  200  200  200  200    0   -3   -4   -6   -7  200   -8 -10
 -11   -9   -9   -8   -6   -6   -4    0  200  200  200  200  200    4    0   -3   -4   -6   -6  200   -8 -11
 -10  -10   -9   -8   -7   -6   -4    0    8  200  200   21   13    4    0   -3   -4   -6   -7  200   -8 -10
 -11  -10   -9   -7   -7   -6   -4    0    8   38   88   21   13    4    0   -3   -4   -6   -7  200   -7  200
 -11  -10   -9   -8   -7   -6   -4    0    8   21   21   21   13    4    0   -3   -4   -6   -7  200   -8 -11
  -9   -9   -9   -8   -7   -6   -4   -3   -3   -3   -3   -3   -3   -3   -3   -4   -6   -7  200   -8   -9
 -11  -11  -10  -11  -10  -11  -10  -11  -10   -6  -11  -10  -11  -10  -11  -10  -11  -10   -9  -11  -10 -11
```

CORRECTED

```
***************Depth    (Z)****************
***************Depth    (Z)****************
 -11  -10   -9   -8   -7   -6   -4    0    8  200  200  200  200  200  200  200  200  200  200  200 -11
 -11  -10   -9   -8   -7   -6   -4    0    8  200  200  200  200         200  200   200  200  200 -10
 -11  -10   -9   -8   -7   -6   -4    0    8  200  200  200   13    4    0   -3   -4  200  200  200 -11
 -10  -10   -9   -8   -7   -6   -4    0    8  200  200    0   13    4    0   -3  200   -6   -7   -8 -10
 -10  -10   -9   -8   -7  200  200    0    8  200  200   21   13    4    0   -3   -4   -6   -7   -8 -10
 -11  -10   -8   -8   -7  200  200    0  200  200  200  200  200    4  200  200   -4   -6   -7   -9 -11
 -10  -10   -9   -7   -7   -6  200  200  200  200  200  200  200  200  200  200   -6   -7   -7   -8 -10
  -9   -9   -9   -8   -7   -6   -4    0  200  200  200  200  200  200   -3   -4   -6   -7   -7   -9 -11
 -10  -10   -9   -8   -7   -6   -4    0  200  200  200  200    0   -3   -4   -6   -7   -7   -8 -10
 -11   -9   -9   -8   -6   -6   -4    0  200  200  200  200                -4   -6   -6   -7   -9 -11
 -10  -10   -9   -8   -7   -6   -4    0    8  200  200   21   13    4    0   -3   -4   -6   -7   -8 -10
 -11  -10   -9   -7   -7   -6   -4    0    8   38   88   21   13    4    0   -3   -4   -6   -7   -7   -9 -11
 -11  -10   -9'  -8   -7   -6   -4    0    8   21   21   21   13    4    0   -3   -4   -6   -7   -7   -9 -11
 -11   -9   -9   -8   -7   -6   -4   -3   -3   -3   -3   -3   -3   -3   -3   -4   -6   -7   -7   -8   -9
 -11  -11  -10  -11  -10  -11  -10  -11  -10   -6  -11  -10  -11  -10  -11  -10  -11  -10  -10  -10 -11
```

```
-11 200 200 200 200 200 200 200 200 200 200 200 200 200 200 200 200 200 200 -11
-11 200  -8 200 200 200 200 200 200 200 200 200 200 200 200 200 200 200 200 -10 -10
-11  -7  -8  -7 200 200 200 200 200 200 200 200 200 200 200 200 200 200 200  -9 -10 -11
 -8  -7  -6  -7 200 200 200 200 200 200 200 200 200 200 200 200 200 200 200  -8  -9 -10 -11
-11  -7  -8  -7 200 200 200 200 200  -9  -9 -10 -10 200 200 200  -8  -7  -7  -8  -9 -11
-11  -7  -8  -7  -5  -4 200 200  -8  -9  -9 -10 -10  -9 200 -10  -6  -7  -8  -9 -10 -11
-10  -7  -6  -7  -5  -4 200  -9  -8 200  -9 -10 -10  -9 -10  -5  -6  -7  -8  -8  -9 -11
-11  -7  -8  -7  -5  -4   0  -9  -8 200  -9 -10 -10  -9  -3  -5  -6  -7  -8  -9 -10 -11
-10  -7  -8  -6  -5  -4   0  -9  -8  -9  -9 -10 -10   0  -3  -5  -6  -7  -7  -8  -9 -10
 -9  -7  -6  -7  -5  -4   0   8  -8  -9  -9 -10   4   0  -3  -5  -6  -7  -8  -9 -10 -11
-11  -7  -8  -7  -5  -4   0   8  21  -9  -9  13   4   0  -3  -5  -6  -7  -8  -8  -9 -10
 -9  -7  -8  -7  -5  -4   0   8  21  -9  38  13   4   0  -3  -5  -6  -7  -8  -9 -10 -11
 -9  -7  -9  -8  -9  -8  -9  -9  -8  -9  -9 -10 -10  -9 -10 -10  -8 -10 -10 -10 -10 -10
-11 -11  -6 -10 -11 -10  -6 -11  -7 -11  -7 -11  -7 -11  -7 -11  -7 -11  -9 -10 -10 -11
-11 -11  -9 -10 -11 -10  -9 -11  -8 -11  -9 -11 -10 -11 -10 -11  -8 -11 -10 -10 -10 -11
```

REAR PART OF PRECEDING VEHICLE

| EVENT | USER | SCENE CONDITION | | | IMAGE CHARACTERISTICS | | | OBSERVATION VARIABLE |
| --- | --- | --- | --- | --- | --- | --- | --- | --- |
| | | TIME | WEATHER | PLACE | COLOR | MOTION | POSITION | OBJECT |
| | | | | | | | | CERTAINTY VECTOR |
| 1 | USER 1 | 000010000 | 0..01..00 | 0..1..0 | ... | ... | ... | 0 100 0 0 0...0 |
| 2 | ... | ... | ... | ... | ... | ... | ... | ... |
| | USER N | 000000100 | 0..0..010 | ... | ... | ... | ... | 60 0 0 0...0 |

EXPLANATORY VARIABLE: S

OBSERVATION VARIABLE: Y

① SET TO 100 WHEN ACQUIRED BY DETERMINATION HISTORY OF RECORD IMAGE

② SAME AS STATISTICAL ESTIMATION WHEN ACQUIRED BY EXTERNAL DATA

FIG. 30

| RECOGNITION OBJECT | | RECOGNITION RESULT | | IMAGE CHARACTERISTICS | | | | | | | | | CONDITION | | | | | | | SCENE STRUCTURE | | | | CAMERA |
|---|---|---|---|---|---|---|---|---|---|---|---|---|---|---|---|---|---|---|---|---|---|---|---|---|
| FRAME NO. | MBK NO. | OBJECT INDEX | COLOR INDEX | COLOR INFO. | | | 2D | | MOTION | | SHAPE | SIZE | WEATHER | | | | TIME ZONE | | | 3D | | | | POSITION |
| | | | | Y | U | V | HOR p | VER q | vp | vq | | MBK | FINE | CLOUD | RAIN | M | D | E | N | X HOR | Y VER | Z DEP |  |
| 0 | 10 | BLUE SKY | BLUE | 252 | 137 | 117 | 10 | 1 | | | | | 1 | 0 | 0 | 1 | 0 | 0 | 0 | | | | |
| 0 | 179 | SIGN-BOARD | ORANGE | 98 | 122 | 136 | 3 | 9 | | | | | 1 | 0 | 0 | 1 | 0 | 0 | 0 | | | | |
| 0 | 237 | MEDIAN | ORANGE | 148 | 126 | 130 | 17 | 11 | | | | | 1 | 0 | 0 | 1 | 0 | 0 | 0 | | | | |
| 0 | 234 | ROAD | GRAY | 142 | 132 | 124 | 14 | 11 | | | | | 1 | 0 | 0 | 1 | 0 | 0 | 0 | | | | |
| 0 | 89 | FLAG | YELLOW | 120 | 118 | 122 | 1 | 5 | | | | | 1 | 0 | 0 | 1 | 0 | 0 | 0 | | | | |
| 14 | 74 | POWER POST | GRAY | 200 | 134 | 121 | 8 | 4 | | | | | 1 | 0 | 0 | 1 | 0 | 0 | 0 | | | | |

FIG. 32B

```
<Picture>
<Frame Number> 0</Frame Number>
<Part In Sight type="obc:Dynamic Type>
<Car>
  <Class> Preceding vehicle </Class>
  <Color> White </Color>
  <State> Stop light on </State>
</Car>
</Part In Sight>
<Part In Sight type="obc:Quasi Static Type>
<Car>
  <Direction> Left </Direction>
  <Class> Parking vehicle </Class>
</Car>
</Part In Sight>
<Part In Sight type="obc:Static Type>
<Object>
  <Direction> Left </Direction>
  <Color> Red </Color>
  <Class> Building? </Class>
</Object>
<Object>
  <Direction> Right </Direction>
  <Class> Green area </Class>
</Object>
</Part In Sight>
</Picture>
```

FIG. 32A

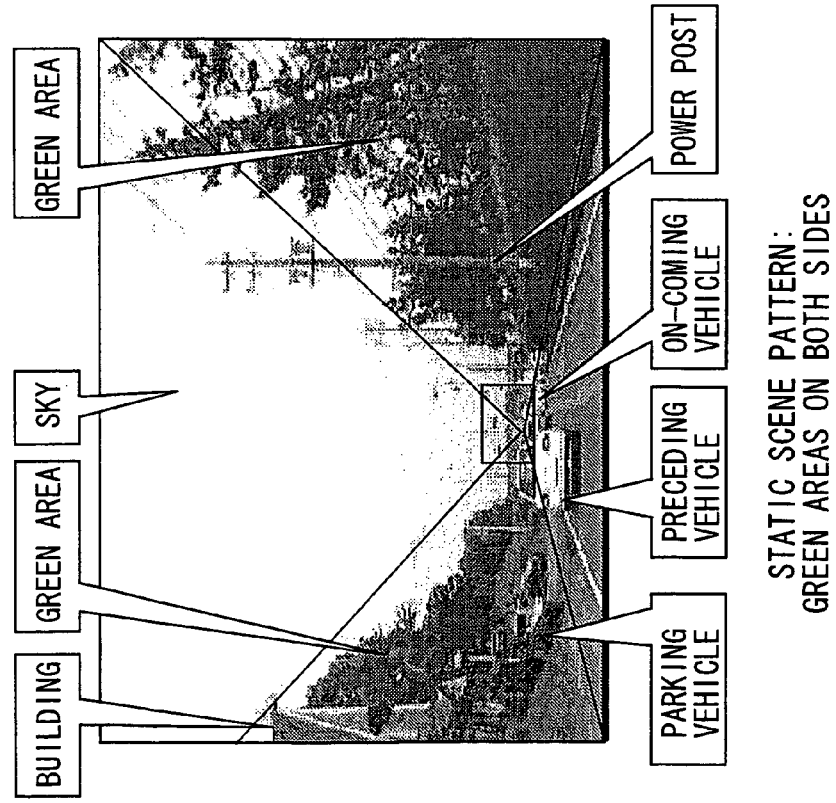

STATIC SCENE PATTERN:
GREEN AREAS ON BOTH SIDES

FIG. 37A

```
<Scene>
 <Picture>
  <Frame Number>   0 </Frame Number>
  <SIDX> 1 0 0 0 0 0 0 0 0 0 0 0 0 35 0 </SIDX>
  <Part In Sight>
   <Car>
    <Class> Preceding vehicle </Class>
    <State> Stop light on </State>
   </Car>
   <Object>
    <Direction> Right </Direction >
    <Color> Red </Color>
    <Class> Building? </Class>
   </Object>
  </Part In Sight>
 </Picture>
 <Picture>
       ::::::::::::::  OMITTED  ::::::::::::::::
  <Frame Number>  224 </Frame Number>
  <SIDX> 0 0 0 0 0 0 0 0 0 0 0 0 0 35 45 </SIDX>
  <Caution> Caution point </Caution>
  <Part In Sight>
   <Car>
    <Class> Preceding vehicle </Class>
   </Car>
   <Object>
    <Direction> Left </Direction >
    <Color> Red </Color>
    <Class> Building? </Class>
   </Object>
   <Object>
    <Direction> Left </Direction >
    <Color> Green </Color>
    <Class> Something(small) </Class>
   </Object>
  </Part In Sight>
 </Picture>
       :::::::::::::::  OMITTED  :::::::::::::::
```

FIG. 37B
```
<Target Class> Building? </Target Class>
<Target Color> Green color </Target Color>
<Target Caution> Point caution </Target Caution>
```
FIG. 37C
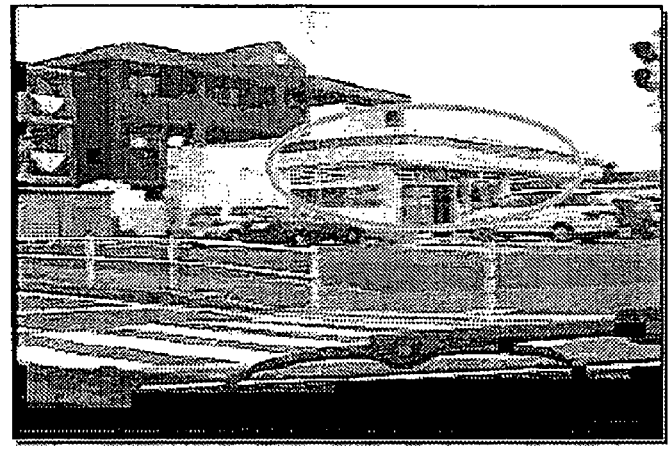
FIG. 37D
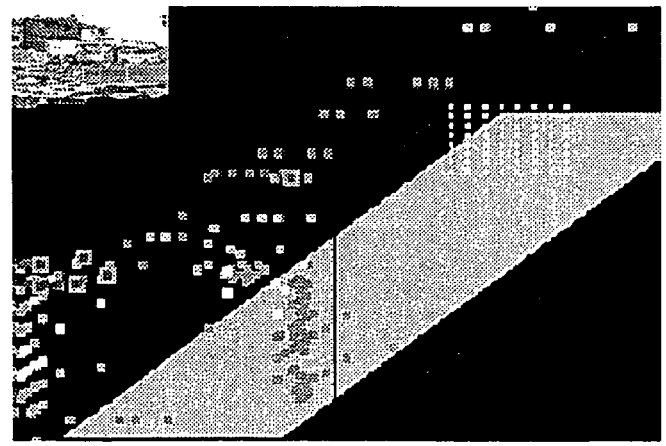

US 7,804,980 B2

ENVIRONMENT RECOGNITION DEVICE

CROSS REFERENCE TO RELATED APPLICATION

This application is based on and incorporates herein by reference Japanese Patent Applications No. 2005-242931 filed on Aug. 24, 2005 and No. 2005-262306 filed on Sep. 9, 2005.

FIELD OF THE INVENTION

The present invention relates to an environment recognition device for recognizing the environment in front of a vehicle on the basis of color images in front of the vehicle imaged by an on-board camera.

BACKGROUND OF THE INVENTION

Conventional environment recognition devices recognize objects such as a traveling lane of a subject vehicle, preceding vehicles on the traveling lane, and traffic signs on the basis of color images (monocular images) in front of the vehicle, imaged by an on-board camera of the subject vehicle (JP-6-348991A).

These devices split a three-dimensional space (luminance, brightness, saturation) representing colors into plural areas, and with the central value of each of the split areas as a color index, classify the colors of individual pixels constituting a color image by the color indexes. The devices perform area splitting processing that splits the image into areas by the classified colors, and perform knowledge processing that determines whether the positions and shapes of the areas obtained as a result of the area splitting processing match knowledge on objects provided in advance, thereby recognizing objects.

Another conventional method for identifying objects from a result of area splitting is a pattern matching.

However, when objects having the same color overlap one another in a color image, correct area splitting (shape acquisition) cannot be performed by the area splitting using image data. Thus, it is impossible to correctly determine to which object a particular area belongs by knowledge processing based on area shapes and pattern matching.

Since the area splitting processing is performed on a pixel basis, processing load on a computer is large, and particularly a method of identifying objects by pattern matching would cause enormous processing load.

Recently, to ease the searching for recorded images and the provision of information, there is a demand to extract objects contained in an image and store descriptions about the extracted objects in association with the image. To meet the demand, it is required to recognize the objects contained in the image with reduced computer processing amount.

The above device extracts a single object as a recognition result. Therefore, if plural methods of recognizing objects are used to increase recognition accuracy, it can be determined whether recognition results agree among the recognition methods. The recognition methods however have no synergistic effect to increase recognition accuracy. Therefore, when recognition results differ among the recognition methods, it is difficult to determine which recognition result is to be adopted.

SUMMARY OF THE INVENTION

It is therefore a first objective of the present invention to provide an environment recognition device that can perform environment recognition based on color images in front of a vehicle imaged by an on-board camera simply and with reduced computer processing amount.

It is a second objective of the present invention to provide an environment recognition device that combines plural recognition methods for higher accuracy.

For achieving the first objective, according to a first aspect, an object specifying unit specifies an object to be recognized. An image data acquiring unit acquires image data from a color image in front of a vehicle, imaged by an on-board camera. Based on the acquired image data, an average color calculating unit calculates the average color of a given pixel block for each of pixel blocks produced by splitting the color image by a preset size.

A color information adding unit determines to which of color indexes provided in advance the average color calculated by the average color calculating unit belongs, and stores the determination result in association with the pixel block as color information.

A color histogram creating unit accumulates along one direction on the color image the number of the pixel blocks that aimed color indexes match the color information associated by the color information adding unit, and creates a color histogram formed by one-dimensionally arranging the accumulated values, for each of the color indexes and in time series in units of frames of the image data.

An object information adding unit creates information about a target object specified by the object specifying unit on the basis of the color histograms created by the color histogram creating unit, and stores the created information as object information in association with the image data acquired by the image data acquiring unit.

A color histogram indicates the distribution of the number of pixel blocks added with color information corresponding to an aimed color index, with respect to a direction crossing an accumulation direction. Accordingly, when a conspicuous characteristic exists in the color of the target object and the disposition along the crossing direction, from the color histogram, information about the existence of the target object and information about the target object (object information) can be obtained.

Color information is added not in units of pixels but in units of pixel blocks. Yet, using a color histogram with the pixel blocks accumulated, a target object is recognized without performing area splitting (shape acquisition).

Accordingly, in comparison with conventional devices that add color information in units of pixels and perform area splitting, computer processing load can be significantly reduced, and objects can be easily recognized in a color image.

Particularly, in limited applications such as an on-board camera, since objects existing in an image color image are limited, the objects can be recognized from the distribution of color information without having to identify the shapes of the objects.

Preferably, the direction in which the color histogram creating unit accumulates the number of pixel blocks is a vertical direction in a color image, that is, each element of a color histogram is associated with a position in a horizontal direction orthogonal to a vertical direction.

In this case, the color histogram represents a distribution along the horizontal direction, that is, the lateral direction of the vehicle.

FIG. 39 is a three-dimensional graph (time space distribution) showing a time-series arrangement of histograms acquired noting a red color index during night traveling. The abscissa axis in the figure indicates time, the ordinate axis indicates the number of pixel blocks, and a depth axis indicates positions in a horizontal direction in a color image, with the forward side showing the right side in the view from a driver in a subject vehicle, and the backward side showing the left side in the view from the driver.

Peaks P1, P2, and P4 appearing in the right side of the figure (the forward side in the figure) occur due to street lights disposed in a median strip. Peaks appearing from the center of the screen to the left occur due to signals disposed in intersections. Particularly, peaks P3 and P5 observed for a long time of 10 seconds or more occur due to the event that the vehicle stops at intersections.

By thus taking time-series changes of a color histogram into account, not only objects but also vehicle movements and states such as passage through a street light and stop in an intersection can be recognized.

The direction in which the number of pixel blocks is accumulated is not limited to a vertical direction in a color image but may be a horizontal direction or an intermediate direction of the both. When the number of pixel blocks is accumulated in a horizontal direction, since horizontal edges in a color image can be detected, the vehicle can be recognized based on the horizontal edges.

According to a second aspect of the present invention, an object specifying unit specifies a target object to be recognized; an image data acquiring unit acquires image data based on a color image in front of a vehicle imaged by an on-board camera; and an average color calculating unit calculates the average color of each of pixel blocks produced by splitting the color image by a preset size, based on the acquired image data.

A color information adding unit determines to which of color indexes provided in advance an average color calculated by the average color calculating unit belongs, and stores the determination result in association with the pixel block as color information.

Based on color information associated with each of the pixel blocks by the color information adding unit, an object information adding unit creates information about a target object specified in the object specifying unit and stores the created information as object information in association with image data acquired by the image data acquiring unit.

In this case, since the object information is created based on the color information of the pixel block, in comparison with the case where object information is created based on a color histogram, although the amount of information to be processed increases, position information about an accumulation direction which cannot be acquired from the color histogram can be obtained.

Thus, since more detailed information can be obtained than by use of a color histogram, the accuracy of recognizing objects can be increased. Specifically, recognition based on a color histogram and recognition based on color information are used in combination, and by applying the method based on color information to only objects difficult to recognize by the method based on a histogram, both reduction in computer processing load and improvement in recognition accuracy can be achieved.

According to a third aspect of the present invention, an image data acquiring unit acquires image data from a color image in front of a vehicle, imaged by an on-board camera. Based on the acquired image data, an average color calculating unit calculates the average color of a given pixel block for each of pixel blocks produced by splitting the color image by a preset size.

A color information adding unit determines to which of color indexes provided in advance the average color calculated by the average color calculating unit belongs, and stores the determination result in association with the pixel block as color information.

A color histogram creating unit accumulates along one direction on the color image the number of pixel blocks that an aimed color index matches the color information associated by the color information adding unit, and creates color histograms formed by one-dimensionally arranging the accumulated values, for each color index and in time series in units of frames of the image data.

A first difference calculating unit calculates inter-frame differences of the color histograms created by the color histogram creating unit for each color index, and a first caution calling situation detecting unit detects a situation needing caution appearing on the color screen, based on the calculation result by the first difference calculating unit.

According to the environment recognition device thus constructed, since a caution calling situation is detected from changes of the color histograms without having to recognize objects, computer processing load is small and a situation needing caution can be quickly detected.

Specifically, when the direction of a vehicle changes suddenly, or when something jumps in front of the vehicle, since an inter-frame difference of the histograms becomes a large value, such situations can be detected as caution calling situations.

According to a fourth aspect of the present invention, an image data acquiring unit acquires image data from a color image in front of a vehicle, imaged by an on-board camera. Based on the acquired image data, an average color calculating unit calculates the average color of a given pixel block for each of pixel blocks produced by splitting the color image by a preset size.

A color information adding unit determines to which of color indexes provided in advance the average color calculated by the average color calculating unit belongs, and stores the determination result in association with the pixel block as color information.

A full screen accumulated value creating unit accumulates throughout the color image the number of pixel blocks that an aimed color index matches the color information associated by the color information adding unit, and creates time-series full screen accumulated values produced by the accumulated values, in units of frames of the image data.

A second difference calculating unit calculates inter-frame differences of the full screen accumulated values created by the full screen accumulated value creating unit, and a second caution calling situation detecting unit detects a situation needing caution appearing on the color screen, based on the calculation result by the second difference calculating unit.

According to a fifth aspect of the present invention, an image data acquiring unit acquires image data from a color image in front of a vehicle, imaged by an on-board camera. Based on the acquired image data, an average color calculating unit calculates the average color of a given pixel block for each of pixel blocks produced by splitting the color image by a preset size.

A color information adding unit determines to which of color indexes provided in advance the average color calculated by the average color calculating unit belongs, and stores the determination result in association with the pixel block as color information.

A danger level calculating unit accumulates inter-frame differences of the average colors of pixel blocks calculated by the average color calculating unit for all pixel blocks belonging to a monitoring area being one area in the color image specified in advance, and calculates the accumulated value as a danger level of the monitoring area.

According to the environment recognition device thus constructed, a larger motion (screen change) within a monitoring area, if any, will be calculated with a higher danger level. The calculated danger level can be used to activate processing for calling driver's attention.

As a monitoring area, an area into which vehicles and persons may jump may be set.

For achieving the second objective, according to a sixth aspect, an image data acquiring unit acquires image data based on a color image imaged by a camera mounted in a mobile unit, and based on the acquired image data, an average color calculating unit, for each of pixel blocks produced by splitting the color image by a preset size, calculates the average color of the pixel block.

A color information adding unit determines to which of color indexes provided in advance the average color calculated in the average color calculating unit belongs, and stores the determination result in association with the pixel block as color information.

With matters and attributes to be extracted from the color image as objects, based on the color information stored in the color information adding unit, a certainty degree calculating unit calculates the certainty degree that an aimed pixel block constitutes an aimed object, for each of the pixel blocks and for each of the objects. Based on the calculation result, an object determining unit determines an object to be associated with the pixel block.

In this way, objects being recognition results are not immediately narrowed down to one object, certainty degrees are calculated for plural object candidates, and with the certainty degrees as reference information, a final object is determined.

Therefore, estimation can be carried on with plural object candidates held, and various factors can be reflected in the determination of objects by increasing or decreasing the certainty degrees of the object candidates according to aimed factors, so that highly accurate recognition results can be obtained.

BRIEF DESCRIPTION OF THE DRAWINGS

The above and other objects, features and advantages of the present invention will become more apparent from the following detailed description made with reference to the accompanying drawings. In the drawings:

FIGS. 20A to 20C are explanatory diagrams showing a method of creating a distance map and a created distance map;

FIGS. 23A, 23B and 23 are explanatory diagrams concerning distance map modification based on vehicle information;

FIG. 29 is an explanatory diagram concerning the outline of a measurement matrix;

FIG. 30 is a table showing a specific example of a part of a measurement matrix;

FIGS. 32A and 32B are explanatory diagrams concerning environment description data;

FIGS. 37A to 37D are explanatory diagrams concerning searching by use of environment description data;

DETAILED DESCRIPTION OF THE PREFERRED EMBODIMENTS

First Embodiment

Figure 1:
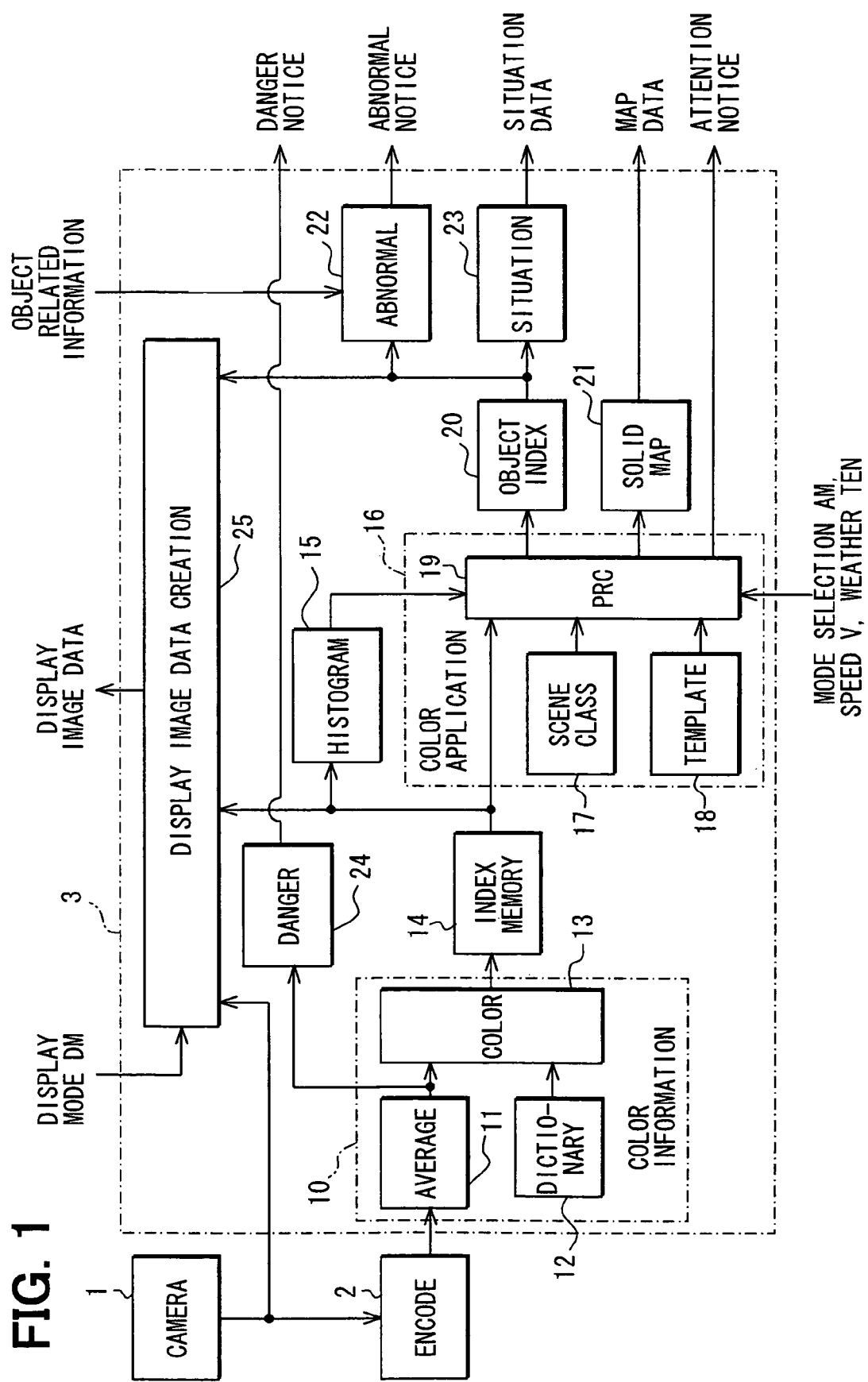
FIG. 1 is a block diagram showing an environment recognition device according to a first embodiment of the present invention is applied.

As shown in FIG. 1, an on-board system comprises an on-board camera 1 for imaging scenes in front of a subject vehicle, an encoding part 2 that encodes a color image (monocular image) obtained from the on-board camera 1, and an environment recognition device 3 that outputs the result of recognizing objects existing in a color image on the basis of image data encoded in the encoding part 2, and various types of data useful to recognize the objects.

The on-board camera 1, which comprises a CCD camera that outputs color images, and the like, is disposed near the ceiling of the vehicle so that scenes in front of the vehicle can be imaged through a windshield. In this embodiment, an image of one frame comprises 352 pixels in the lateral direction and 240 pixels in the longitudinal direction.

The encoding part 2 is a well-known module that performs encoding in the MPEG format, and the image data encoded in the encoding part 2 is subjected to two-dimensional DCT (discrete cosine transform) so that DCT coefficients are described in units of pixel blocks (eight pixels by eight pixels). A direct present (DC) component in each pixel block is equivalent to the average value of the pixel block.

An image of one frame is split in units of macro blocks each comprising 16 pixels by 16 pixels (in this embodiment, one frame consists of M (=22) by N (=15) macro blocks). The macro block is represented by four pixel blocks Y0, Y1, Y2, and Y3 representative of luminance (Y component), and two pixel blocks U and V representative of color differences (U and V components).

The environment recognition device 3 comprises a color information creating part 10 that, when the image data captured from the encoding part 2 is an intra-frame (I frame), obtains color information representing the average color of the image data (I frame) in units of macro blocks, and a color index memory 14 in which color information created in the color information creating part 10 is stored in association with each macro block.

The color information creating part 10 comprises a block average color calculating part 11 that, based on the image data captured from the encoding part 2, calculates the average color of the image data in units of macro blocks, a color dictionary storage part 12 that stores a color dictionary palette defining color vocabularies (color indexes) used in this device, and a color determining part 13 that, by referring to a color dictionary palette stored in the color dictionary storage part 12, determines to which color index the average color of the macro block calculated in the block average color calculating part 11 corresponds, and creates the determination result as color information.

The block average color calculating part 11, of the encoded image data, for the six pixel blocks Y0 to Y3, U and V associated with a macro block, obtains their average colors by decoding DC components of their respective DCT coefficients. However, for the four pixel blocks Y0 to Y3 representative of luminance, the average value of their respective DC components is defined as the average color of Y component of the macro block.

Figure 2A:
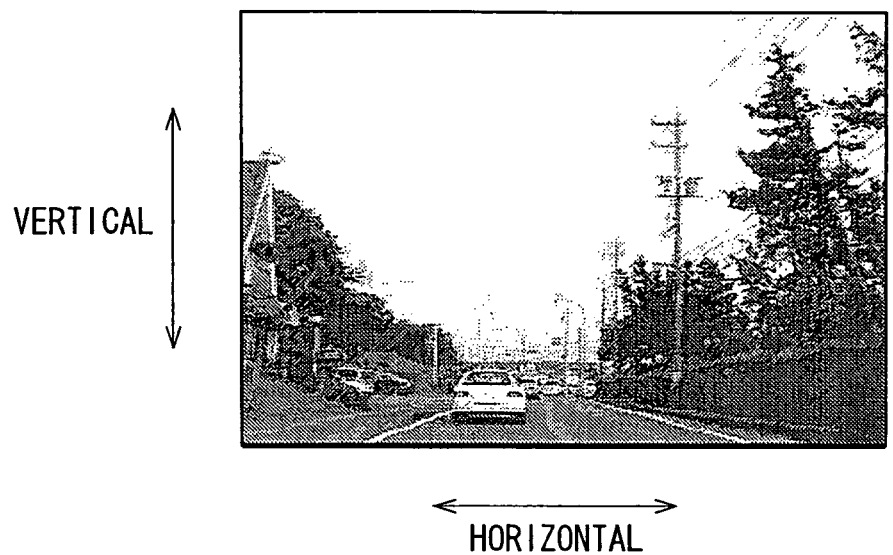
FIGS. 2A and 2B are a sample image and a three-dimensional graph showing the calculation of an average color for each macro block.
Figure 2B:
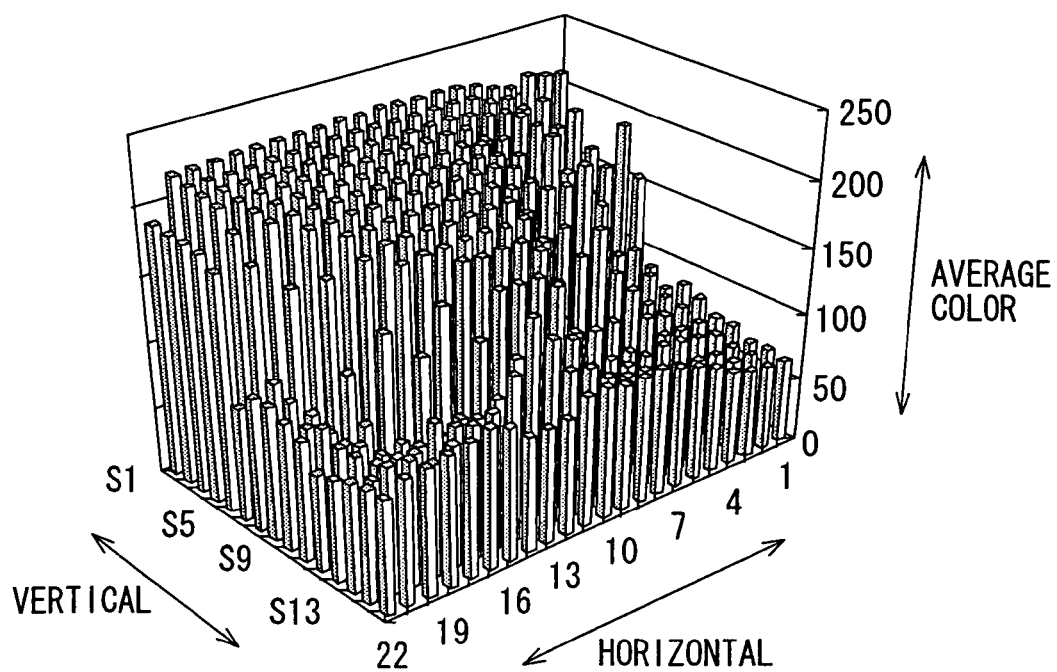

FIG. 2A shows a sample image imaged by the on-board camera 1, and FIG. 2B is a three-dimensional graph showing the respective average colors of macro blocks calculated by the block average color calculating part 11 when the sample image is processed. FIG. 2B is a three-dimensional graph with respect to Y component, and the same is created also for U and V components. Hereinafter, a direction (the lateral direction in FIG. 2A) corresponding to the lateral direction of the vehicle in images by the on-board camera 1 will be referred to as a horizontal (lateral) direction, and a direction orthogonal to it will be referred to as a vertical (longitudinal) direction.

In the color dictionary storage part 12, color indexes of the following P colors (P=7 in this embodiment) are used.

[Blue, Green, Red, Yellow, White, Gray, and Black]

The color indexes are associated with specific objects to be recognized. Typical examples of the specific objects are shown in the Table 1. The correspondence relation is added as one of knowledges used during recognition of the objects in a color application execution part 16 described later.

TABLE 1

| Color index (ci) | Object index |
|---|---|
| Blue | sky (fine), signal, advertising board, signal light, sea, vehicle, . . . |
| Green | green area, street tree, mountain, sign, advertising board, signal light, vehicle, . . . |
| Red | stop light, turn indicator, streetlight, sign, advertising board, signal light, vehicle, median strip, building, pedestrian, red leaves, train, . . . |
| Yellow | sign, advertising board, signal light, building, vehicle, and train, . . . |
| White | crosswalk, white line, vehicle, cloud, snow, snow mountain, smoke, sky (cloudy), building, train, guardrail, advertising board, . . . |
| Gray | sky (cloudy), vehicle, road, building, elevated structures, utility pole, etc. |
| Black | wiper, vehicle, shadow, tire |

In a color dictionary palette, each color index is associated with thresholds (upper limit, lower limit) set using a selected color system (YUV in this embodiment).

In this embodiment, with one of the color indexes as ci (i=1, 2, . . . , P), the lower limit and the upper limit of Y component of the color index ci will be represented as $LY_{ci}$ and $HY_{ci}$, respectively, the lower limit and the upper limit of U component as $LU_{ci}$ and $HU_{ci}$, respectively, and the lower limit and the upper limit of V component as $LV_{ci}$ and $HV_{ci}$, respectively.

The color indexes are not limited to the above seven colors. When colors can be classified to suit human sense, other colors may be used, or the number of color indexes may be increased or decreased. However, in terms of the structure of thresholds, the number of color indexes should be preferably several colors including the three primary colors and black and white.

When the respective average colors of Y, U, and V components calculated for each macro block in the block average color calculating part 11 are AY, AU, and AV, the color determining part 13 determines to which color index ci the color of the macro block corresponds, using the thresholds defined in the color dictionary palette and inequalities shown in (1) to (3) defined for each color index using the color dictionary palette, and creates the determination result (that is, one of the color indexes) as color information of the macro block. Only one of upper limit and lower limit defined in the inequalities.

$$LY_{ci} \leq AY < HY_{ci} \tag{1}$$

$$LU_{ci} \leq AU < HU_{ci} \tag{2}$$

$$LV_{ci} \leq AV < HV_{ci} \tag{3}$$

Color information thus created is stored in a color index memory 14 in association with the macro block as described above. Hereinafter, the color information associated with the macro blocks will be referred to as a color information arrangement.

Referring back to FIG. 1, the environment recognition device 3 comprises: a danger level calculating part 24 that, based on the calculation result (the average color of the macro block) in the block average color calculating part 11, obtains a danger level of a monitoring area set in advance on the color screen; a histogram creating part 15 that creates a color histogram indicating the distribution of macro blocks added with color information corresponding to an aimed color index, according to a color information arrangement stored in the color index memory 14; and a color application execution part 16 that executes various applications, based on the color information arrangement stored in the color index memory 14, a color histogram created in the histogram creating part 15, and various data supplied from the outside of the device 3, and outputs the result of recognizing objects existing in a color image imaged by the on-board camera 1, a solid map generated based on the color histogram, and caution calling information indicating a situation needing caution.

The danger level calculating part 24 calculates a danger level Dk of a monitoring area in frame k according to expression (4), where k is a parameter for recognizing a frame.

[Expression 1]

$$Dk = \sum_{j=1}^{J} W(j) \sum_{i=1}^{6} |Zdc(EL(i), ND(j), k) - Zdc(EL(i), ND(j), k-1)| \quad (4)$$

ZdC(EL(i),ND(j),k) indicates the average color (DC component of DCT coefficient) of a component identified by EL(i) for a macro block identified by ND(j) in frame k. EL(i) indicates one of six types of components Y0 to Y3, U, V of a macro block, and ND(j) indicates one of J macro blocks contained in the monitoring area. W(j) is a weight function added correspondingly to the position of a macro block.

Specifically, since a larger differential power between frames (that is, change in luminance and colors) places a heavier burden on sight during driving, the sum of the differential powers for all components Y0 to Y3, U, and V is found as a danger level Dn in frame k. Since differences between frames become large in the periphery of an image even during normal straight traveling, the weight function W(j) is set to have greater weights for macro blocks nearer to the periphery of vanishing points in the image in the monitoring area. The monitoring area is set in areas where new objects may emerge suddenly, such as a vehicle the jumping of person.

Figure 3:
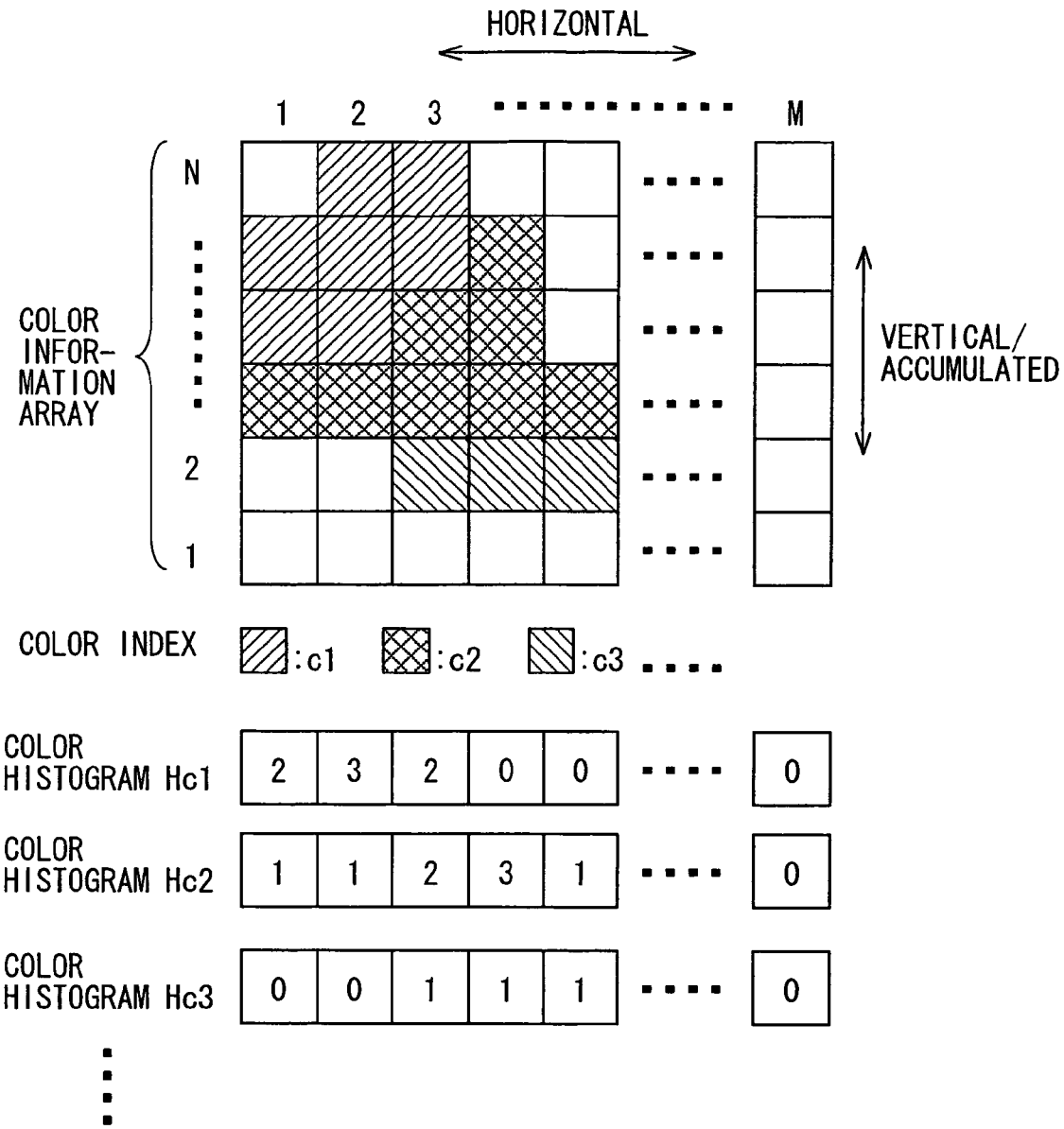
FIG. 3 is an schematic diagrams showing the creation of color histograms.

The histogram creating part 15, as shown in FIG. 3, accumulates the number of macro blocks added with an aimed color index ci along a vertical direction of the image for each of horizontal coordinates m (m=1, 2, ..., M) of macro blocks along a horizontal direction of the image, based on the color information arrangement stored in the color index memory 14, thereby color histograms Hci (m). In short, for the image of one frame, as many color histograms Hci (m) as the number of color indexes (P) will be created.

The range of the vertical direction in which macro blocks are accumulated in the histogram creating part 15 may be freely changed by the color application execution part 16. In FIG. 3, in terms of visibility of the figure, the number of macro blocks in the vertical direction of the color information arrangement is reduced.

Referring back to FIG. 1, the color application program execution part 16 comprises: a scene classification dictionary storage part 17 that stores a scene classification dictionary formed by associating each of typical scenes of a color image with vocabularies representative of typical objects and typical states contained in the scene; a template storage part 18, constructed by a microcomputer, that stores templates used in wiper detection processing described later; and a processing part 19 that performs various processings for environment recognition such as object detection and situation recognition, based on color index image data stored in the color index memory 14, color histograms Hci (m) created in the histogram creating part 15, a scene classification dictionary stored in the scene classification dictionary storage part 17, templates stored in the template storage part 18, operation mode selection data AM supplied from the outside, vehicle speed data V, weather data TEN, and known or past object indexes stored in an object index memory 20 described later.

An example of a description of a scene classification dictionary stored in the scene classification dictionary storage part 17 is shown in Table 2.

TABLE 2

| Scene | Object index |
|---|---|
| Regular load: urban area | Intersection, streetlight, congestion, preceding vehicle, opposing vehicle, road sign, electric bulletin board, green area, advertising board, sky, ... |
| Regular road: suburbs | ... |
| Expressway | ... |
| Parking lot | ... |
| ... | ... |

The processing part 19 performs still object detection processing for detecting still objects such as stationary objects on the roadside (e.g., streetlight and signal light), wiper detection processing for detecting whether the wiper is operating, template creation processing for creating a template used in the wiper detection processing, solid map creation processing for creating a solid map on the basis of color histograms, caution calling situation detection processing for detecting situations needing caution, and preceding vehicle detection processing for detecting information about preceding vehicles.

Each of these processing is previously associated with an operation mode determined from operation mode selection data AM, and processing to be executed is properly selected according to the contents of the operation mode selection data AM.

The operation mode selection data AM may be inputted by a driver of a vehicle, or may be automatically created according to a situation recognized in the present device or other on-board devices. The vehicle speed data V may be obtained from output of a vehicle speed sensor mounted in the vehicle, or a navigation device or a GPS receiver.

Individual processings executed by the processing part will be described in detail.

[Still Object Detection Processing]

Figure 4:
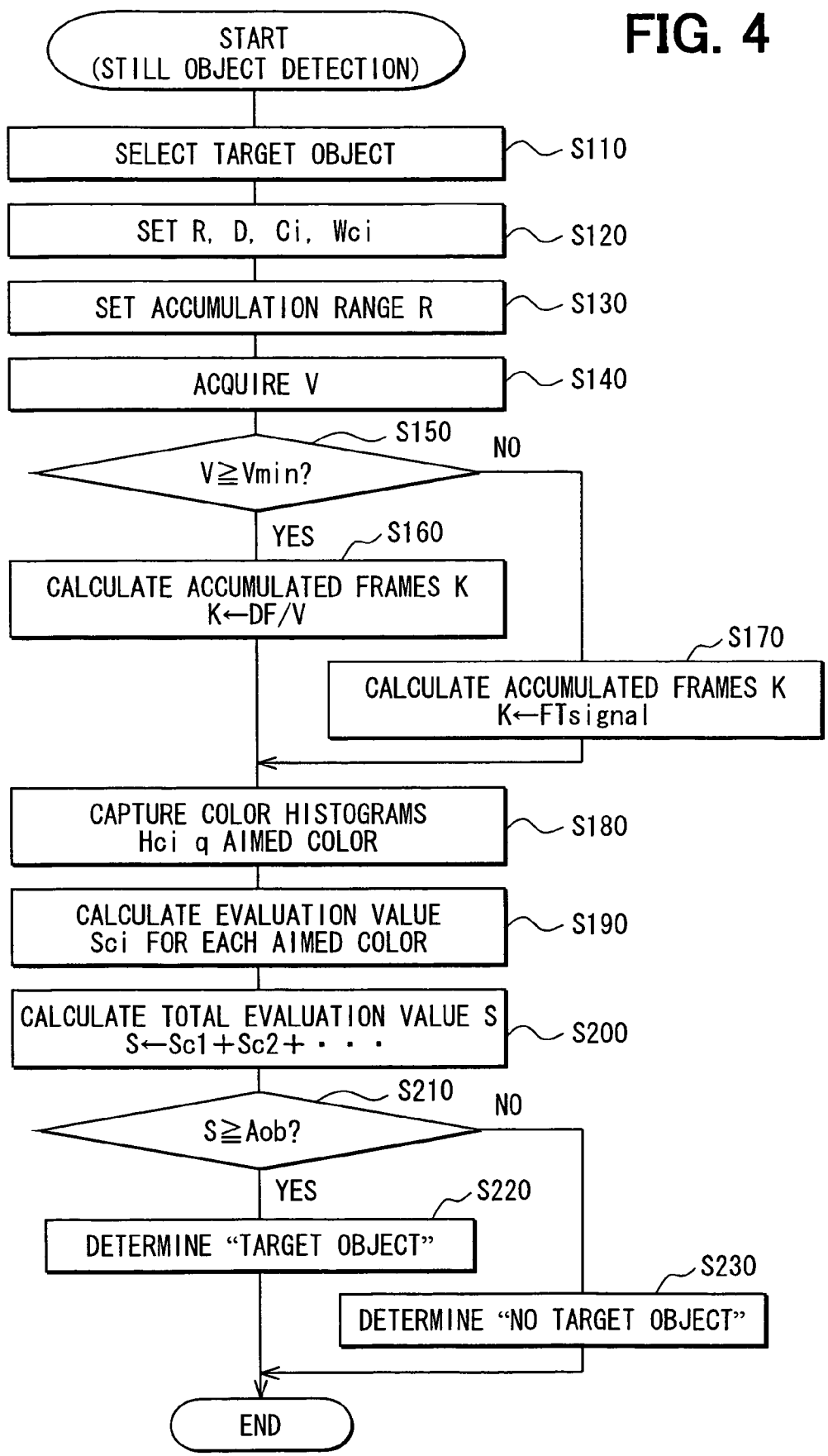
FIG. 4 is a flow chart showing still object detection processing.

Still object detection processing will be described with reference to a flow chart shown in FIG. 4.

When this processing is started, the processing part 19 selects a target object (still object) to be recognized (S110). Specifically, when a scene is specified, it selects one of objects corresponding to the specified scene as a target object by searching a scene classification dictionary stored in the scene classification dictionary storage part 17. When no scene is specified, it selects in order (e.g., in descending order of importance) one from among all objects to be recognized without using the scene classification dictionary.

The scene may be one specified based on various information inputted from the outside such as information on a present position, operation mode selection data AM, and weather data TEN, or one specified based on an object recognized as a result of processing in the processing part 19 or an object recognized in higher-level recognition processing performed in a subsequent stage of the present device.

Next, the processing part 19 sets various parameters according to the target object selected in S110 (S120). Parameters set here include an accumulation range R for defining a range in which macro blocks are accumulated in a vertical direction of a color information arrangement in the histogram creating part 15, a standard distance D used to calculate the number K of accumulated frames described later, an aimed color ci (i=1, 2, ..., Psp) for defining the type of a color index subject to processing, and a weight function Wci used to calculate a color-specific evaluation value Sci described later.

The accumulation range R allows color histograms to be created only in an area where a target object such as a signal light and a road sign will probably exist in a fixed range of a vertical direction (height direction) in a screen. Therefore, for objects not characteristic in height direction, the entire range of the vertical direction is the accumulation range R.

The standard distance D is set based on an average disposition interval for a target object such as a streetlight and a signal light which appears repeatedly. When a target object does not have such a specific repetition pattern, the standard distance D is set to a certain fixed value.

As an aimed color ci, Psp color ($1 \leq Psp \leq$ integer of P) characteristic to a target object is set. For example, when a target object is a signal light, green, yellow, and red are set as aimed colors c1, c2, and c3. When a target object is a tail light of vehicle, red is set as aimed color c1.

The weight function Wci is set to have greater weights for positions in which a target object is more likely to exist, for each of positions (horizontal coordinate m of macro blocks) in a horizontal direction in a screen. When there are aimed colors ci, a different weight function is set for each of the aimed colors ci. For a same target object, a same weight function Wci may be used for all aimed colors ci.

Next, when the histogram creating part 15 creates a histogram Hci (m) using the accumulation range R of the parameters set in S120, the processing part 19 sets the range in which the number of macro blocks is accumulated in a vertical direction (S130).

The processing part 19 acquires a vehicle speed V (S140), and compares the acquired vehicle speed V and a preset lower limit Vmin (S150). When the vehicle speed V is equal to or greater than the lower limit Vmin, calculates the number K of accumulated frames corresponding to the vehicle speed V by using the expression (5) (S160); when the vehicle speed V is smaller than the lower limit Vmin, it calculates the number K of accumulated frames using expression (6) regardless of the vehicle speed V (S170).

$$K = D \times F/V \quad (5)$$

$$K = F \times Tconst \quad (6)$$

K is represented by an integer to which a fractional portion is rounded up. F [frm/s] designates a frame rate of video processing, and Tconst [s], which designates fixed time, is set to, for example, an average stop time when a signal light is red at an intersection. In this case, the lower limit Vmin is set so that a relation of Tconst=D/Vmin is satisfied.

The expression (5) calculates the number of I frames processed for time (D/V) required for a vehicle to advance by a standard distance D as the number K of accumulated frames. However, when the vehicle stops at an intersection because of a red signal light, or when the vehicle speed V becomes extremely small because of traffic congestion or for other reasons, the number K of accumulated frames calculated by the expression (5) becomes highly large and processing will be delayed to an intolerable level. Therefore, expression (6) is used to obtain the number K of accumulated frames independently of the vehicle speed V.

Next, the processing part 19 captures color histograms Hci (k, m) with respect to all aimed colors ci created in the histogram creating part 15 for K frames (S180). It calculates a color-specific evaluation value Sci for each aimed color ci by using expression (7) on the basis of the captured color histograms Hci (k, m) and the weight function Wci (m) set in S120 (S190). k in Hci (k, m) indicates a color histogram based on a k-th frame.

[Expression 2]

$$Sci = \sum_{k=1}^{K} \sum_{m=1}^{M} \{Wci(m) \times HCi(k, m)\} \quad (7)$$

Furthermore, the processing part 19 calculates a total evaluation value S by adding all the color-specific evaluation value Sci calculated for each of aimed colors ci in the S190 as shown by expression (8) (S200).

[Expression 3]

$$S = \sum_{i=1}^{Psp} Sci \quad (8)$$

The processing part 19 compares the total evaluation value S and an evaluation threshold Aob set in advance for the target object (S210). When the total evaluation value S is equal to or greater than the evaluation threshold Aob, the processing part 19 creates a recognition result indicating that the target object selected in S110 exists in the image (S220); when the total evaluation value S is smaller than the evaluation threshold Aob, it creates a recognition result indicating that the target object does not exist in the image (S230), and terminates the processing.

When the number K of accumulated frames is larger, a larger delay will occur until the result of recognizing a target object is obtained. Therefore, to restrain the delay, a coefficient α (0<α(1) may be set so that ((K is used instead of K in S180 and S190, and ((Aob is used instead of Aob as an evaluation threshold.

Figure 5:
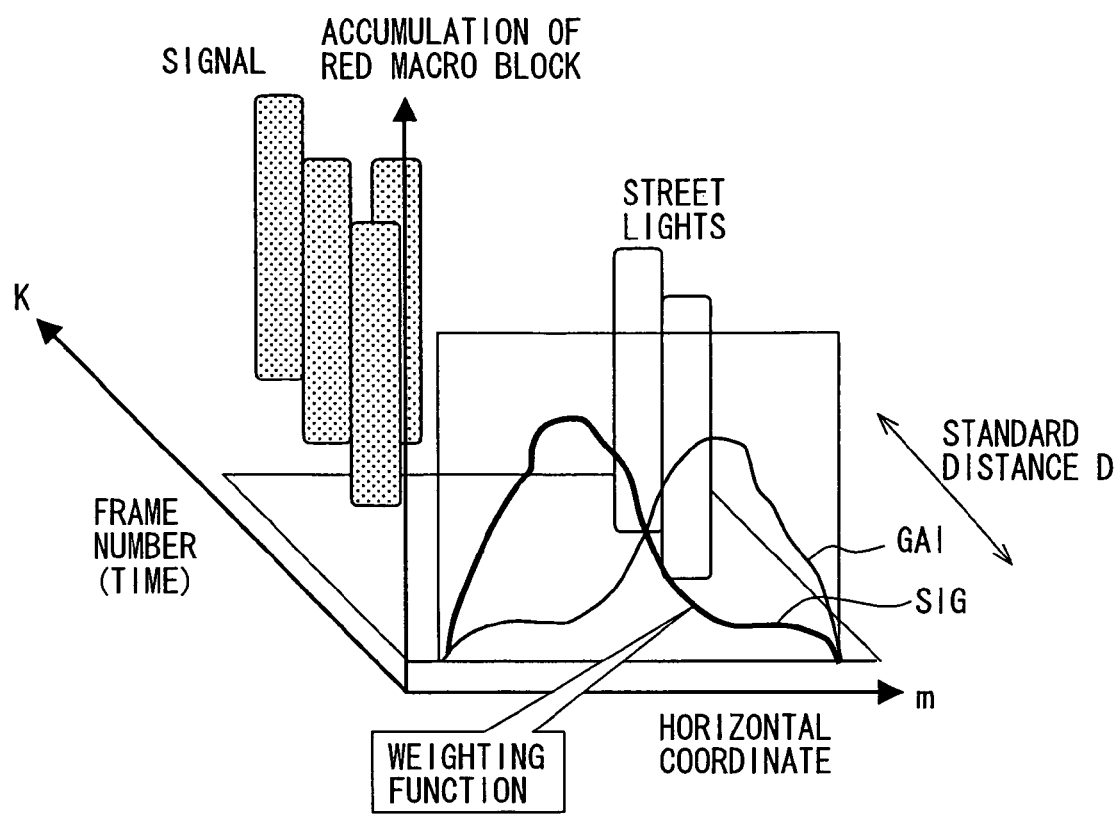
FIG. 5 is a three-dimensional graph showing object recognition and a color solid map by use of color histogram.

In the still object detection processing, for example, when the target object selected in S110 is a streetlight, only red is set as an aimed color ci, and a weight function Wci(m) (see GAI in the drawing) set to have greater weights toward the right from the center of the screen as shown in FIG. 5 is used. The standard distance D is set to a standard installation interval of streetlights.

That is, streetlights that illuminates a road are normally positioned over the central portion of the road as typified by a median strip as a three-dimensional position. In Japan, vehicles generally travel on the left. As a result, in images of the on-board camera 1 during the night, the number of macro blocks added with a red index increases because the streetlights scatter red components from the central portion of horizontal coordinates of the screen toward the right.

Figure 39:
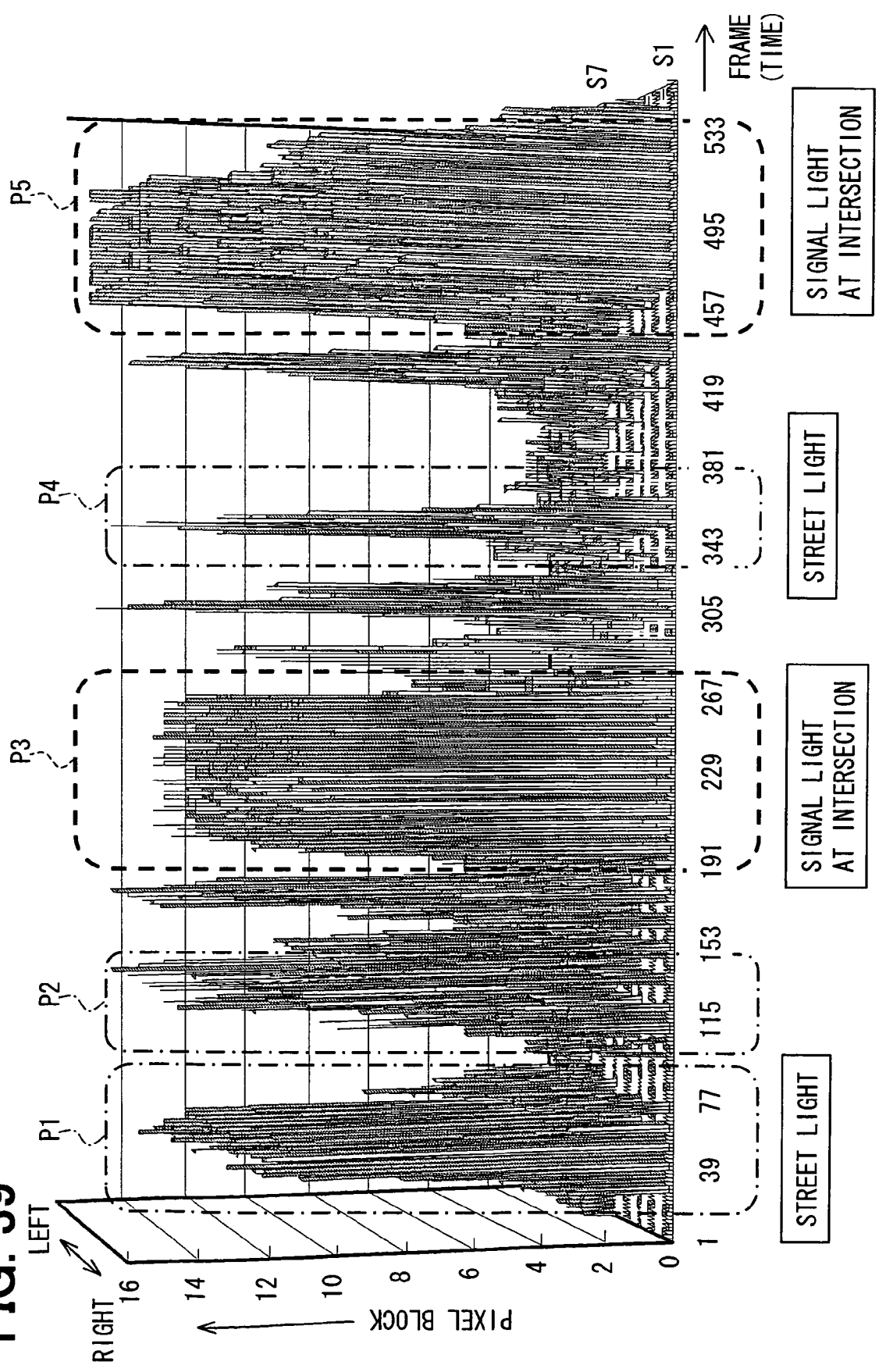
FIG. 39 is a three-dimensional graph formed by in time series arranging red color histograms created during night traveling.

Since a traveling vehicle passes momentarily through individual streetlights, when red histograms Hci (k, m) are viewed in time series, peaks of the red histograms appear continuously in the neighborhood of the streetlights (see P1, P2, and P4 of FIG. 39). Since the number K of accumulated frames is set based on the standard distance D set to a standard installation interval of streetlights, in places where streetlights exist, regardless of the timing in which this processing is performed, the existence of the streetlights can be recognized almost without fail.

In the still object detection processing, for example, when the target object selected in S10 is a signal light, red, yellow, and green are set as aimed colors ci, and a weight function Wci(m) (see SIG in the figure) set to have greater weights toward the left from the center of the screen as shown in FIG. 5 is used. The standard distance D is set to a standard installation interval of intersections in an urban area, and since the position of signal lights in a height direction is almost constant, the accumulation range R is set according to the height.

When the accumulation range R is set, since the components of aimed colors ci (red, yellow, green) caused by objects except signal lights outside the accumulation range R, that is, causes of incorrect recognition are eliminated without fail, the accuracy of recognizing the signal lights is increased.

Although, in this embodiment, all red, yellow, and green are used as aimed colors ci, only one of the colors may be set as an aimed color ci. It is clear that use of plural colors will bring about higher reliability.

When these streetlights and signal lights are successively detected as target objects, from changes in the detection situations, the traveling situation of the vehicle such as passage at intersections and stop at intersections (P3 and P5 in FIG. 39), and the occurrence of traffic congestion can be recognized.

[Caution Calling Situation Detection Processing]

Figure 6:
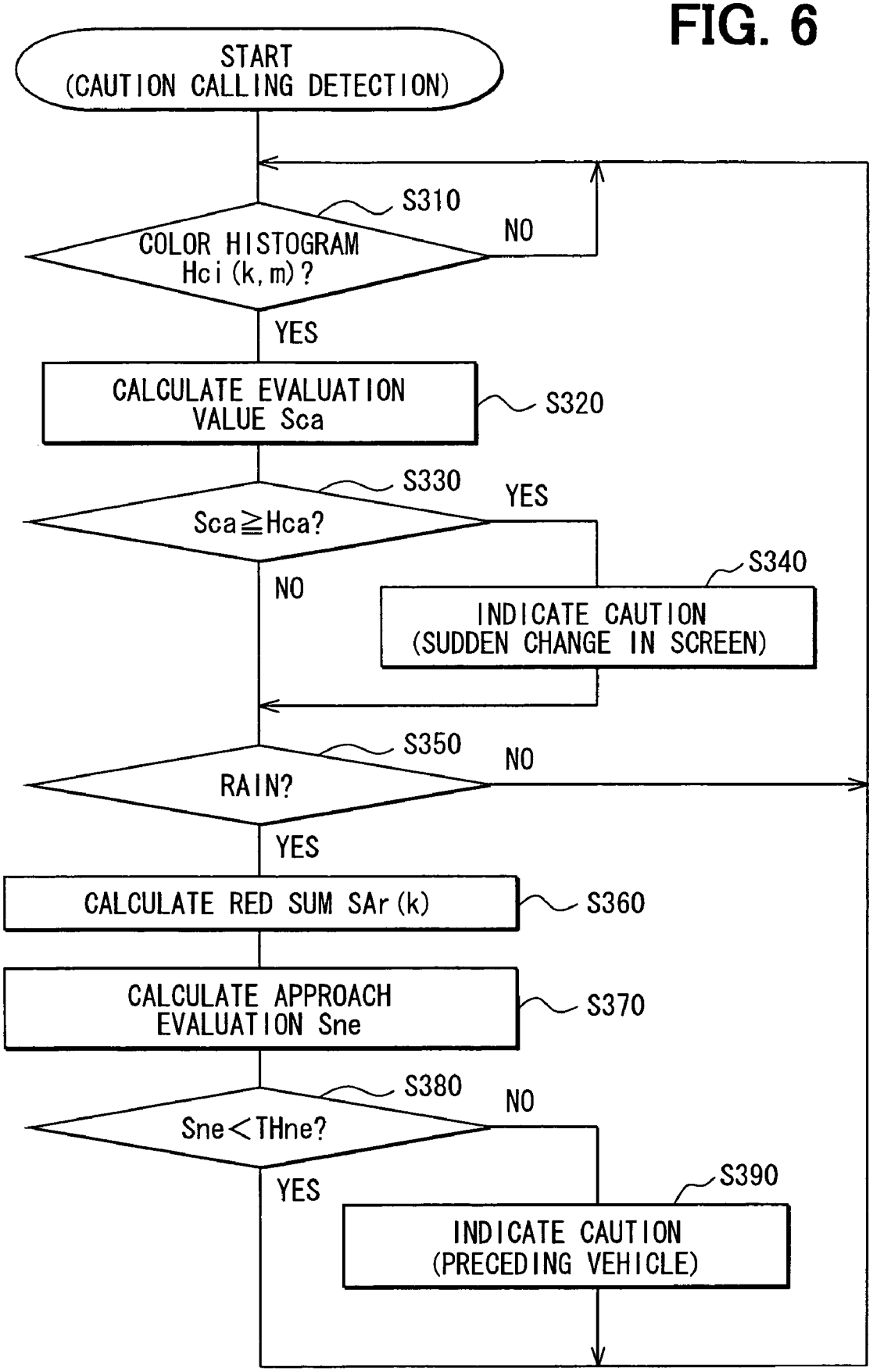
FIG. 6 is a flow chart showing caution calling situation detection processing.

The caution calling situation detection processing is described with reference to a flow chart shown in FIG. 6.

In this processing, the processing part 19 waits until it acquires a color histogram Hci (k, m) of a new frame k from the histogram creating part 15 (S310), and on acquiring the color histogram Hci (k, m), according to the expression (9), calculates a caution calling evaluation value Sca produced by adding inter-frame differences from a color histogram Hci (k−1, m) acquired previously for all colors (S320).

[Expression 4]

$$Sca = \sum_{i=1}^{P} \sum_{m=1}^{M} |Hci(k, m) - Hci(k-1, m)| \quad (9)$$

The processing part 19 compares the calculated caution calling evaluation value Sca and a screen sudden change determination threshold THca (S330), and when the caution calling evaluation value Sca is equal to or greater than the screen sudden change determination threshold THca, outputs a caution need notice indicating a situation needing caution because of the emergence of a sudden change in the entire screen (S340).

Subsequently, the processing part 19 determines the presence or absence of rainfall from weather data TEN inputted from the outside (S350), and on determining that rainfall is absent, returns to S310.

On determining that rainfall is present, it calculates a red screen sum value SAr (k) by adding all the components with respect to red (ci=r) histograms Hr (k, m) of acquired color histograms Hci (k, m) according to the expression (10) (S360).

[Expression 5]

$$SAr(k) = \sum_{m=1}^{M} Hr(k, m) \quad (10)$$

Furthermore, with a preset frame number as Kne, according to the expression (11), it calculates an approach evaluation value Sne by adding a present value SAr(Kne) of the red screen sum value SAr (k) and weight accumulated values of inter-frame differences for the frame number Kne (S370). However, for safety, the following should be considered with respect to a weighing coefficient Wk of inter-frame difference:

When the value of an inter-frame difference is negative, Wk should be smaller than when positive, or zero.

When the value of an inter-frame difference is positive, Wk should be larger when k is closer to Kne.

[Expression 6]

$$Sne = SAr(Kne) + \sum_{k=1}^{Kne} Wk\{SAr(k) - SAr(k-1)\} \quad (11)$$

The processing part 19 compares the calculated approach evaluation value Sne and a preset near determination threshold THne (S380). When the approach evaluation value Sne is smaller than the near determination threshold THne, the processing returns to S310. When the approach evaluation value Sne is equal to or greater than the near determination threshold THne, it outputs caution calling notice indicating a situation needing caution of sudden approach to a preceding vehicle (S390), and returns to S310.

Specifically, a large change in the entire screen suggests a sudden change in a traveling direction of the vehicle or a sudden emergence of an obstruction near the vehicle, which are often situations needing caution. Therefore, the degree of changes in the entire screen is obtained based on the caution calling evaluation value Sca.

At the time of rainfall, because of diffused light on a windshield due to rain drops, a red histogram Hr (k, m) reacts sensitively to the light of stop lights of a preceding vehicle, and the total sum of red blocks in the entire screen increases conspicuously as the driver's vehicle comes near the preceding vehicle. Therefore, the increasing degree is obtained based on the approach evaluation value Sne.

[Template Creation Processing]

Figure 7A:
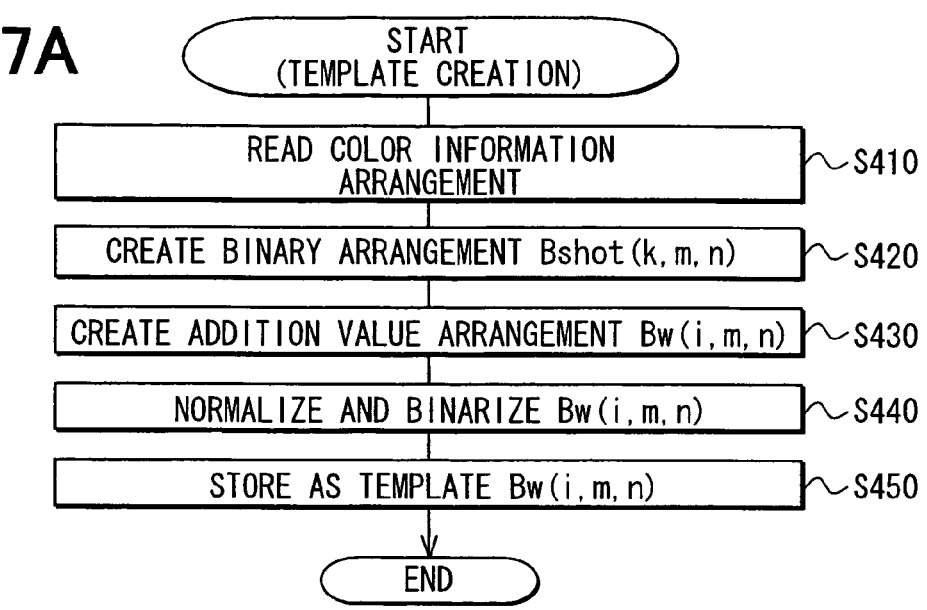
FIG. 7A is a flow chart showing template creation processing.

The template creation processing used in wiper detection processing is described with reference to a flow chart shown in FIG. 7A.

A template represents the shape of a wiper that may be displayed in an image imaged by the on-board camera 1 when the wiper is operating.

Figure 7B:
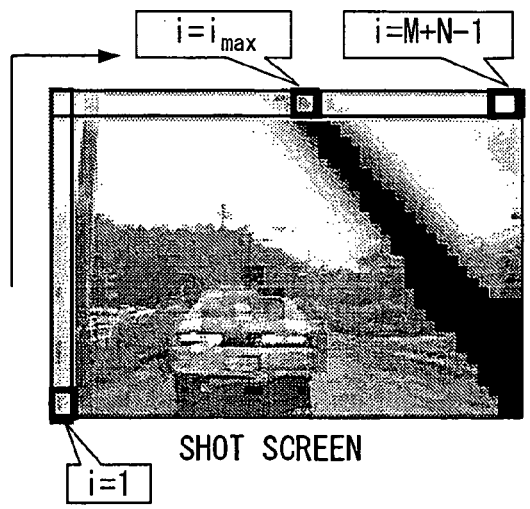
FIGS. 7B to 7D are explanatory diagrams showing creation of templates.

It is assumed that, when this processing is started, imaging by the on-board camera 1 is performed in a state in which the wiper is activated in a place having a bright background, a color information arrangement based on image data for creating a template (see FIG. 7B) is stored in the color index memory 14.

When this processing is started, color arrangement information based on image data for creating a template is read from the color index memory 14 by the number of plural frames (Kgen frames in this embodiment) (S410).

Figure 7C:
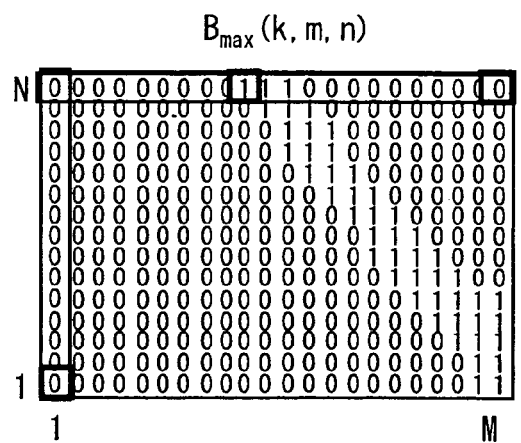

Based on the read color arrangement information, as shown in FIG. 7C, the processing part 19 creates a binary arrangement Bshot (k, m, n) by, for each frame, adding a label "1" to macro blocks added with color information corresponding to a black color index, and a label "0" to macro blocks added with other color information (S420). k designates a frame identification number, m designates a horizontal coordinate of a macro block, and n designates a vertical coordinate of the macro block. The binary arrangement Bshot (k, m, n) may be regarded as an L (=M×N) dimensional vector.

In the binary arrangement Bshot (k, m, n), when an identification address for identifying a macro block positioned in the left end and top end of the arrangement (screen) is i, the addresses (m, n)=(1, 1), (1, 2), . . . (1, N) of macro blocks positioned in left ends are associated with identification addresses i=1, 2, . . . N, and the addresses (1, N), (2, N), . . . (M, N) of macro blocks positioned in top ends are associated with identification addresses i=N, N+1, . . . M+N−1.

In a binary arrangement Bshot (k, m, n) of frame k, of macro blocks identified by an identification number i, the address of a macro block (macro block near a bottom or left end) that is added with the label "1" and has the smallest identification number i is an edge address I edge(k).

The binary arrangement Bshot (k, m, n) created at S420 is regarded as an L (=M×N) dimensional vector Bshot(k), and using the expression (12), by adding vectors Bshot(k) having the same edge address I edge(k), an L-dimensional vector Bw(i) is obtained for each of address i (S430).

[Expression 7]

$$Bw(i) = \sum_{k=1}^{K} \delta(i, k) Bshot(k) \quad (12)$$

$$\delta(i, k) = \begin{cases} 1 & (ledge(k) = i) \\ 0 & (ledge(k) \neq i) \end{cases}$$

Vector Bshot (k) may be described as a binary arrangement Bshot (k, m, n), and likewise, vector Bw (i) may be described as an addition value arrangement Bw (i, m, n).

The processing part 19 normalizes the value of each addition value arrangement Bw (i, m, n) thus obtained by a preset upper limit bmax, and compares the normalized value with a preset threshold bth (≦bmax), thereby binarizing the value of each macro block (S440). Specifically, a macro block with a normalized value equal to or greater than a threshold bth (≦bmax) is regarded as part of the wiper, and its value is changed to "1." A macro block with a normalized value smaller than a threshold bth is not regarded as part of the wiper, and its value is changed to "0."

The processing part 19 stores the addition value arrangement Bw (i, m, n) of which the value of each macro block has been thus binarized, as a template Bw (i, m, n) in the template storage part 18 (S450), and terminates the processing.

Figure 7D:
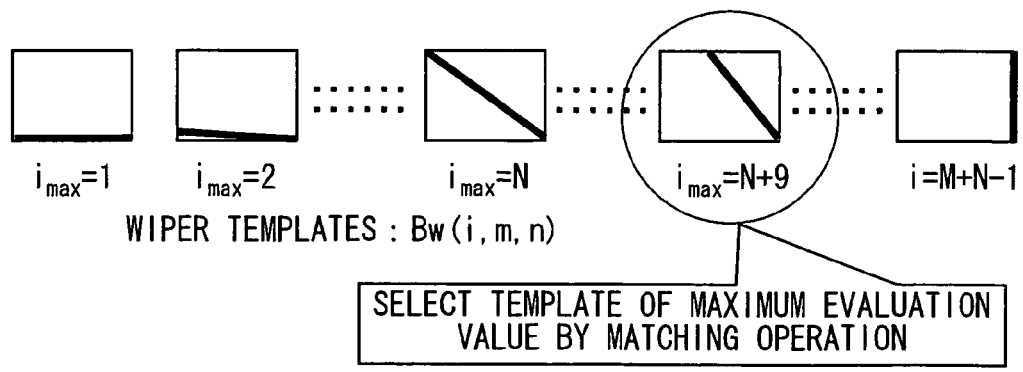

As a result, as shown in FIG. 7D, M+N−1 templates Bw (i, m, n) are automatically created.

[Wiper Detection Processing]

Figure 8:
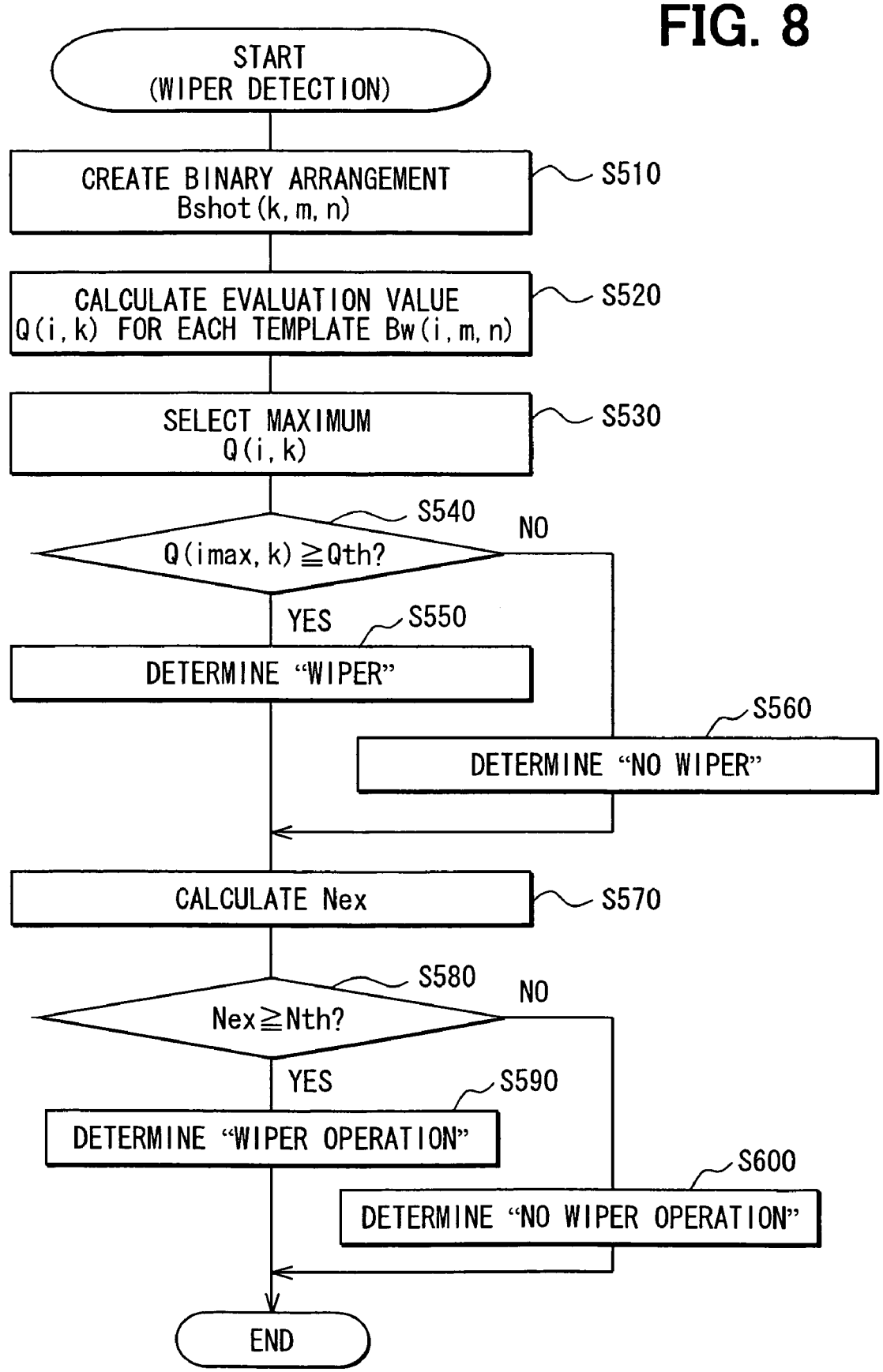
FIG. 8 is a flow chart showing wiper detection processing.

The wiper detection processing is described with reference to a flow chart shown in FIG. 8.

When this processing is started, the processing part 19 creates a binary arrangement Bshot (k, m, n) like the processing in S420, based on the color information arrangement of frame k read from the color index memory 14 (S510).

The processing part 19 calculates an evaluation value Q(i, k) for evaluating the degree of approximation to the binary arrangement Bshot (k, m, n) created in S510 for all templates Bw (i, m, n) stored in the template storage part 18 according to the expression (13) (S520).

[Expression 8]

$$Q(i, k) = \sum_{m=1}^{M} \sum_{n=1}^{N} Ww(i, m, n) Bw(i, m, n) Bshot(k, m, n) \quad (13)$$

Ww (i, m, n) is a weight coefficient set according to a template and the position of a macro block, and is set so that the weight of macro block positioned in the left end and top end of the screen is higher than that of other macro blocks.

The processing part 19 (S520) extracts the largest (the highest degree of approximation) of evaluation values Q (i, k) calculated in S520 as a maximum value Q (imax, k) (S530), compares the extracted maximum value Q (imax, k) and a threshold Qth previously set (S540). When the maximum value Q (imax, k) is equal to or greater than the threshold Qth, it creates a recognition result indicating that a wiper exists in a position identified by template Bw (imax) in an image of frame k (S550). When the maximum value Q (imax, k) is smaller than the threshold Qth, it creates a recognition result indicating that a wiper does not exist in the image of frame k (S560). These determination results are stored in the memory by the number of previous Kkeep frames.

Next, the processing unit 19 determines the number of times Nex it was determined that a wiper exists in previous K frame, according to the expression (14), based on the determination results stored in the memory in S560 (S570), compares the number of times Nex and a preset operation determination threshold Nth (S580). When the number of times Nex is equal to or greater than the operation determination threshold Nth, it creates a recognition result indicating that the wiper is operating (S590); when the number of times Nex is smaller than the operation determination threshold Nth, it outputs a recognition result indicating that the wiper is inactive (S600), and terminates the processing.

As the operation determination threshold Nth, a value calculated by the expression (14) may be used, where α is a constant (0.5≦α≦1.0), fw is a wiper operation speed [the number of reciprocating operations/second], and F is an image frame rate [frame/second].

$$Nth = \alpha \cdot K(fw/[F((M+N-1)]) \quad (14)$$

Thereby, even when an input signal cannot be obtained from a wiper control device, whether the wiper is operating can be automatically detected from only images, and the position of the wiper can be determined for each frame.

[Preceding Vehicle Detection Processing]

Figure 9A:
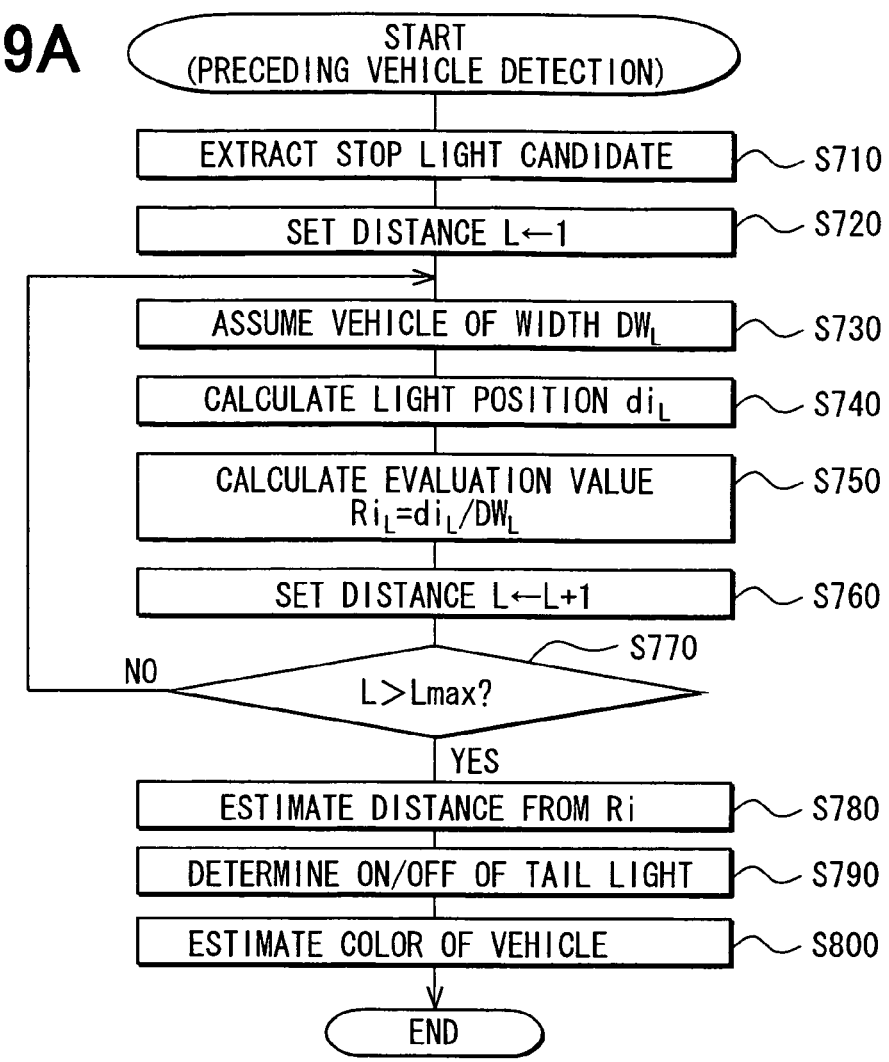
FIG. 9A is a flow chart showing preceding vehicle detection processing.
Figure 9B:
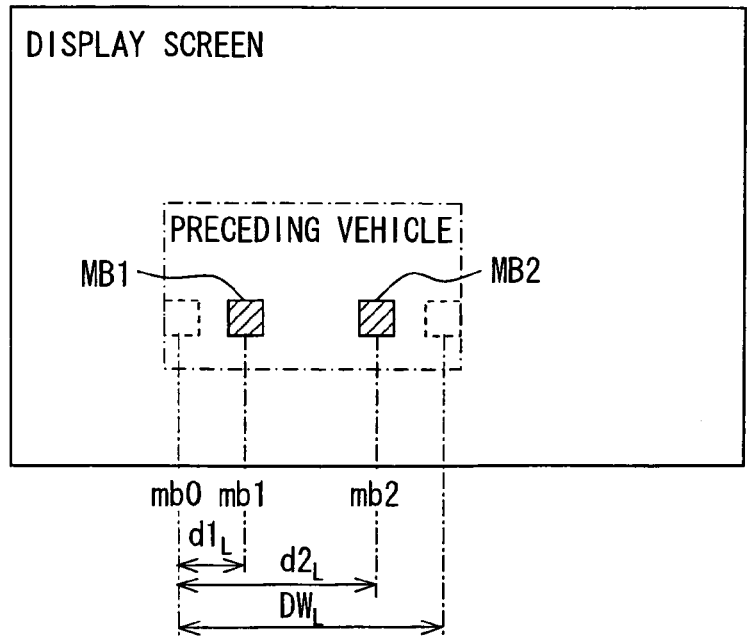
FIG. 9B is an explanatory diagram showing preceding vehicle detection.

The preceding vehicle detection processing is described with reference to a flow chart shown in FIG. 9A and a schematic diagram shown in FIG. 9B.

When this processing is started, color information corresponding to a red color index is added based on the color information arrangement read from the color index memory 14, a pair of macro blocks MB1 and MB2 arranged in a horizontal direction are extracted as a stop light candidate (S710), and a parameter L for specifying a preset vehicular distance DCL is set to 1 (S720).

In this embodiment, six stages of 5 m, 10 m, 20 m, 50 m, 100 m, 200 m or more are set as the inter-vehicle distance DCL. According to the inter-vehicle distance DCL, the vehicle width DWL of the vehicle in the inter-vehicle distance DCL is set in advance.

Next, based on macro block MB1 and MB2 extracted as a stop light candidate in S710, the processing part 19 assumes a vehicle having the vehicle width $DW_L$ with center at the central position in the horizontal direction (S730). In the description below, the respective horizontal coordinates of the macro blocks MB1 and MB2 are described as mb1 and mb2, and one of the horizontal coordinates of macro blocks in the ends of the assumed vehicle (the left side in this embodiment) is described as a reference position mb0.

The processing part 19 calculates a light position $di_L$ (i=1, 2), which is the position of the stop light candidate with respect to the reference position mb0, according to the expression (15) (S740), and calculates an evaluation value $Ri_L$ on the basis of the light position $di_L$ and the vehicle width $DW_L$ by the expression (16) (S750).

$$di_L = mbi - mb0 \quad (15)$$

$$Ri_L = di_L / DW_L \quad (16)$$

Then, it increments the parameter L for specifying an inter-vehicle distance $DC_L$ (L←L+1) (S760), and determines whether the parameter L is greater than the number of stages Lmax (=6) of the inter-vehicle distance $DC_L$ (S770). When the parameter L is equal to or less than the number of stages Lmax, it returns to S730 and repeatedly performs the above-described processing of S730 to S770.

On the other hand, when the parameter L is greater than the number of stages Lmax, it extracts an evaluation value $D1_L$ closest to 0 or an evaluation value $d2_L$ closest to 1, based on evaluation values d1L and $d2_L$ obtained for each inter-vehicle distance. According to the parameter L added to the extracted evaluation value $di_L$, it estimates an inter-vehicle distance specified in the parameter L as an inter-vehicle distance to a preceding vehicle having a stop light in the position of the stop light, and creates object information indicating that (S780).

Furthermore, the processing part 19 acquires the luminance values (Y components) of macro blocks MB1 and MB2 extracted as the stop light candidate, and compares the luminance values and a preset lighting threshold. When the luminance values are greater than the lighting threshold, it creates object information indicating that a tail light is in the turned-on condition. When the luminance values are equal to or less than the lighting threshold, it creates object information indicating that the tail light is in the turned-off condition (S790).

The processing part 19 acquires the color information of macro blocks positioned vertically to the central position of the macro blocks MB1 and MB2, creates object information indicating that the color information is the color of the preceding vehicle (S800), and terminates the processing.

This processing is repeatedly performed until all stop light candidates existing in the color information arrangement are extracted.

In this way, in this processing, macro blocks added with color information corresponding to a red index in the color information arrangement are extracted for comparison with a virtual vehicle. By this simple processing, a preceding vehicle can be detected without performing complicated processing having a large amount of processing such as area splitting.

[Solid Map Creation Processing]

In this processing, a traveling distance of a vehicle for a period of the creation of color histograms Hci (m) is calculated based on a vehicle speed V and a frame rate F, and the color histograms Hci (m) are arranged according to the calculated distance. Thereby, a three-dimensional color solid map is formed by allocating horizontal positions in an image, values produced by vertically accumulating macro blocks added with color information corresponding to aimed color indexes in the image, and distances to three axes.

Specifically, a three-dimensional color solid map can be created by simply arranging color histograms Hci(m) created in the histogram creating part 15. In this case, however, since the color histograms Hci(m) are placed in a fixed time interval, unless vehicle speed V is always constant, the placement of the color histograms in the time axis (traveling direction of vehicle) does not correspond to actual distances, with the result that an incorrect map will be created.

However, a color solid map created by this processing will help a driver to correctly understand a general distribution of objects of individual colors (a light source and a space corresponding to block pixels influenced by it) with respect to a traveling direction of the vehicle because the histograms are placed according to distances.

A color solid map created by this processing may be combined with map data obtained from external devices such as a vehicle navigator to map color indexes (color solid map) onto the map. In this case, a color solid map with increased accuracy of directions and positions can be created.

Referring back to FIG. 1, the environment recognition device 3 further comprises: an object index memory 20 that stores results of recognizing objects and situations being processing results in the color application program execution part 16 in association with image data (frames); a solid (three-dimensional) map memory 21 that stores a solid map as a processing result (solid map creation processing) in the color application program execution part 16; an abnormal condition detecting part 22 that outputs an abnormality notice to indicate an abnormal condition when a contradiction exists between the storage contents of the object index memory 20 and object related information from other devices; a situation description creating part 23 that automatically creates a situation description written in XML to describe a situation in the vicinity of the vehicle on the basis of the storage contents of the object index memory 20; and a display image data creating part 25 that creates image data for display according to display mode selection data DM on the basis of image data from the on-board camera 1, color information stored in the color index memory 14, and object recognition results stored in the object index memory 20.

The recognition results stored in the object index memory 20 include object indexes representative of individual objects (including objects detected in the above still object detection processing and preceding vehicle detection processing) actually existing such as preceding vehicles, oncoming vehicles, road signs, intersections, buildings, sky, and coast, and attribute indexes representative of states (including wiper operating state detected in the above-described wiper detection processing) recognized from the entire scene such as weather, congestion, and danger, or characteristics of their parts.

The abnormal condition detecting part 22 outputs an error notice to indicate that an abnormal condition occurs in the device 3 or devices supplying object related information when object related information from other devices such as intersection information obtained from map data of a navigation device, and information indicating an operation state of an actuating switch of a wiper is different from detection results in the above-described still object detection processing and the wiper detection processing.

The display image data creating part 25 creates color index image data and object index image data, and the like according to display mode selection data DM.

The color index image data is image data used when macro blocks added with color information corresponding to specified color indexes are extracted from a color information arrangement stored in the color index memory 14, and the extracted macro blocks are superimposed on image data from the on-board camera 1 for display.

The object index image data is image data used when recognition results and situations stored in the object index memory 20 is superimposed on image data from the on-board camera 1 for display.

The image data created in the display image data creating part 25 is displayed directly in the environment recognition device 3 or in a monitor indirectly connected via a communication line (on-board LAN etc.).

The situation description created in the situation description creating part 23, the solid map data stored in the solid map memory, and other various notices (danger notice, abnormality notice, and caution calling notice) are used as knowledge data for eliminating incorrect recognition factors when more advanced image recognition processing is performed.

The situation description and the solid map data are transmitted to other vehicles and base stations for collecting situation descriptions via a communication device mounted in the vehicle, and used as basic data of various applications. The various notices are used for notification to the driver and as a trigger for activating vehicle control corresponding to the notice contents.

As described above, in this embodiment, color information is added not in units of pixels but in units of macro blocks, and color arrangement information and color histogram that are represented in units of macro blocks are used, whereby objects and situations are recognized without having to perform area splitting (shape acquisition).

Accordingly, in comparison with conventional devices that adds color information and splits areas in units of pixels, processing load for recognizing objects and situations can be more significantly reduced, and objects and situations in color images can be more easily recognized.

In this embodiment, image data encoded by the MPEG format is inputted to the environment recognition device 3. Accordingly, the block average color calculating part 11 can easily obtain a block average color simply by decoding DC components of DCT coefficients contained in the image data, so that processing for obtaining an average color can be significantly reduced.

In this embodiment, when the histogram creating part 15 creates color histograms, the range of vertically accumulating macro blocks added with color information corresponding to aimed color indexes can be arbitrarily set.

Accordingly, according to the environment recognition device 3 of this embodiment, the influence of other objects that exist in a height in which a target object does not exist, and have the same color as the target object can be surely removed from the color histograms, and the accuracy of recognizing the target object using the color histograms can be increased.

In this embodiment, by obtaining inter-frame changes of average colors of macro blocks and inter-frame changes of color histograms Hci (k) and screen sum values SAr (k) of aimed colors, like object recognition, danger levels and caution calling situations are recognized without performing area splitting (shape acquisition). Accordingly, situations needing this type of urgency can be quickly recognized, and vehicle control and safety can be increased by using the recognition result.

In this embodiment, by comparing recognition results based on color arrangement information and color histograms with target related information obtained from external devices, when there is a contradiction between the both, the occurrence of an abnormal condition is determined. Therefore, the reliability of recognition results can be increased.

The first embodiment may be modified as follows.

In the first embodiment, the still object detection processing that detects objects by using color histograms is realized as one of processings performed by the processing part 19 of the color application execution part 16. However, this modification is constructed similarly to the first embodiment, except that this processing is performed by a special processor capable of vector operations. Therefore, in this modification, only portions different from the first embodiment will be described.

Figure 10:
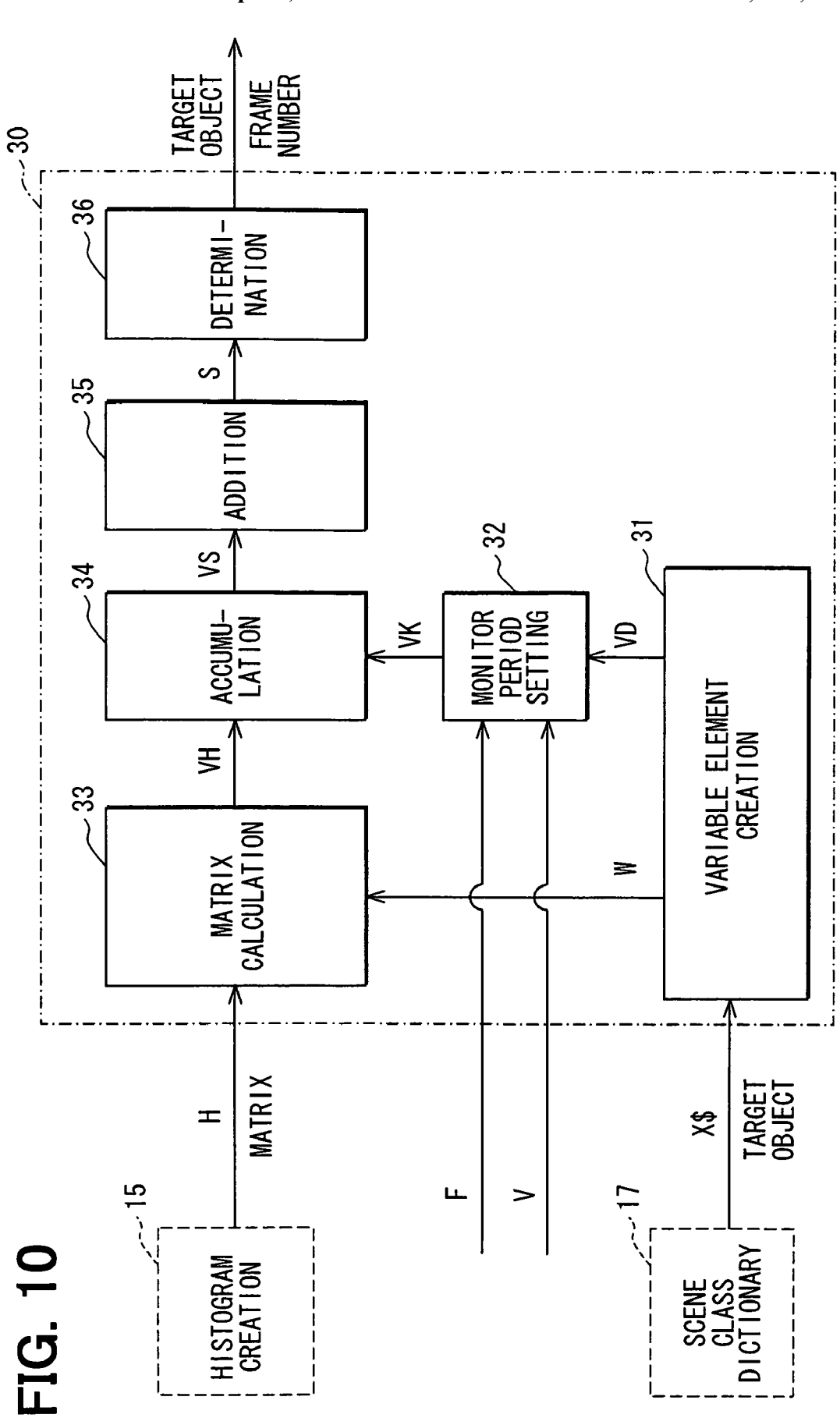
FIG. 10 is a block diagram showing a processor that uniformly executes object recognition by use of color histograms.

In this modification, as shown in FIG. 10, the color application program execution part 16 includes a processor 30 that inputs a target object X$, a frame rate F, vehicle speed V, and a color histogram matrix H and outputs the presence or absence of the target object.

The color histogram matrix H is a matrix with M rows and P columns (see the expression (17)) formed by arranging color histograms Hc1 to HcP for all color indexes created in the histogram creating part 15 on the basis of image data of a single frame. The color histogram matrix H created on a frame basis is successively supplied from the histogram creating part 15.

$$H=[Hc1, Hc2, \ldots, Hcp] \quad (17)$$

For a target object X$, like the processing in S110 of the still object detection processing (FIG. 4) in the first embodiment, when a scene is specified, one of objects corresponding to the specified scene is selected as a target object by searching the scene classification dictionary stored in the scene classification dictionary storage part 17. When no scene is specified, without using the scene classification dictionary, any one is selected in order (e.g., in descending order of importance) from all objects subject to recognition.

The processor 30 comprises: a variable element creating part 31 that creates a load coefficient matrix W and a distance vector VD corresponding to the target object X$; a monitoring period setting part 32 that creates a period vector VK according to the distance vector VD created in the variable element creating part 31 and the frame rate F and the vehicle speed V supplied from the outside; a matrix calculation part 33 that executes a matrix calculation between the color histogram matrix H and the load coefficient matrix W to create an evaluation unit vector VH; an accumulation part 34 that creates a color-specific evaluation vector VS by accumulating each element of the evaluation unit vector VH created in matrix calculation part 33 by one to plural frames according to the content of the period vector VK period set in the period setting part 32; an addition part 35 that creates a total evaluation value S by adding each element (color-specific evaluation value Sci) of the color-specific evaluation vector VS created in the accumulation part 34; and a determination part 36 that determines the presence or absence of the target object by comparing the total evaluation value S created in the addition part 35 with a preset determination threshold, and outputs a result of the determination.

The load coefficient matrix W is a matrix with P row and M columns (see the expression (19)) formed by arranging load coefficient vectors wci (see the expression (18)) formed by arranging M coefficients w1 to wM respectively corresponding to horizontal coordinates of macro blocks, for all color indexes.

$$wci = (w1, w2, \ldots, wM)^T \quad (18)$$

$$W = [wc1, wc2, \ldots, wcP] \quad (19)$$

The distance vector VD is a P-dimensional column vector (see the expression (20)) formed by arranging standard distances Dc1 to DcP respectively set for color indexes.

$$VD = (Dc1, Dc2, \ldots, DcP)^T \quad (20)$$

The period vector VK is a P-dimensional column vector formed by arranging monitoring periods Kc1 to KcP respectively calculated for color indexes, and is calculated by the expression (21).

$$VK = (Kc1, Kc2, \ldots, KcP)^T = VD \times F/V \quad (21)$$

The color-specific evaluation vector VS is a P-dimensional column vector (see the expression (22)) formed by arranging color-specific evaluation values Sc1 to ScP respectively calculated for color indexes.

$$VS = (Sc1, Sc2, \ldots, ScP)^T \quad (22)$$

Specifically, in the above still object detection processing, S110 to S120 correspond to the variable element creating part 31, S140 to S170 correspond to the period setting part 32, S180 to S190 correspond to the matrix calculation part 33 and the accumulation part 34, S200 correspond to the addition part 35, and S210 to S230 correspond to the determination part 36.

As described above, the processor 30 collectively calculates color-specific evaluation values (individual elements of the color-specific evaluation vector VS) Sci by vector operations, and automatically creates a different distance vector VK and load coefficient matrix W for each target object X$ to reflect them in the vector operations.

Accordingly, according to the environment recognition device 3 of this modification, even though the number and types of color indexes Sci required to calculate standard distance Dci, weight coefficient wci, and total evaluation value S are different depending on target object X$, these can be uniformly handled by the processor 30, and processing required to recognize objects can be simplified.

In addition, in this modification, the encoding part 2 performs encoding by the MPEG format, any encoding format may be used for encoding when the encoding is performed so that one component is representative of the average color of the block.

When the encoding part 2 is constructed so that encoding is performed in an encoding format not having components representative of average colors, the block average color calculating part 11 may be constructed to calculate average colors in units of blocks corresponding to macro blocks (16 pixels by 16 pixels).

Although, the vehicle speed V is obtained from other devices such as GPS and a vehicle speed sensor, the vehicle speed may be obtained by image processing. In this case, a vehicle speed can be calculated in this device, independently of fluctuations in frame rates. However, since vehicle speed V is calculated from an optical flow, the accuracy of vehicle speed V decreases. As vehicle speed V, a fixed value such as an average vehicle traveling speed (e.g., 50 km/h) may be used.

Second Embodiment

Figure 12A:
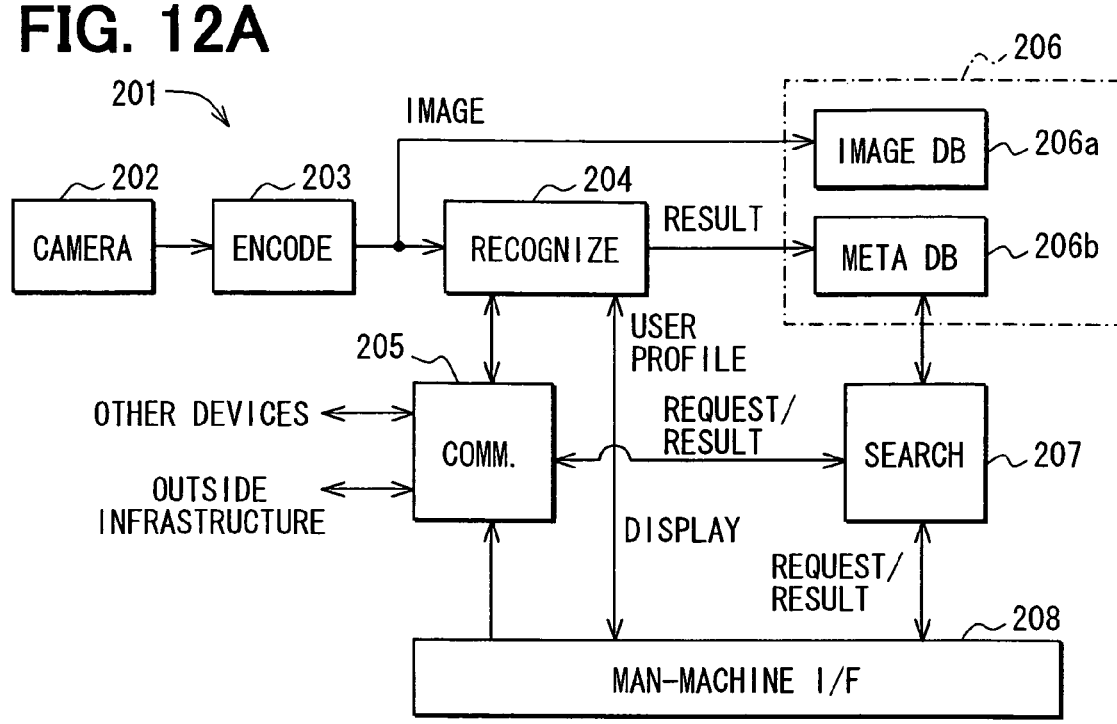
FIG. 12A is a block diagram showing an on-board system.

As shown in FIG. 12A, an on-board system 201 comprises: an on-board camera 202 for imaging scenes in front of a vehicle; an encoding part 203 that encodes a color image (monocular image) obtained from the on-board camera 202; and an environment recognition device 204 that creates object index data (hereinafter referred to as OBI data) representative of the results of recognizing objects existing in the color image and environment description data describing scenes shown in the image on the basis of image data encoded in the encoding part 203.

The on-board system 201 further comprises: a communication processing part 205 that performs communications to collect various data used in the environment recognition device 204 from the outside of the vehicle (information center or other vehicles) or from other on-board devices within the vehicle and deliver data created in the environment recognition device 204 to the outside of the vehicle; a vehicle database 206 that comprises an image database (DB) 206a storing image data from the encoding part 203, and a metadata database 206b storing recognition result data (OBI data and environment description data) from the environment recognition device 204 in association with the image data stored in the image database 206a; a man-machine IF part 208 that comprises an input device for inputting various commands, and a display device for displaying processing results in the environment recognition device 204; a search processing part 207 that performs searching for image data stored in the vehicle database 206 according to a query inputted via the communication processing part 205 or the man-machine IF part 208.

The on-board camera 202, which comprises a CCD camera that outputs color images, and the like, is disposed near the ceiling of the vehicle so that scenes in front of the vehicle can be imaged through a windshield. In this embodiment, an image of one frame comprises 352 pixels in the horizontal direction and 240 pixels in the vertical direction.

The encoding part 203 is a well-known module that performs encoding in the MPEG format. The image data encoded in the encoding part 203 is subjected to two-dimensional DCT (discrete cosine transform) so that DCT coefficients are described in units of pixel blocks (eight pixels by eight pixels). A direct present (DC) component in each pixel block is equivalent to the average value of the pixel block.

An image of one frame is split in units of macro blocks each consisting of 16 pixels by 16 pixels (in this embodiment, one frame consists of M (=22) by N (=15) macro blocks). The macro block is represented by four pixel blocks Y0, Y1, Y2, and Y3 representative of luminance (Y component), and two pixel blocks U and V representative of color differences (U and V components). The macro block is equivalent to a pixel block in this embodiment.

Figure 11:
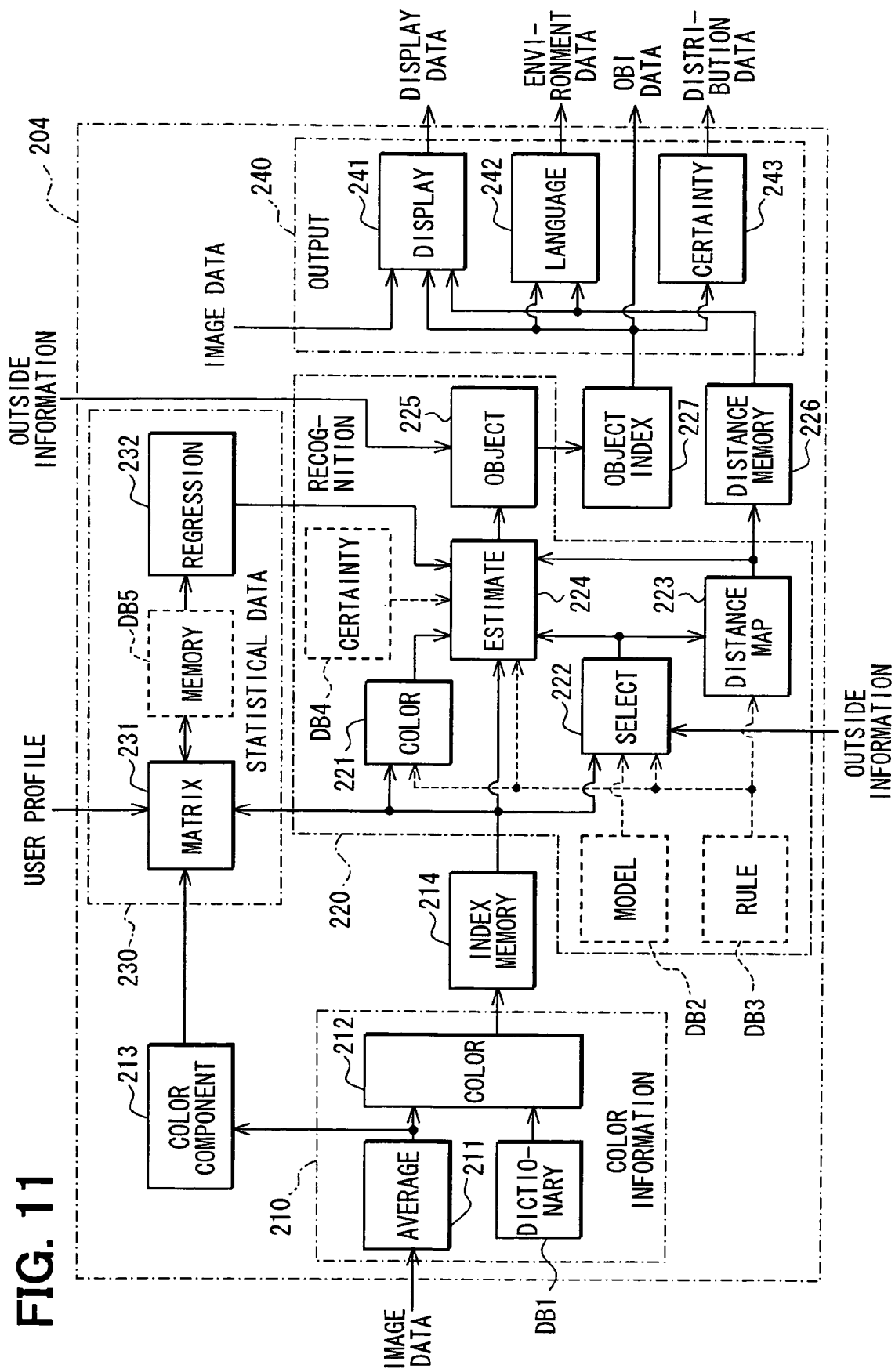
FIG. 11 is a block diagram showing an environment recognition device according to a second embodiment of the present invention.

As shown in FIG. 11, the environment recognition device 204 comprises: a color information creating part 210 that, when the image data captured from the encoding part 203 is an intra-frame (I frame), obtains information about the average color of the image data (I frame), in units of macro blocks; a color component value memory 213 that stores color component values being information created in the color information creating part 210; and a color index memory 214 that stores a color information arrangement being information created in the color information creating part 210.

The environment recognition device 204 further comprises: a recognition processing part 220 that recognizes surrounding environment shown in a color image on the basis of the color information arrangement from the color index memory 214; a distance map memory 226 that stores a distance map (described later) being a processing result in the recognition processing part 220; an object index memory 227 that stores OBI data being a processing result in the recognition processing part 220; a statistical data collecting and analyzing part 230 that creates regression coefficients used in the recognition processing part 220 by collecting the storage contents of the color component value memory 213, the color index memory 214, the distance map memory 226, and the object index memory 227 and performing statistical processing; and an output information creating part 240 that creates various output information on the basis of the storage contents of the distance map memory 226 and the object index memory 227, and image data supplied from the encoding part 213.

The color information creating part 210 comprises: a block average color calculating part 211 that, based on the image data captured from the encoding part 203, calculates the average color of the image data in units of macro blocks; a color dictionary storage part DB1 that stores a color dictionary palette defining color vocabularies (hereinafter referred to as color indexes) used in this device; and a color determining part 212 that, by referring to a color dictionary palette stored in the color dictionary storage part DB1, determines to which color index the average color of the macro block calculated in the block average color calculating part 211 corresponds, and creates the determination result as color information.

The block average color calculating part 211, of the encoded image data, for the six pixel blocks Y0 to Y3, U, and V associated with a macro block, obtains their average colors by decoding DC components of their respective DCT coefficients. However, for the four pixel blocks Y0 to Y3 representative of luminance, the average value of their respective DC components is defined as the average color of Y component of the macro block. The three average values calculated in units of macro blocks are stored in the color component value memory 213 in association with the macro block as color component values.

Figure 13A:
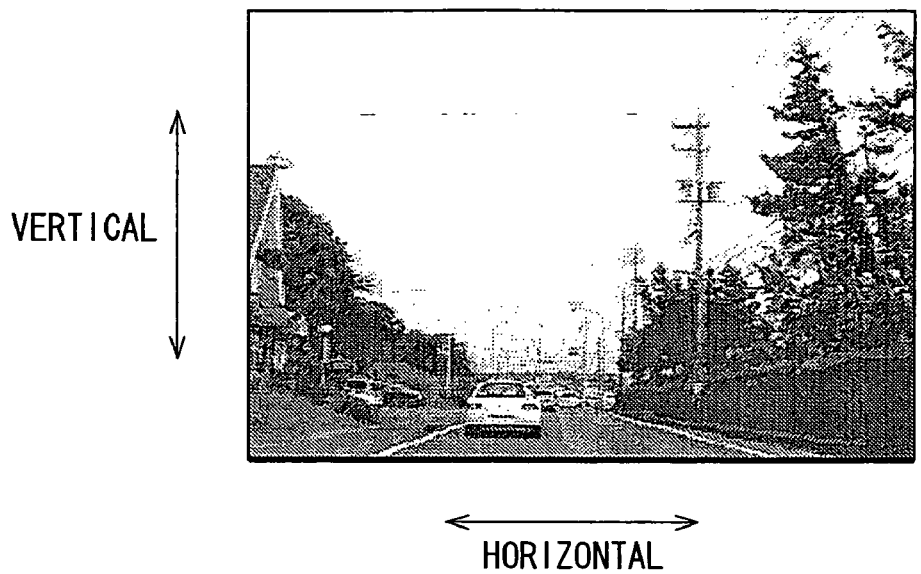
FIGS. 13A and 13B are explanatory diagrams concerning calculation of an average color of each macro block.
Figure 13B:
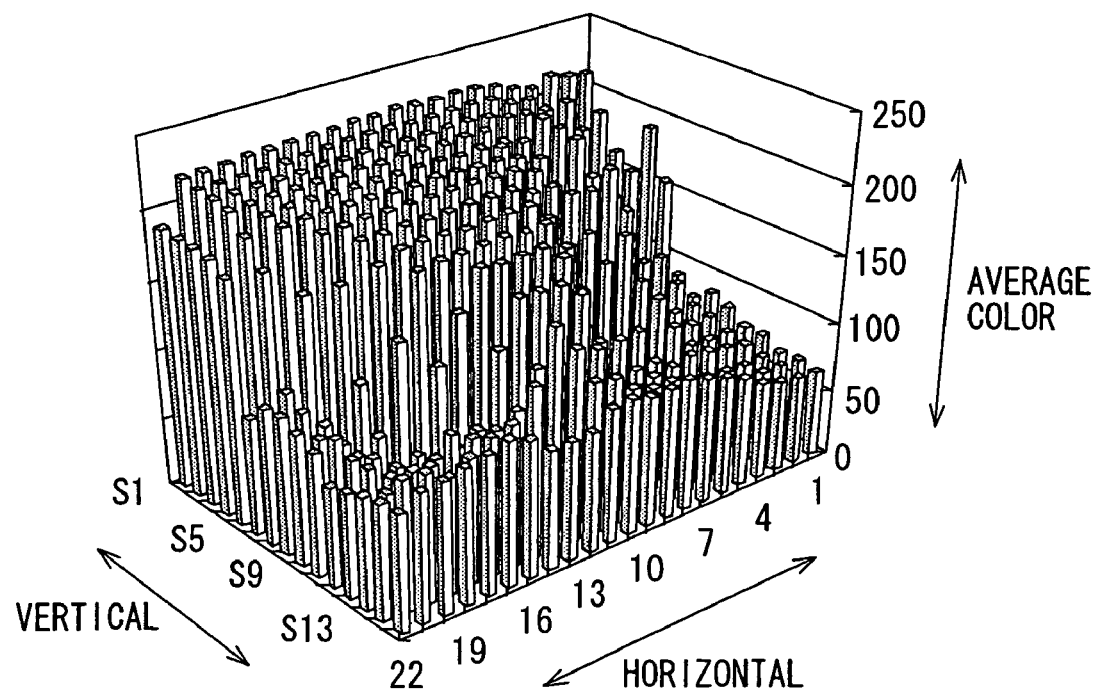

FIG. 13A shows a sample picture image imaged by the on-board camera 202, and FIG. 13B is a three-dimensional graph showing the respective average colors of macro blocks calculated by the block average color calculating part 211 when the sample image is processed. This graph is with respect to Y component. Similar graph may be created also for U and V components. Hereinafter, a direction (the lateral direction in FIG. 13A) corresponding to the lateral direction of the vehicle in images by the on-board camera 202 will be referred to as a horizontal direction, and a direction orthogonal to it will be referred to as a vertical direction.

In the color dictionary storage part DB1, color indexes of the following Pco colors (Pco=7 in this embodiment) are used.

[Blue, Green, Red, Yellow, White, Gray, and Black]

In a color dictionary palette, each color index is associated with thresholds (upper limit, lower limit) set using a selected color system (YUV in this embodiment).

In this embodiment, with one of the color indexes as ci (i=1, 2, . . . , Pco), the lower limit and the upper limit of Y component of the color index ci will be represented as $LY_{ci}$ and $HY_{ci}$, respectively, the lower limit and the upper limit of U component as $LU_{ci}$ and $HU_{ci}$, respectively, and the lower limit and the upper limit of V component as $LV_{ci}$ and $HV_{ci}$, respectively.

The color indexes are not limited to the above seven colors. When colors can be classified to suit human sense, other colors may be used, or the number of color indexes may be increased, or decreased. However, in terms of the structure of thresholds, the number of color indexes should be preferably several colors including the three primary colors and black and white.

When the respective average colors of Y, U, and V components calculated for each macro block in the block average color calculating part 211 are AY, AU, and AV, the color determining part 212 determines to which color index ci the color of the macro block corresponds, using the thresholds defined in the color dictionary palette and inequalities shown in the following expressions (23) to (25) defined for each color index using the color dictionary palette, and creates the determination result (that is, one of the color indexes) as color information of the macro block. Only one of upper limit and lower limit defined in the inequalities.

$$LY_{ci} \leq AY < HY_{ci} \quad (23)$$

$$LU_{ci} \leq AU < HU_{ci} \quad (24)$$

$$LV_{ci} \leq AV < HV_{ci} \quad (25)$$

Figure 38:
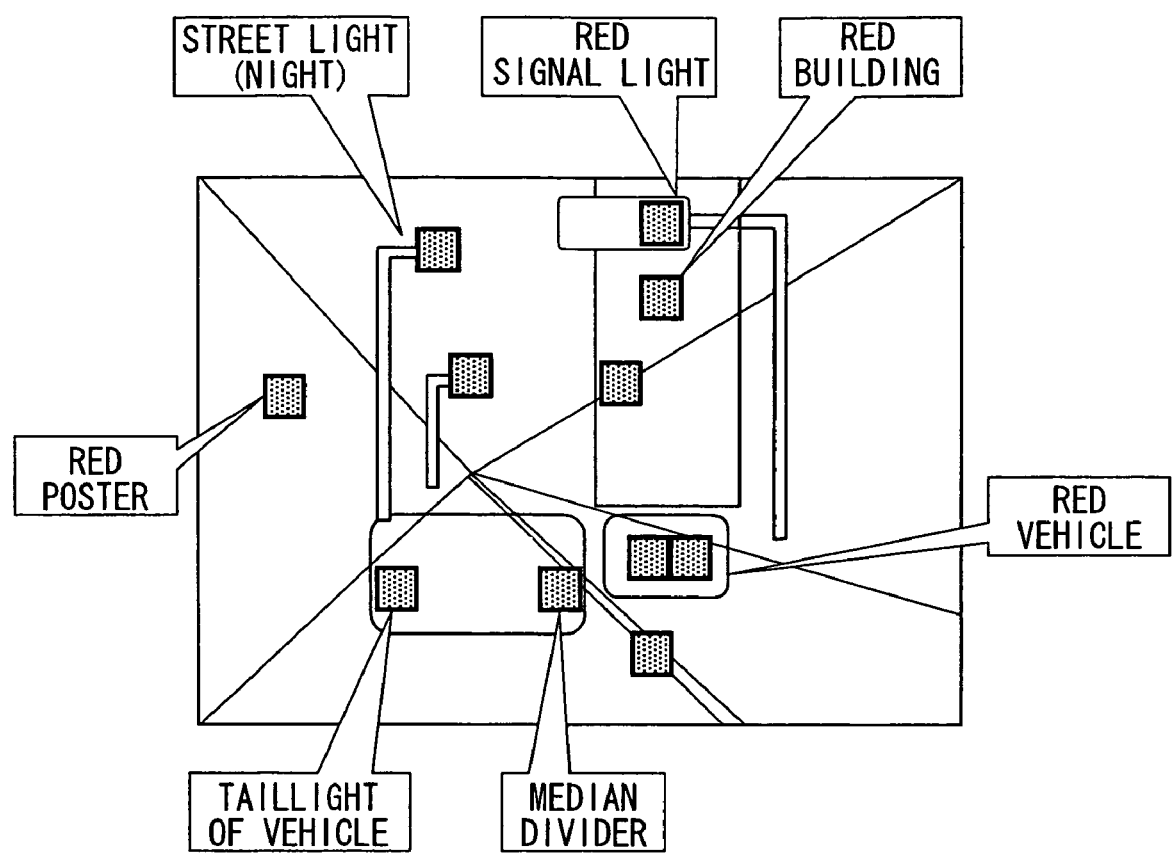
FIG. 38 is an explanatory diagram concerning addition of color information.

Color information thus created is stored in a color index memory 214 in association with the macro block as described above. Hereinafter, the color information associated with the macro blocks will be referred to as a color information arrangement. FIG. 38 shows an example of objects added with a red color index (red signal, red building, red vehicle, tail lights of a preceding vehicle, streetlights (only during night driving), etc.) in scenes frequently appearing during traveling on regular roads.

A recognition processing part 220 comprises: a model storage part DB2 that stores scene patterns representative of typical static environments appearing in a color image by splitting the screen of the color image into partial areas having same characteristics, and road structure models representative of typical patterns of a three-dimensional structure in the vicinity of roads shown in a color image; a rule storage part DB3 that stores restriction rules used for determination and estimation executed in individual parts described later; a color information processing part 221 that executes recognition of simple objects, based on color arrangement information and the restriction rules; a model selecting part 222 that selects view patterns and road structure models that match the images of processing objects from the storage contents of the model storage part DB2 according to the color arrangement information and the restriction rules; and a distance map creating part 223 that creates a distance map showing a three-dimensional arrangement of macro blocks, based on the color arrangement information from the color index memory 214 and the road structure models selected in the model selecting part 222.

Moreover, the recognition processing part 220 comprises: an estimation part 224 that creates a certainty degree vector (described later) for each macro block by executing rule base estimation that executes estimation by applying various restriction rules to color arrangement information from the color index memory 214, simple recognition results from the color information processing part 221, and information obtained from a view map selected in the model selecting part 222 and a distance map created in the distance map creating part 223, and statistical estimation by use of regression coefficients created in the statistical data collecting and analyzing part 230; a certainty degree initial value storage part DB4 that stores the initial values of certainty degree vectors created by the estimation part 224; an object determining part 225 that determines objects to be associated with individual macro blocks, based on certainty degree vectors created in the estimation part 24 and external information obtained via the communication processing part 5 (see FIG. 12A).

The color information processing part 221 creates a histogram representative of the distribution of macro blocks added with color information corresponding to an aimed color index. From a pattern of the histogram and time change, in real time it determines whether specific objects (e.g., streetlight, signal light, and preceding vehicle) exist in an image. This processing is described with respect to the first embodiment.

The rule storage part DB3 stores knowledges about objects to be recognized, as various restriction rules. There are two different levels of objects: those that represent individual matters (preceding vehicles, oncoming vehicles, road signs, intersections, green areas, buildings, sky, coast, etc.), and those that represent attributes (weather, traffic congestion, etc.) extracted from characteristics of the whole or parts of image.

The restriction rules include at least classification of objects. As a typical example, Table 3 shows classification with attention focused on color indexes, and Table 4 show classification with attention focused on motion. In the classification with attention focused on motion, static objects are motionless objects that serve as the background of an image, semi-static objects are motionless objects that exist temporarily, and dynamic objects are actually moving objects.

TABLE 3

| Color index | Object index |
| --- | --- |
| Blue | sky (fine), sign, advertising board, signal light, sea, vehicle, . . . |
| Green | green area, street trees, mountain, sign, advertising board, signal light, vehicle, . . . |
| Red | stop light, winker, streetlight, sign, advertising board, signal light, vehicle, median strip, building, pedestrian, red leaves, train, . . . |
| Yellow | sign, advertising board, signal light, building, vehicle, train, . . . |
| White | crosswalk, white line, vehicle, cloud, snow, snow mountain, smoke, sky (cloudy), building, train, guardrail, advertising board, . . . |
| Grey | sky (cloudy), vehicle, road, building, elevated structures, utility pole, . . . |
| Black | wiper, vehicle, shadow, tire, . . . |

TABLE 4

| Scene | Object index |
| --- | --- |
| Static object | building, signal light, intersection, sign, advertising board, . . . |
| Semi-static object | parking vehicle, pool, fallen leaves, temporary material for construction, . . . |
| Dynamic object | preceding vehicle, oncoming vehicle, motorcycle, bicycle, pedestrian, aircraft, train, ship, cloud, smoke, sky (weather), bird, animal, . . . |

Figure 14:
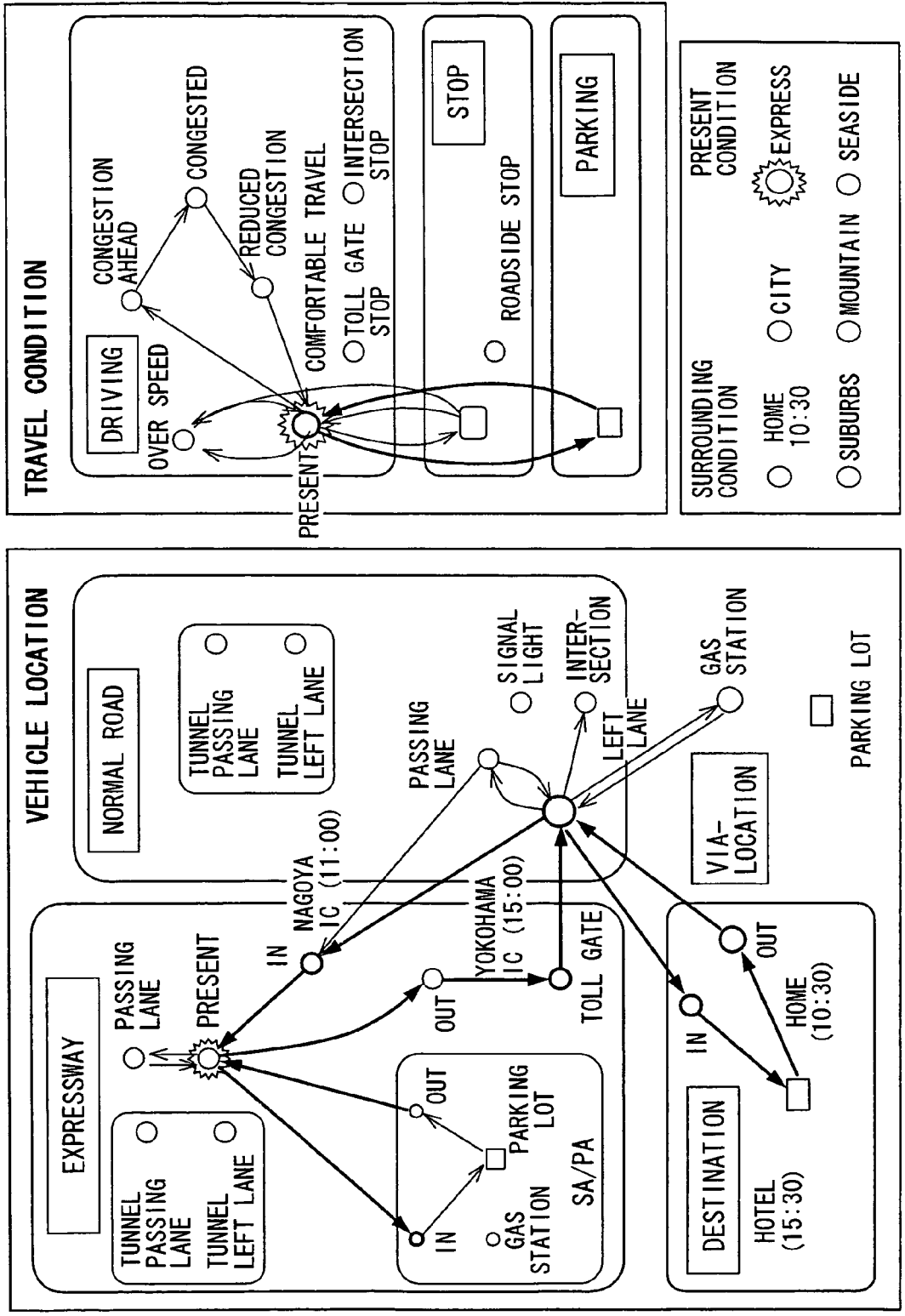
FIG. 14 is a state transition diagram showing transition of operation conditions of a vehicle.

Furthermore, the restriction rules, as shown in FIG. 14, include a state transition diagram showing the transition of vehicle operation conditions (existence place and operation conditions), and object classification with attention focused on the operation conditions. Table 5 shows object classification with attention focused on existence places.

Rules made based on the correspondences and the like shown in FIG. 14 and Tables 3 to 5 are used when estimation is executed in the estimating part 224.

TABLE 5

| Existence place | Object index |
| --- | --- |
| Parking lot | Entrance, cargo loading, engine startup, surrounding confirmation, starting and going outside, . . . |
| Outdoor parking lot | entrance, vehiclego loading, engine startup, surrounding confirmation, starting and going onto a regular road, . . . |
| Regular load, | Start, straight traveling, joining, course change, lane change, right turn, |
| expressway | left turn, slowdown, speedup, intersection, signal, stop, . . . |
| Others | Intersection, signal, tollgate, service station, riding in, engine startup, surrounding confirmation, start, straight traveling, joining, course change, right turn, left turn, slowdown, speedup, . . . |

In the rule storage part DB3, restriction rules on image characteristics described below are stored.

(A) Luminance of the whole screen, luminance of area, and time change of luminance (B) Dominant color on the whole screen, dominant color of area, other constituting color components, and time change of color (C) Motion direction, motion magnitude, and time change of motion (D) Size of contiguous areas (hereinafter referred to simply as area) added with a same color index, and time change (E) Area shape and time change (F) Position in an image in which an area exists (G) Time area where an area exists (H) Positional relationship among plural areas (including hierarchy)

(1) Partial Area of View Pattern

Furthermore, the rule storage part DB3 stores knowledges about partial areas (road, building, sky, green area, etc.) of a view pattern, and scenes (intersection etc.) identified from the view pattern.

Specific restriction rules of this type are shown below.

There are often many stopping vehicles and right and left turning vehicles at an intersection.

Often, persons get out and get in through a building.

There is often a signal in an intersection.

Within a range of a fixed height of on roads, there are no advertising board, signal light, and sign.

An object that approaches on a same lane is often a preceding vehicle.

An object that approaches on an opposing lane is often an oncoming vehicle.

Motion within the screen is often observed in its lower right portion.

Tail lights are often in both ends of the back of a vehicle.

Figure 15:
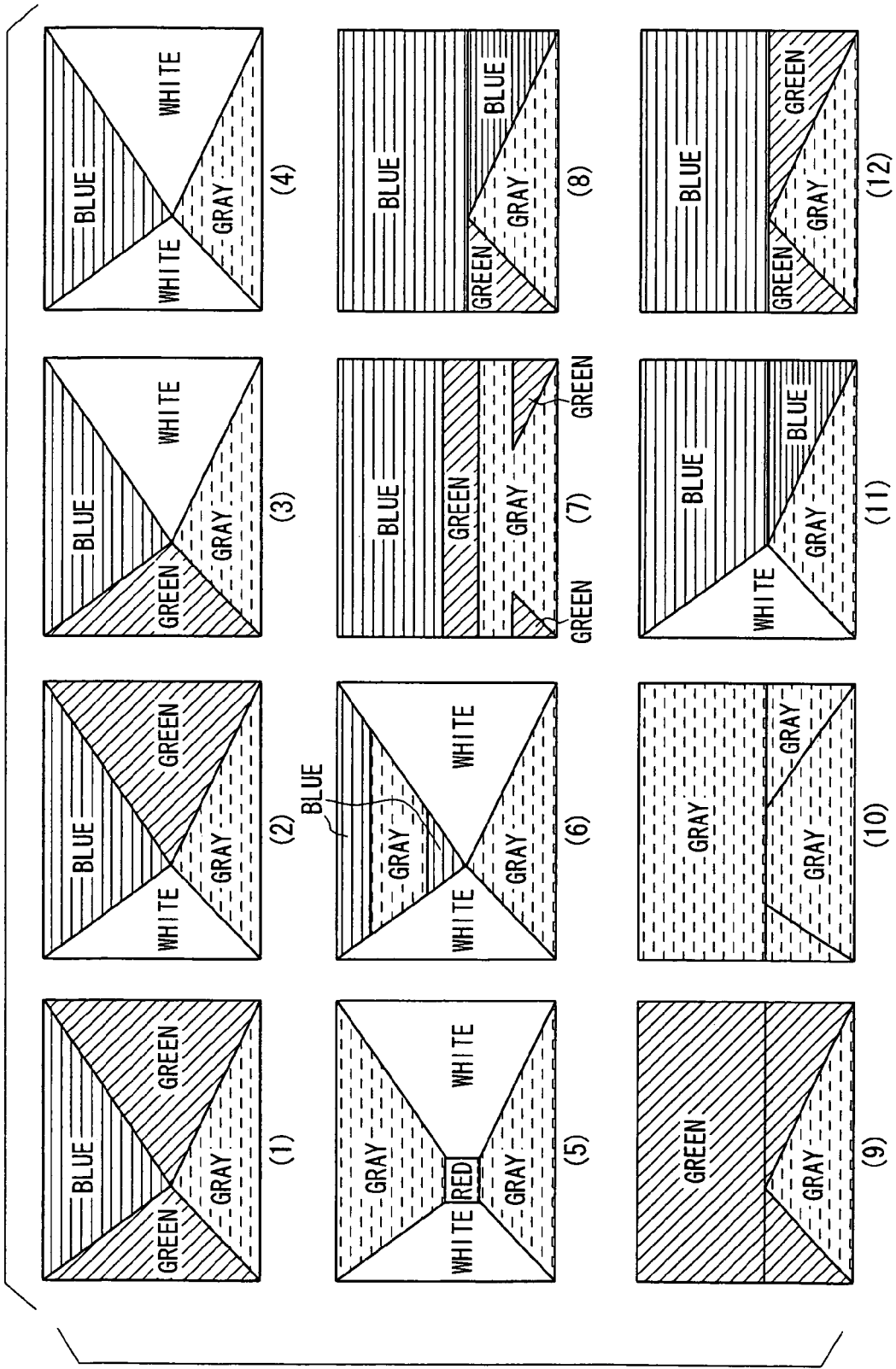
FIG. 15 is a collection of view patterns.

View patterns stored in the model storage part DB2 are patterns by splitting static sceneries (static objects) appearing frequently in an image to be processed into plural partial areas with attention focused on color information, and several specific examples of them are shown in FIG. 15. Characters within parentheses in the figure designate the colors of the areas.

FIG. 15 shows view patterns showing the following cases: (1) there are green areas at both sides of a road; (2) there is a building at the left of a road and a green area at the right of the road; (3) there is a green area at the left of a road and a building at the right of the road; (4) there are buildings at both sides of a road; (5) there are walls in front of and at both sides of a vehicle (indoor parking lot); (6) a vehicle is traveling under an elevated structure (overpass, under a railway track); (7) there are a green flat (field, etc.) in front of and at both sides of a road; (8) there is a green area at the left of a road and a water surface (sea, lake, etc.) at the right of the road; (9) there are green areas (mountain, etc.) in front of and at both sides of a road; (10) there is a wall in front of the vehicle like in an indoor parking lot; (11) there is a building at the left of a road and a water surface at the right of the road; and (12) there are green flats at both sides of a road.

Since the colors of partial areas in view patterns depend on the existence of natural light sources (sun, moon), and man-made light sources (street lights, etc.), time zones, and weather, view patterns with these conditions taken into account may be provided. Several specific examples of them are shown in FIG. 16.

Figure 16:
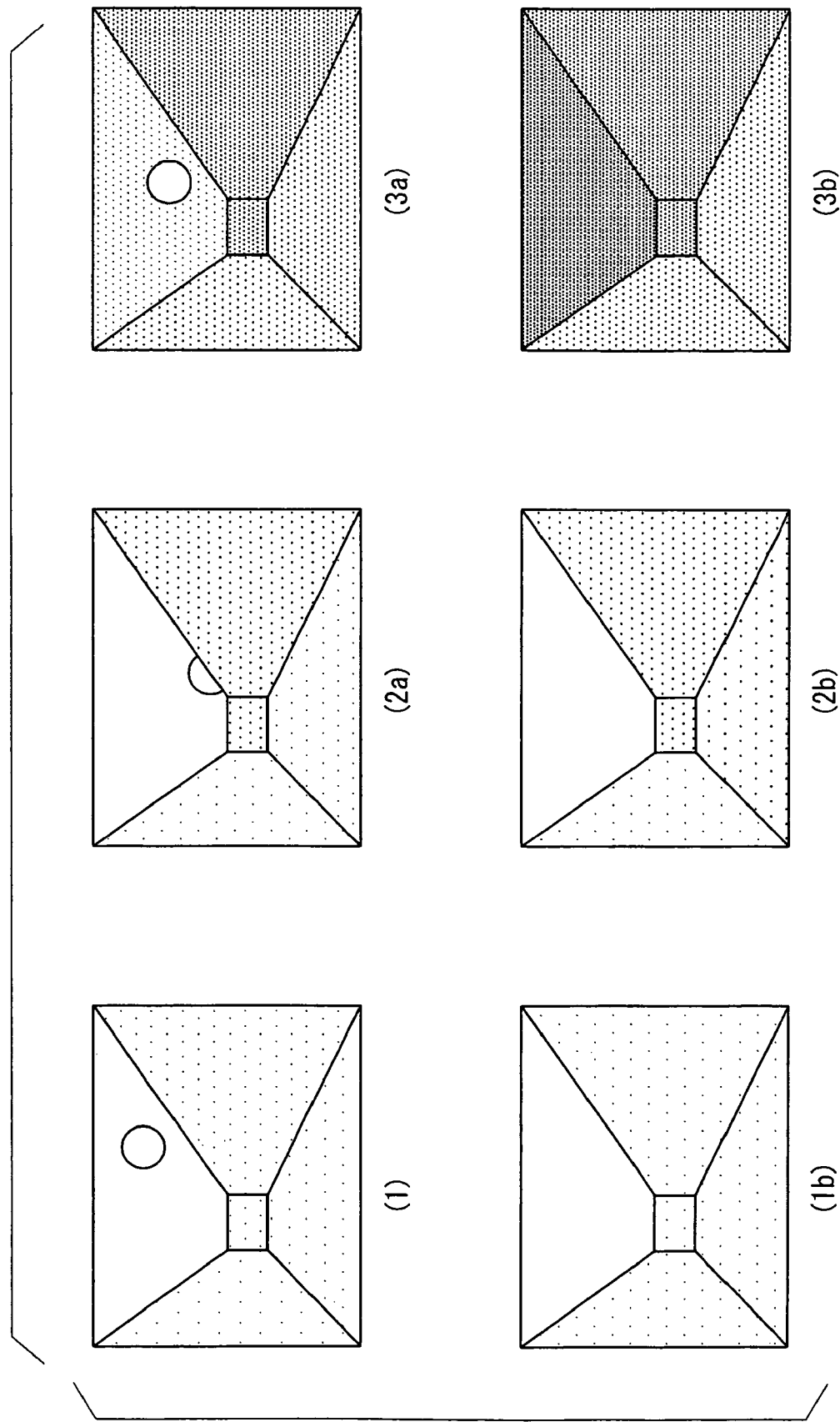
FIG. 16 is a collection of view patterns with the presence or absence of a light source, and time zones taken into account.

FIG. 16 shows view patterns showing the following cases: (1a) and (1b) are in daytime; (2a) and (2b) are in the evening; and (3a) and (3b) are in nighttime, wherein (1a), (2a) and (3a) show cases where the sun or moon exists within sight as indicated with a circle mark, and (1b), (2b) and (3b) show cases where the sun or moon does not exist within sight.

Road structure models stored in the model storage part DB2 are box-type models assumed about spatial structures in the vicinity of a road, which are main subjects of on-board camera images. Several typical specific examples of them are shown in FIGS. 17A to 17F.

Figure 17D:
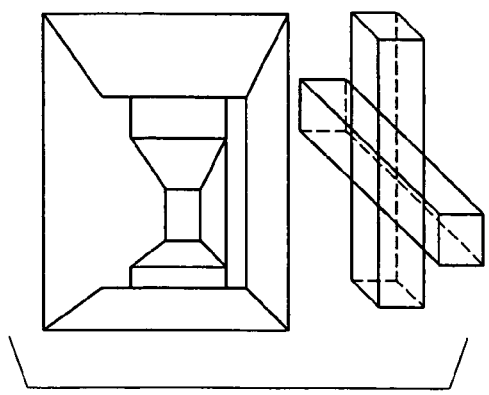
FIGS. 17A to 17F are examples of road structure modes.
Figure 17C:
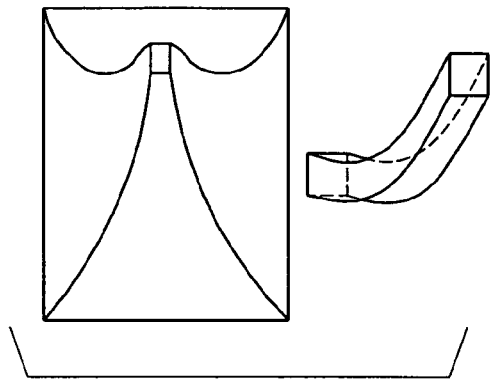
Figure 17B:
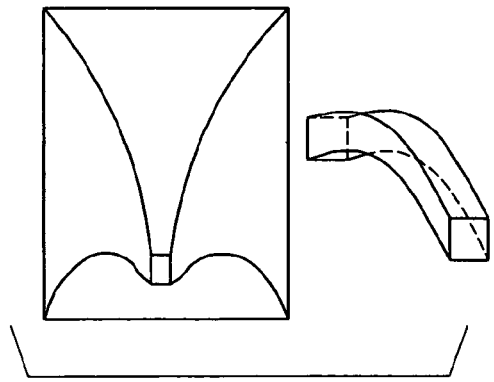
Figure 17F:
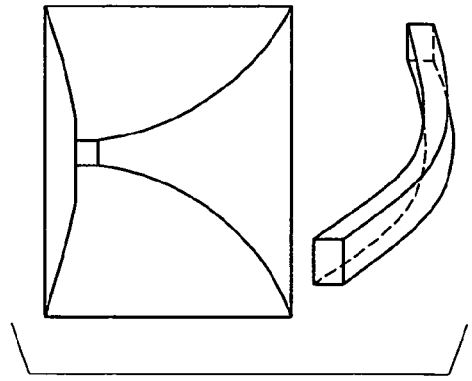
Figure 17A:
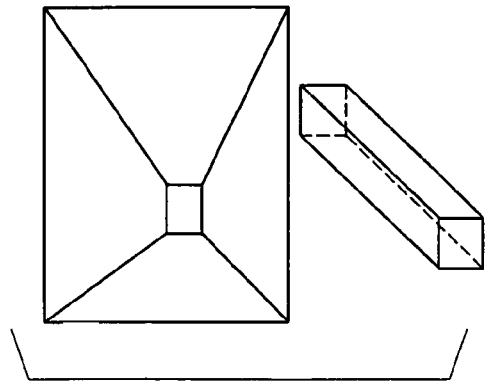
Figure 17E:
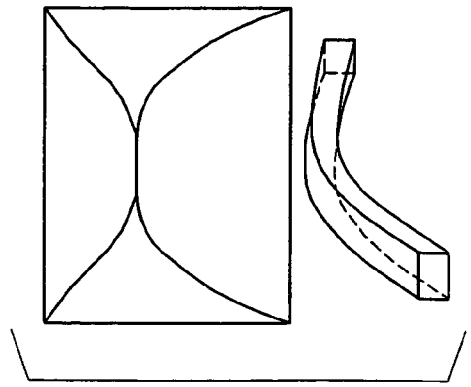

FIG. 17A shows a straight traveling model indicating a straight road. FIG. 17B shows a left curving model indicating a left curving road. FIG. 17C shows a right curving model indicating a right curving road. FIG. 17D shows an intersection model indicating a cross. FIG. 17E shows an up-down model indicating the existence of a downward slope after an uphill slope. FIG. 17F shows a down-up model indicating the existence of an uphill slope after a downward slope.

In each figure, a road structure model is shown at a lower part, and an example of a view model corresponding to the road structure model is shown at an upper part.

The model storage part DB2 stores, in addition to view models and road structure models stored in advance, view models and road structure models acquired as required from other on-board equipment (e.g., a device for reading CD and DVD) within the vehicle or the outside of the vehicle via the communication processing part 205.

The model selecting part 222 selects a view pattern suited for a present position (that is, an image to be processed) on the basis of external information obtained via the communication processing part 205, particularly in this embodiment information such as a present position, an operating state of the vehicle, weather, time, and a map in the vicinity of the present position that are acquired from other equipment (e.g., navigation device) within the vehicle, and a state transition diagram (see FIG. 14) stored in the rule storage part DB3.

In selection of a view pattern, consideration is given to the existence and position of a light source (natural light source, man-made light source) estimated from a present position, a traveling direction of the vehicle, season, time zone, weather, and the like. However, when a view model and a road structure model are supplied as information about a present position, the supplied view model and road structure model are selected.

Figure 18:
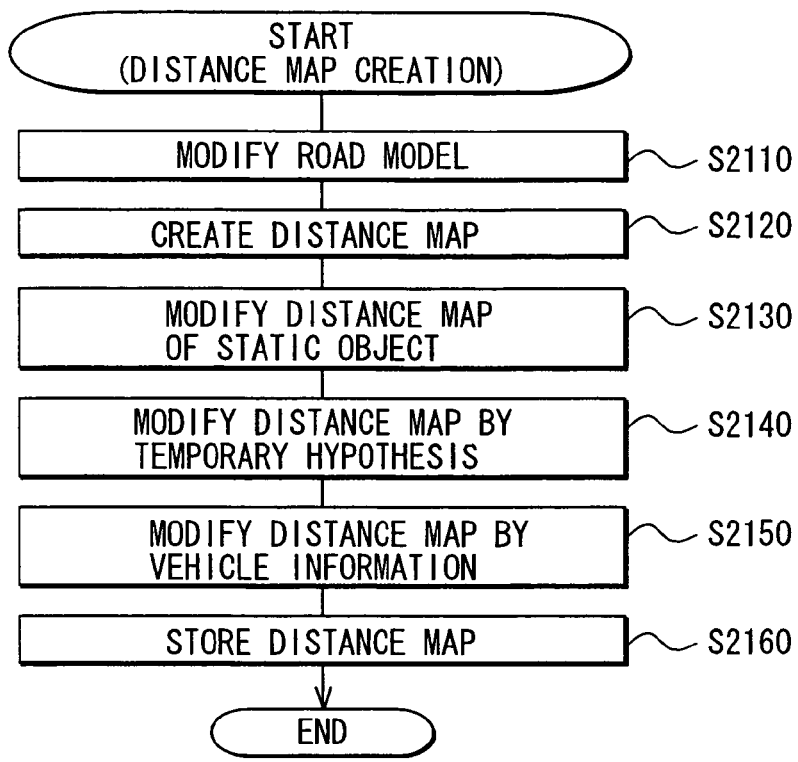
FIG. 18 is a flow chart showing distance map creation processing.

Next, distance map creation processing performed by the distance map creating part 223 is described with reference to a flow chart shown in FIG. 18.

In this processing, a road structure model selected in the model selecting part 222 is modified based on information about a road in a present position and an operating state of the vehicle (S2110). Specifically, a road width, a curving degree of a road, and a slope degree of the road in the road structure model are modified based on map data in the vicinity of the present position, a vehicle speed, a steering angle, and a yaw rate that are acquired as external information. The modifications may be made using information acquired from the history of road structure models used previously, or autonomous sensing based on image data.

Figure 19:
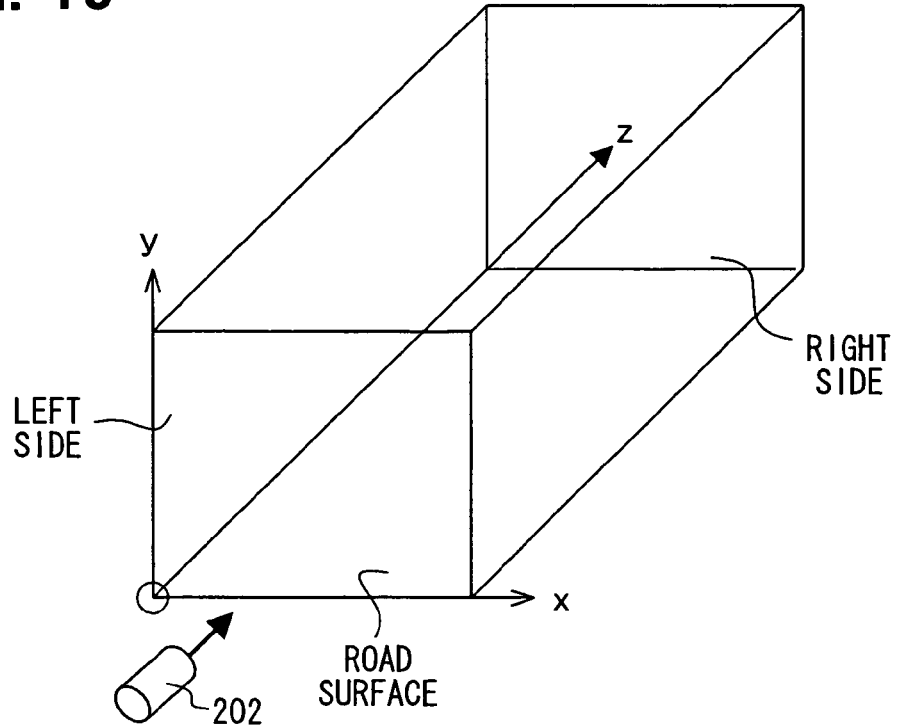
FIG. 19 is an explanatory diagram showing a road structure model (straight traveling model)
Figure 20A:
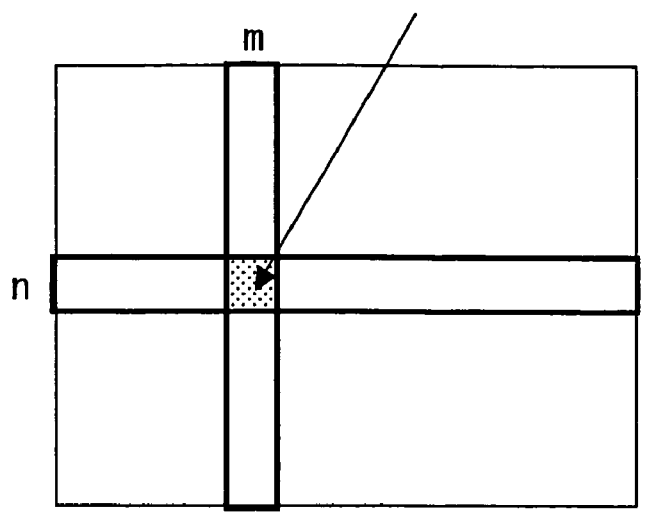
Figure 20B:
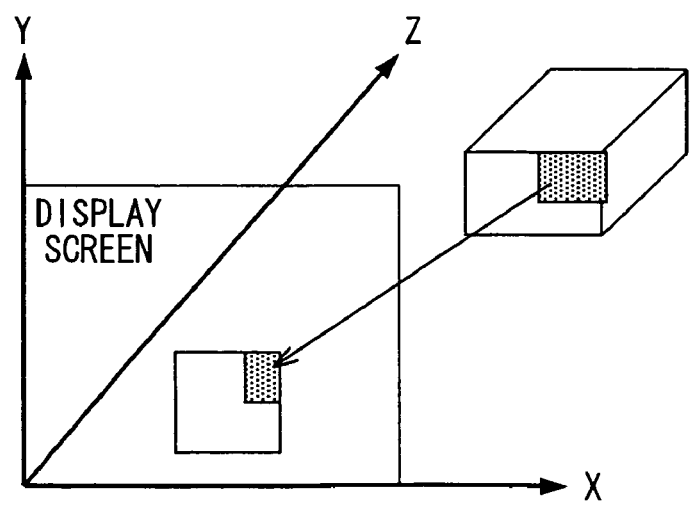

A display map is initialized using the modified road structure model (S2120). For example, in the case of a straight traveling model, as shown in FIG. 19, a road structure model of rectangular parallelepiped shape is obtained, and coordinates with a lateral direction of the vehicle as x axis, its vertical direction as y axis, and a traveling direction of the vehicle as z axis are assumed. As shown in FIGS. 20A and 20B, by associating the road structure model and macro blocks on the display screen, as shown in FIG. 20C, three-dimensional coordinates of each macro block are obtained. Macro blocks corresponding to partial areas corresponding to the sky in the view model are added with a preset maximum value (200 in FIG. 20C) as a value in the z-axis direction.

When space points inside the box of the road structure model shown in FIG. 19 are sampled at an equal interval and are projected in perspective on a distance map, density is high in the vicinity of a vanishing point of the distance map, and density is lower in positions nearer to the on-board camera 202 (that is, vehicle). As a result, there will occur a situation in which meaningless computations increase in the vicinity of the vanishing point and the distance map cannot fill in a space near to the camera. Accordingly, during perspective projection, variable density sampling is performed in which sampling density is made lower in the vicinity of the vanishing point in the image and spatial sampling density is made higher in positions nearer to the on-board camera 202.

Figure 21:
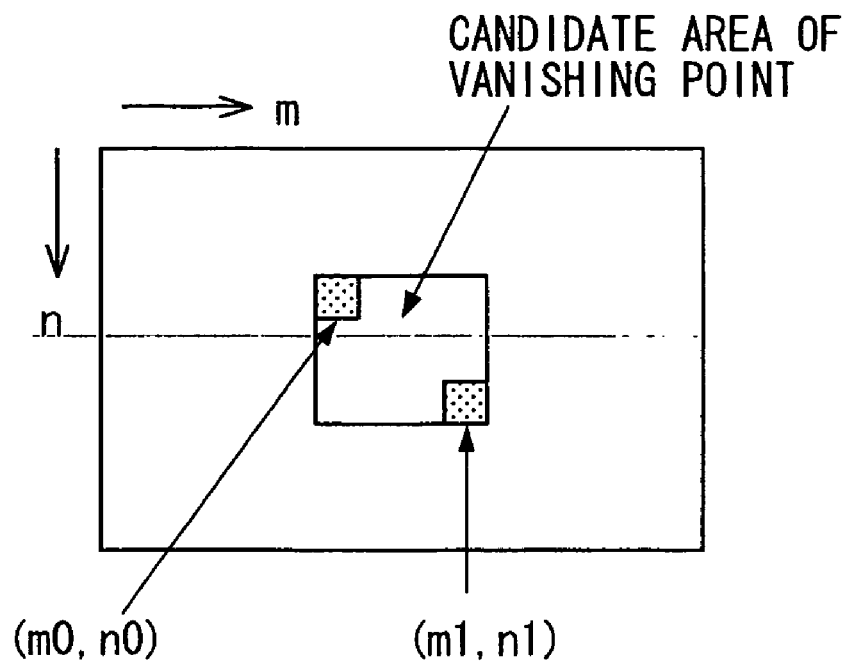
FIG. 21 is an explanatory diagram showing a method of detecting a vanishing point.

To calculate a vanishing point, a candidate area of the vanishing point in an image is set as shown in FIG. 21, and a macro block having the smallest in-frame difference in the area is defined as a vanishing point. The candidate area may be a fixed area set in advance, or a variable area set based on a vanishing point calculated previously. As an in-frame difference, a total value of an in-frame difference obtained for each of the respective components of Y, U and V is used.

After the distance map has been initialized in this way, modification of the distance map concerning static objects (S2130), modification of the distance map based on sky hypothesis (S2140), and modification of the distance map based on vehicle information (S2150) are performed. The modified distance map is stored in the distance map memory 226 (S2160), and this processing is terminated.

In S2130 (modification of the distance map concerning static objects), specifically, the distance map is modified by adding static objects recognized in the color information processing part 221, and static objects (not shown in the road structure model) shown in previous distance maps created in same positions and same time zones to the distance map. However, the distance map may be replaced with a distance map, if any, supplied as external information from an information center.

In S2140 (modification of the distance map based on sky hypothesis), when the average color of Y component of a macro block MB (m, n) calculated in the block average color calculating part 211 is defined as AY (m, n), on the basis of the hypothesis that sky areas satisfy the expression (26) (referred to as sky hypothesis), the depth information (z value) of macro blocks not satisfying the expression is modified.

$$AY(m,n) \geq Yth \qquad (26)$$

Yth is a threshold indicating a minimum luminance when an area is sky. As modification of z value, a preset fixed value may be used as a modification value, or a variable value set based on information obtained from other on-board devices may be used as a modification value.

Figures 22A, 22B, 22C:
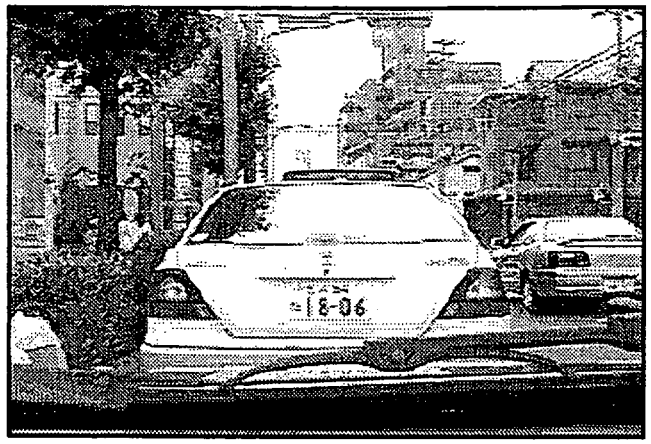
FIGS. 22A to 22C are explanatory diagrams concerning distance map modification based on sky hypothesis.

When an image shown in FIG. 22A is obtained, the distance map before modification based on the sky hypothesis is shown in FIG. 22B, and the distance map after the modification is shown in FIG. 22C. As shown in FIGS. 22A to 22C, for areas such as buildings and street trees existing in sky areas on the view map (road structure model), depth information (z value) is modified because the expression (26) (that is, sky hypothesis) is not satisfied.

Furthermore, in S2150 (modification of the distance map based on vehicle information), when a preceding vehicle is recognized in the color information processing part 221, a vehicle model is disposed in a preset vehicle candidate area in the distance map. For a potion in which the vehicle model is disposed, all x, y and z values of the distance map are replaced with preset values. A simple box is adopted as the vehicle model because detailed x, y and z values cannot be obtained so long as a vehicle type cannot be decided, and the accuracy of a macro block unit is sufficient for the distance map.

However, when a vehicle type can be identified by reading a radio tag via the communication processing part 205 or inter-vehicle communications, the shape and size of the vehicle model may be set.

Figures 23A, 23B, 23C:

FIGS. 23A to 23C are explanatory diagrams showing a specific example of modification of a distance map based on vehicle information. FIG. 23A shows an example of an image to be processed, FIG. 23B shows a distance map before modification based on vehicle information, and FIG. 23C shows the distance map after the modification. FIGS. 23B and 23C show only values (z values) in the depth direction.

Estimation processing executed by the estimating part 224 is described with reference to a flow chart shown in FIG. 24.

Figure 24:
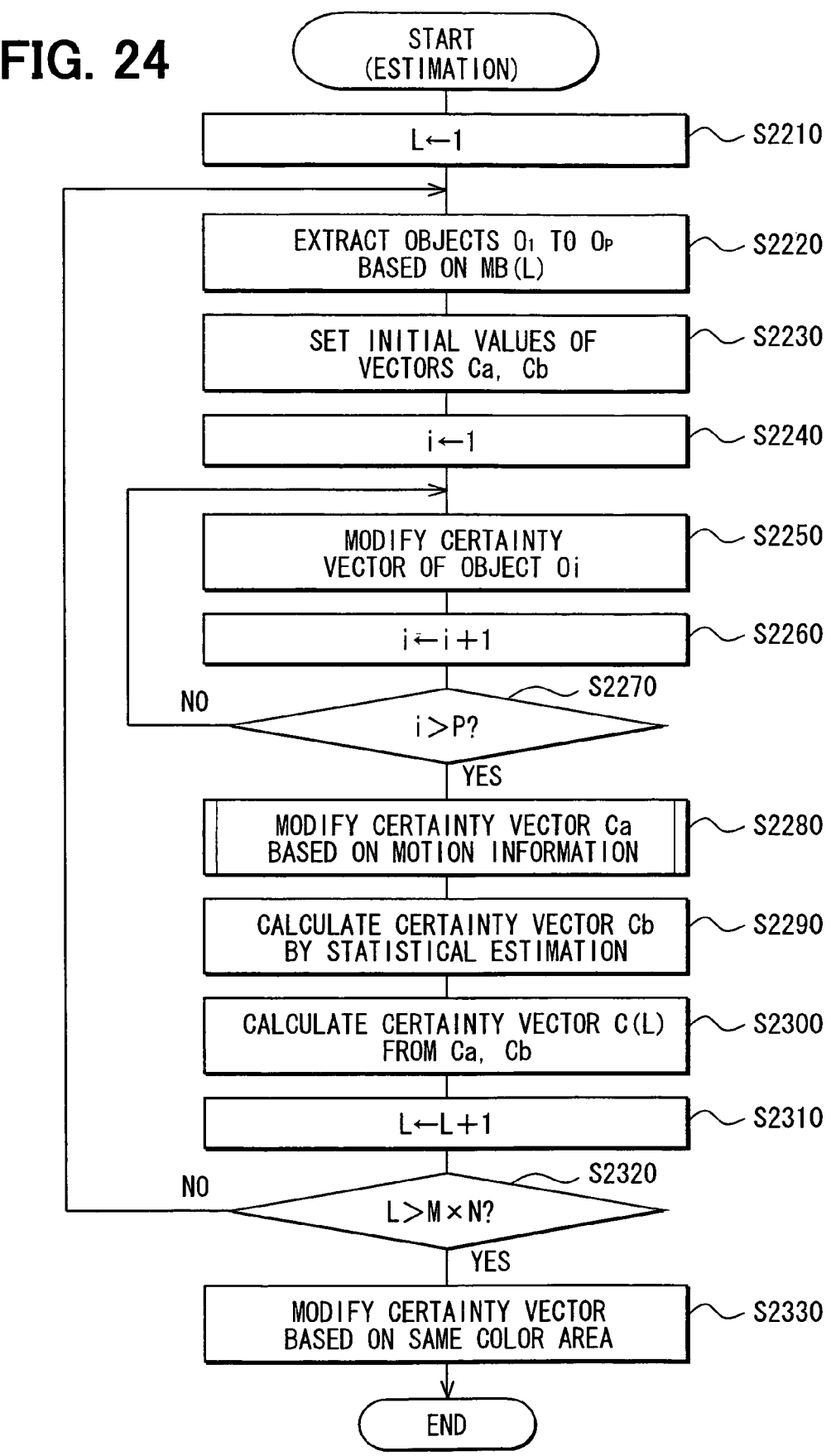
FIG. 24 is a flow chart showing estimation processing.

As shown in FIG. 24, in this processing, the estimating part 224 sets a parameter L for specifying a macro block to 1 (S2210), and extracts objects $O_1$ to $O_p$ on the basis of color information of the macro block MB (L) identified by the parameter L, and the correspondences between the color indexes and the objects shown in Table 3 (S2220). The macro block MB (L) represents one of M by N macro blocks MB (m, n) identified by coordinates m, n by the parameter L instead of the coordinates m, n. Each of all macro blocks MB (m, n) corresponds to any one of macro blocks MB (1), MB (2), . . . , MB (M×N).

The estimating part 224 creates a certainty degree vector C for the objects $O_1$ to $O_p$ extracted in S2220, and sets its initial value (S2230).

The certainty degree vector C is a P dimensional vector defined by the expression (2), wherein the certainty degree that an aimed macro block MB(L) is an aimed object Oi (i=1, 2, . . . P) is Ci.

$$C = (C_1, C_2, \ldots C_p)^T \qquad (27)$$

Hereinafter, a certainty degree vector created based on the rule base estimation will be referred to as Ca, and a certainty degree vector created based on statistical estimation will be referred to as Cb.

Figure 25:
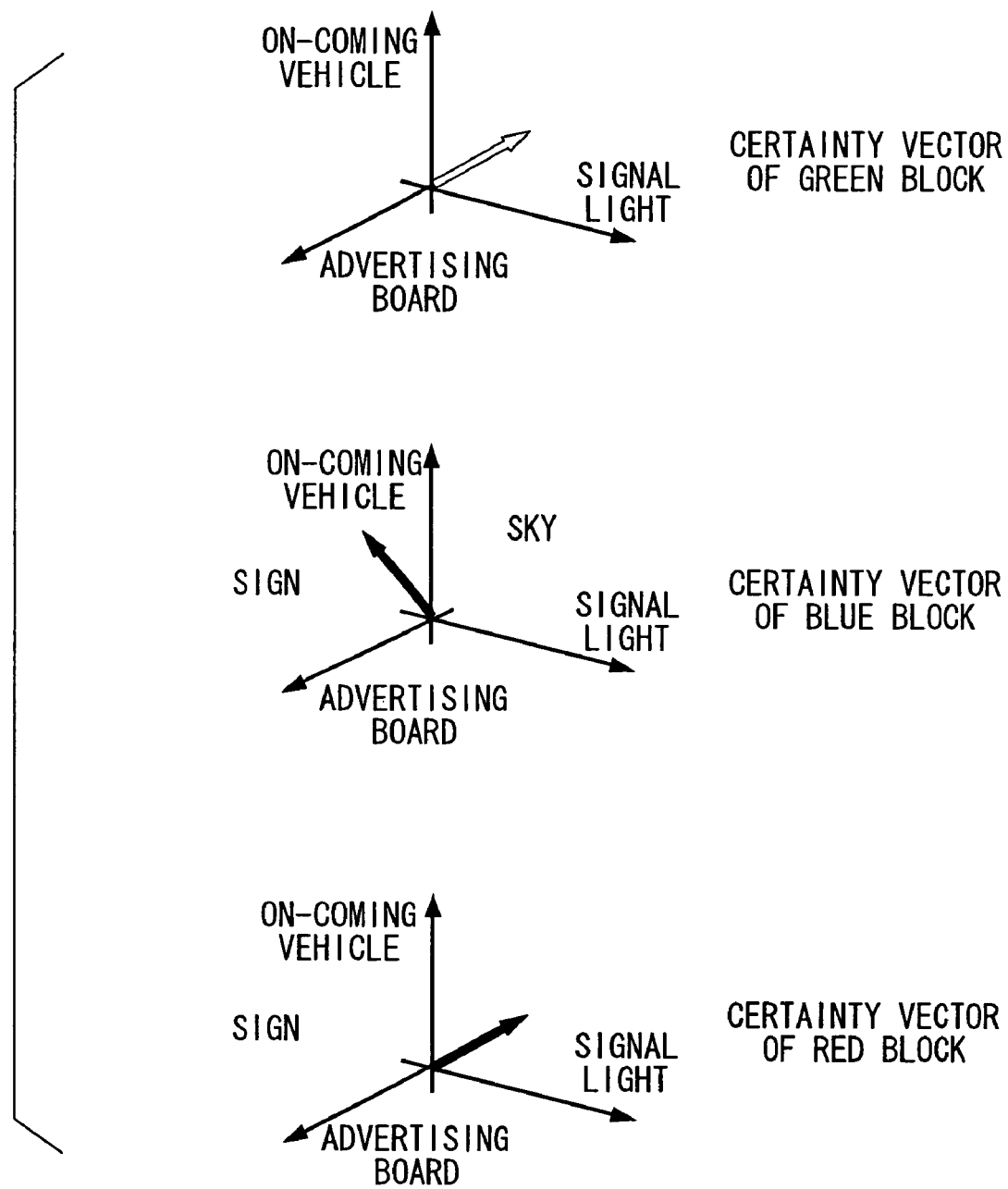
FIG. 25 is an explanatory diagram concerning an initialization of certainty degree vectors corresponding to color information.

In certainty degree vectors Ca based on the rule base estimation, based on color information of the macro block MB (L) and a view model selected in the model selecting part 222, initial values Ca0 provided in advance are set according to in which partial area of the view model the macro block MB (L) is positioned. FIG. 25 shows an example of initial values Ca0 of certainty degree vectors afforded according to the color information (green, blue, and red) of the macro block MB (L).

In certainty degree vectors Cb based on statistical estimation, initial values Cb0 provided in advance are set according to a present position.

These initial value Ca0 and Cb0 are stored in advance in the certainty degree initial value storage part DB4. The initial values Ca0 and Cb0 stored in the certainty degree initial value storage part DB4 may be updated as required by external information supplied from the outside of the vehicle via the communication processing part 205.

Next, the estimating part 224 sets a parameter i for specifying an object Oi to 1 (S2240), and modifies the certainty degree Ci of an object Oi according to a decision rule stored in the rule storage part DB3 (S2250).

Specifically, the three-dimensional position of the macro block MB(L) is acquired based on the distance map created in the distance map creating part 223, and restriction rules about the three-dimensional position (e.g., "within a range of a fixed height of on roads, there are no advertising board, signal light, and sign."), and restriction rules about partial areas of the view model to which the macro block MB (L) belongs (e.g., "Often, persons get out and get in through a building.") are applied.

Then, the estimating part 224 increments the parameter i (S2260), determines whether the parameter i is greater than the number of objects P (S2270). When the parameter i is equal to or smaller than the number of objects P, since objects Oi not processed exist, the processing returns to S2250 to repeat processing of S2250 to S2270. On the other hand, when the parameter i is greater than the number of objects P, since individual modifications on all objects Oi have terminated, the estimating part 224 modifies the certainty degree vectors Ca by use of motion information (S2280).

Figure 26:
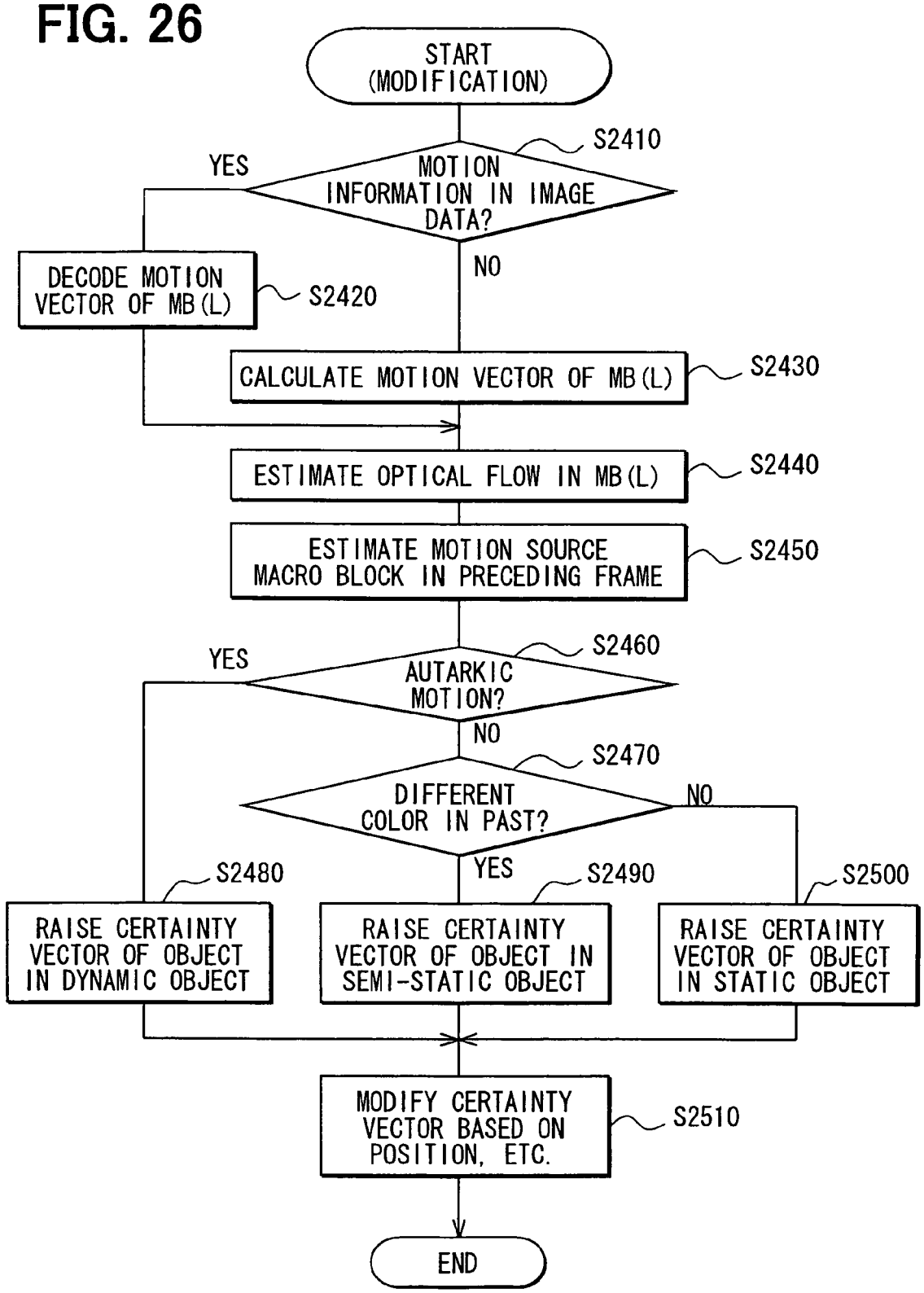
FIG. 26 is a flow chart showing modification processing based on motion.

The modification processing in S2280 is described in detail with reference to a flow chart shown in FIG. 26.

This processing determines whether motion information is added to image data inputted to the environment recognition device 204 (S2410). When motion information is added, it decodes the motion vector of the macro block MB (L) (S2420). When motion information is not added, calculates a motion vector of the macro block MB (L) from the image data (S2430).

Next, the estimating part 224 estimates an expected pattern of an optical flow in the macro block MB (L), based on motion (straight traveling, left turn, right turn, stop, etc.) of the on-board camera 202 (that is, subject vehicle) determined from external information (vehicle speed, steering angle, GPS information, etc.) obtained via the communication processing part 205 (S2440), and further estimates a motion source macro block that is a macro block of a preceding frame corresponding to the macro block MB (L) by using the well-known motion compensating prediction and the like (S2450).

The estimating part 224 determines the presence or absence of autarkiC(autonomous) motion as an object from a difference between the optical flow estimated in S2440 and the motion vector acquired in S2420 or S2430 (S2460). On determining that autonomous motion as an object is present, it raises the certainty degree vectors Ca so that the certainty degrees of the objects $O_1$ to $O_p$ belonging to the dynamic objects shown in Table 4 become higher (S2480).

Figure 27:
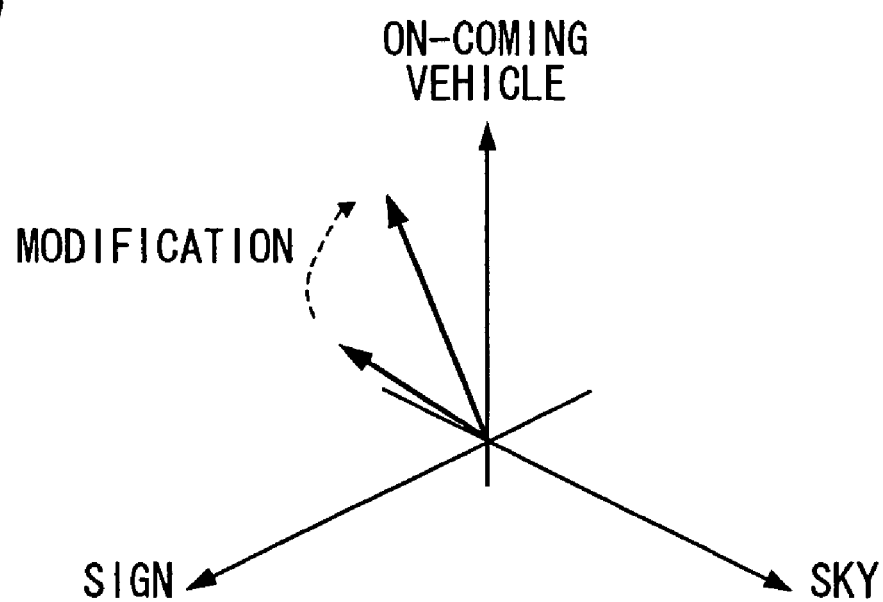
FIG. 27 is an explanatory diagram concerning a modification of certainty degree vector when motion is present.

In this case, for example, in the macro block MB (L) added with a blue index as color information, [sky, sign, signal, advertising board, preceding vehicle, oncoming vehicle, etc.] are conceivable as an object. However, the certainty degree vectors Ca, as shown in FIG. 27, change to be nearer to dynamic objects such as [oncoming vehicle, . . . ] than static objects such as [sky, sign, . . . ].

On determining in S2460 that autarkic motion as an object is absent, the estimating part 224 determines whether the macro block MB (L) had color information different from the present color information in the past, based on past information (history of macro block MB(L)) acquired in the same place and the same time zone (S2470). When affirmative determination is made, it modifies the certainty degree vectors Ca so that the certainty degrees of the objects $O_1$ to $O_P$ belonging to the semi-static objects shown in Table 4 become higher (S2490). When negative determination is made, it modifies the certainty degree vectors Ca so that the certainty degrees of the objects $O_1$ to $O_p$ belonging to the static objects shown in Table 4 become higher (S2500).

After modifying the certainty degrees in any one of S2480 to S2500, the estimating part 224 modifies the certainty degree vectors Ca by using restriction rules about information (position, color information, certainty degree vector, etc.) about the motion source macro block estimated in S2450 (S2510), and terminates this processing.

In this processing, the certainty degree vectors Ca are modified with attention focused on motion information. However, for example, when the macro block MB (L) exists in a partial area corresponding to the sky in the view model, when the above sky hypothesis (see the expression (1)) is satisfied, the certainty degree vectors Ca may be modified so that a certainty degree about the sky becomes high.

Referring back to FIG. 24, for the P objects $O_1$ to $O_p$ extracted in S2220, the estimating part 224 calculates the certainty degree vectors Ca, based on statistical estimation by using the expression (28) (S2290).

[Expression 9]

$$Cs = Cs0 + \sum_{r=1}^{R} Wr \times Sr \qquad (28)$$

A factor vector sr is set for each of R types of factors Dr (r=1, 2, . . . R) that would influence the certainty degree vectors Cb, such as situations (natural environment, time zone, etc.) during photographing, and image characteristics of a macro block (color, block position, threshold, etc.), and is a Qr-dimensional vector formed by arranging Qr pieces of information representative of the factors Dr. The factor vector sr is set based on information about images to be processed that are stored in the color component value memory 13, the color index memory 14, and the distance map memory 26, and information representative of a present situation (during photographing) that is supplied as external information via the communication processing part 5.

A regression coefficient matrix Wr is set for each of factors Dr, and is a matrix with P rows and Qr columns representative of a set of regression coefficients set for a factor Qr of each of objects Oi. This regression coefficient matrix Wr is calculated in the statistical data collecting and analyzing part 230 described later.

Figure 28:
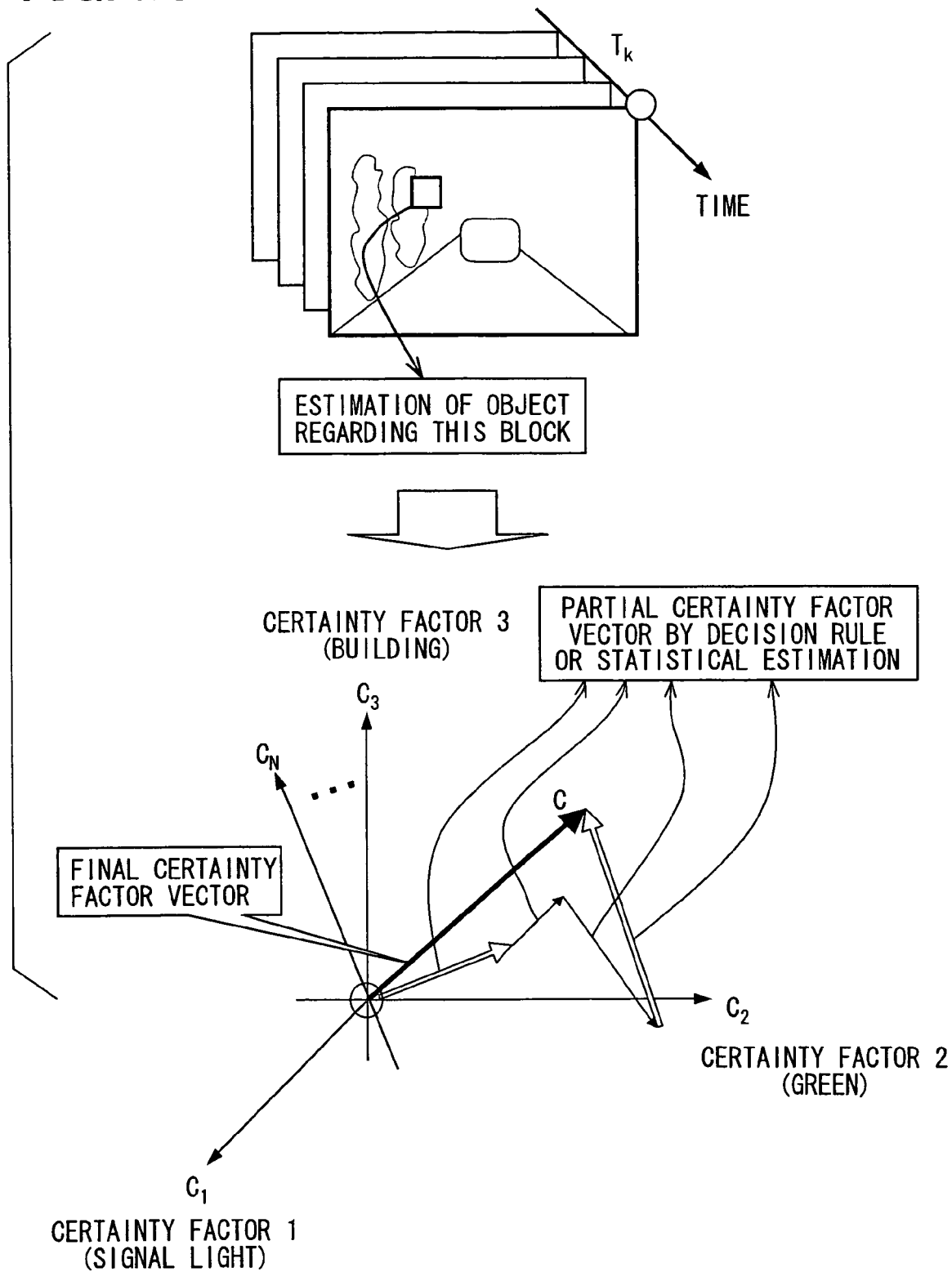
FIG. 28 is an explanatory diagram concerning an overlapping of certainty degree vectors.

The estimating part 224 calculates an integrated certainty degree vector C(L) about the macro block MB (L) by vector-adding the certainty degree vectors Ca based on the rule base estimation that are calculated and modified by the processings of S2230 to S2280, and the certainty degree vectors Cb based on the statistical estimation calculated in S2230 and S2290 (S2300). In the vector addition, simple additions may be used, or weighting additions may be used. That is, the certainty degree vector C(L) may be regarded as a synthesis of plural partial certainty vectors as shown in FIG. 28.

Then, the estimating part 224 increments the parameter L (S2310), and determines whether the parameter L is larger than the number M×N of macro blocks (S2320). When negative determination is made in the S2320, since macro blocks MB(L) not processed exist, it repeats the processings of S220 to S2320. On the other hand, when affirmative determination is made, since certainty degree vectors C(1) to C(M×N) have been calculated for all macro blocks, finally, the estimating part 224 modifies certainty degree vectors C(1) to C(M×N) based on a same color area of macro blocks (S2330), and terminates this processing.

The same color area of macro blocks is an area consisting of adjacent macro blocks each having same color information, and rule base estimation is performed using restriction rules about the number of macro blocks constituting the same color area (area size), a rough shape of the area, and color information of the area.

Specifically, when the number of macro blocks constituting a same color area fits within a prescribed range set for each of objects, for all macro blocks MB (L) belonging to a same color area, the estimating part 224 modifies the certainty degree vector C(L) so that the certainty degree of a pertinent object becomes high.

When an area in which an object has been determined by external information and the like exists, the certainty degree vector C(L) may be modified using restriction rules about a positional relationship (scene structure) with the determined area.

Furthermore, without being limited to information of same color areas, for example, with attention focused on a specific color, when macro blocks added with color information corresponding to a red color index exist in a row in a horizontal direction within a range in which a preset vehicle possibly exists, on the assumption of tail lights of a preceding vehicle, the certainty degree vectors C(L) of macro blocks in the vicinity of the preceding vehicle may be modified so that the certainty degree about the preceding vehicle becomes high.

In this way, by processing in the estimating part 224, M×N certainty degree vectors C(1) to C(M×N) respectively corresponding to macro blocks are created.

The object determining part 225 determines the objects to be associated with the macro blocks, based on the certainty degree vectors C(1) to C(M×N) created in the estimating part 224, and external information acquired via the communication processing part 205, and stores the determination result in the object index memory 227.

External information used in the object determining part 225 is present position information, map information, measurement information from on-board measuring instruments such as a radar, and prior information about road environments distributed from the outside of the vehicle. The prior information is, specifically, sign information describing installation position, shape, direction, color, and the like of signs, signal information describing installation position, shape, direction, present lighting color, and the like of signal lights, vehicle information describing present position, speed, direction, traveling road, lane, model, color, and the like of individual vehicles (including vehicles in blind spots), macro information describing situations around a present position (a rough number of vehicles, road type, congestion status, etc.), and landmark information describing the position, shape, color, and the like of landmarks.

The object determining part 225 gives an object having the highest certainty degree in the certainty degree vector C(L) as an object index of the macro block. When an object to be associated with an aimed macro block is apparent from external information (particularly prior information), without relying on the certainty degree vector C(L), high priority is given to an object determined from external information, or objects considered to be obviously inexistent in a present scene from external information are excluded from determination candidates.

The statistical data collecting and analyzing part 230, as shown in FIG. 11, comprises: a measurement matrix creating part 231 that creates a measurement matrix, based on storage contents of the color component value memory 213, the color index memory 214, the distance map memory 226, and the object index memory 227, a selection result in the model selecting part 222, external information supplied via the communication processing part 205, and a user profile and instruction data supplied via the man-machine IF part 208 (associations in the figure are shown only partially); a measurement matrix storage part DB5 that stores measurement matrixes created by the measurement matrix creating part 31, and measurement matrixes acquired from an information center and the like via the communication processing part 205 (see FIGS. 12A and 12B); and a regression coefficient creating part 32 that creates a regression coefficient matrix Wr used to calculate certainty degree vectors Cb in the estimating part 24, based on the measurement matrixes stored in the measurement matrix storage part DB5.

A measurement matrix may be created in the measurement matrix creating part 231 in the following manner.

The measurement matrix is created by analyzing an image in units of frames and macro blocks. As shown in FIG. 29, it comprises: identifiers for identifying an analyzed frame (event number and user identification); explanatory variables for explaining the image (situation during photographing, image characteristics, etc.), and observation variables (objects) representative of information to be acquired from the explanatory variables.

The explanatory variables may be information automatically acquired by performing image processing, or instruction data given by a person who analyzes the image. Of the explanatory variables, the situation during photographing includes at least time zone, weather, and photographing place, while the image characteristics include at least the attribute values of macro blocks automatically acquired by image processing, for example, color information of macro blocks, motion, and a position (two-dimensional coordinates) in the image.

The explanatory variables are described as follows for other than (e.g., time zone and weather) items such as image characteristics that can be numerically represented. That is, strings of bits associated with individual events such as [early morning, morning (M), . . . , night (N), midnight] when time zone is represented, and [fine, cloudy, rain, . . . , rain storm] when weather is represented are provided, and 1 is set when a particular event is true, and 0 is set when false. Since this is equivalent to a normalized representation of the certainty degrees of situation factors between 0 and 1, explanatory variables thus described can be algebraically processed.

The explanatory variables are not limited to the above ones. Descriptions of pattern levels (road structure model, color determination threshold, rough shape and existence position of same color area, positional relationship between same color areas, etc.), descriptions of language levels (scene classification, operation condition classification, etc.), and three-dimensional positions obtained from a distance map may be used (see FIG. 30). Besides factors that will directly influence the calculation of certainty degree vectors, factors that have a close relation with changes in those factors and will indirectly influence the calculation of certainty degree vectors may be used.

On the other hand, the observation variables describe the certainty degree that a macro block indicated in an explanatory variable constitutes an aimed object, for all objects that are subject to recognition in the recognition processing part 220, and instruction data given by persons is used.

In the measurement matrix thus accumulated, when pieces of information having a same explanatory variable exist, these pieces of information are integrated so that explanatory variables do not overlap. In short, the measurement matrix is a result of statistical learning of the relationship between explanatory variables and observation variables (objects).

The regression coefficient creating part 232 calculates a regression coefficient matrix Wr used in the above expression (27) by performing a multivariate analysis on the measurement matrix. Specifically, with an estimated value of the regression coefficient matrix $Wr^T$ as Br, estimation is made using the expression (28).

$$Br=(Sr^TSr)^{-1}Sr^TY \quad (28)$$

An observed value of factor vector sr at time Tk (k=1, 2, . . . , K) is sr (k), and Sr is a matrix represented by the expression (29).

$$Sr=[sr(1), sr(2), \ldots, sr(K)]^T \quad (29)$$

When an observed value at time Tk of a p-th vocabulary (object) is yp (k), an observed value y (k) of an observation variable (certainty degree vector) at time Tk is represented by the expression (30), and a history Yp of certainty degrees for a p-th object (vocabulary) is represented by the expression (31). Y is a matrix represented by the expression (32).

$$y(k)=(y1(k), y2(k), \ldots, yP(k))^T \quad (30)$$

$$Yp=(yp(1), yp(2), \ldots, yp(k))^T \quad (31)$$

$$Y=[Y1, Y2, \ldots, YP] \quad (32)$$

In this way, the regression coefficient creating part 232 supplies a regression coefficient matrix Wr created for each factor vector sr to the estimating part 224. The regression coefficient matrix Wr may be stored in the measurement matrix storage part DB5 together with the measurement matrix.

In the measurement matrix, explanatory variables and observation variables are both handled as column components in the measurement matrix, and there is no mathematical distinction between them. Therefore, observation variables and explanatory variables not observed may be interchanged to create a regression coefficient matrix so that the explanatory variables not observed are estimated based on the regression coefficient matrix. Accordingly, the measurement matrix creating part 231 may be constructed to make up for (estimates) missing portions (explanatory variables not observed) of the measurement matrix by using the above-described method.

The output information creating part 240 comprises: a display creating part 241 that creates display data for performing various displays, based on image data, and color arrangement information, a distance map, and object indexes supplied via the color index memory 214, the distance map memory 226, and the object index memory 227; a language description creating part 242 that creates descriptions of the XML format representative of the characteristics of images in units of frames, based on object indexes and view models selected in the model selecting part 222; and a certainty degree distribution creating part 243 that creates a time distribution and a space distribution of certainty degrees, based on object indexes.

Figure 31:
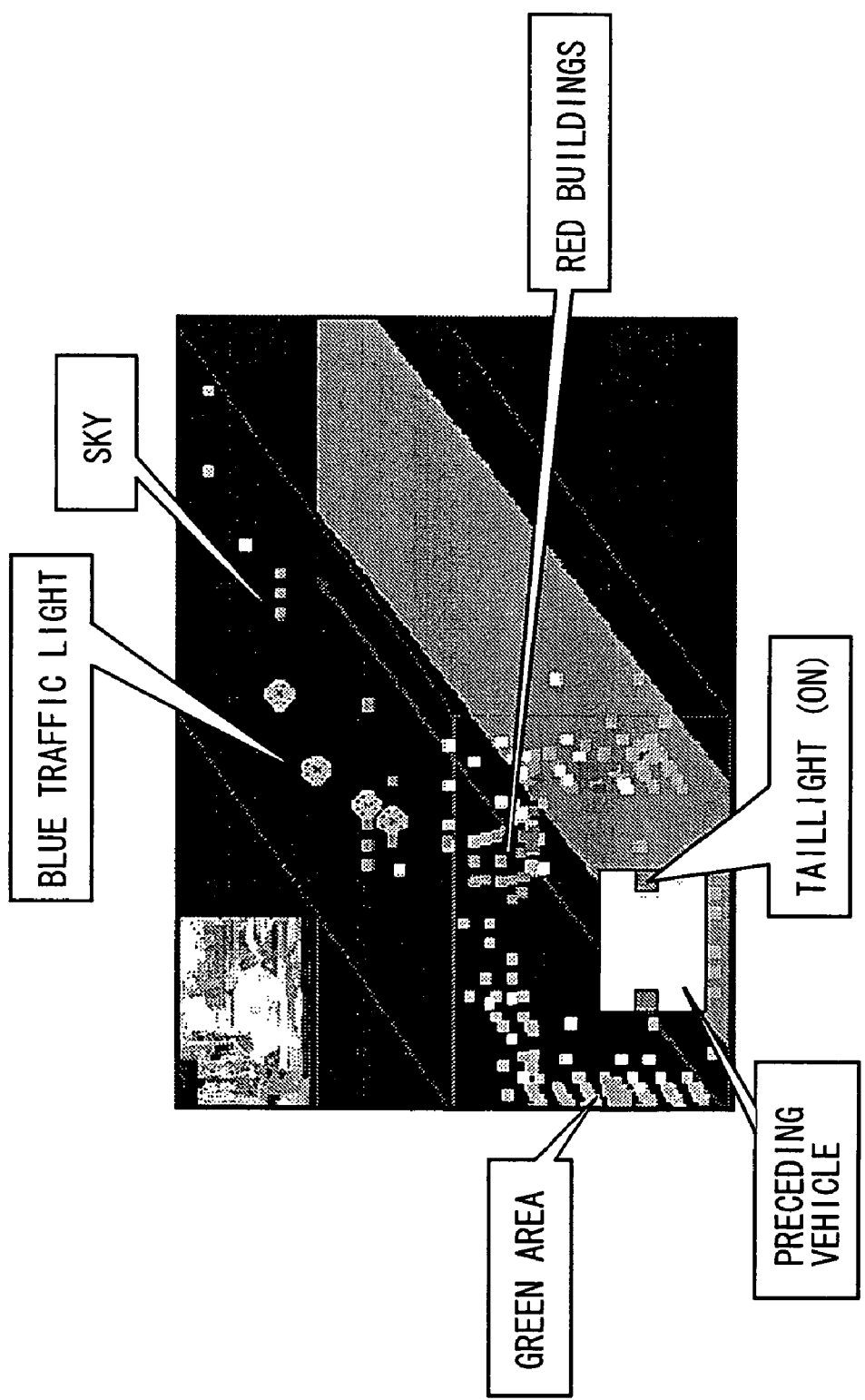
FIG. 31 is an explanatory diagram concerning three-dimensional graphics.

The output information creating part 240 creates highlighting image data for highlighting an object determination result in image data (or real video), and three-dimensional image data for displaying rough positions of objects as a three-dimensional graphics by using information of a distance map, as shown in FIG. 31.

Various highlighting methods are available, such as overlaying semi-transparent masks on recognized objects, displaying the masks in different colors for different objects, and marking only target objects.

The three-dimensional graphics display is also useful for verification of the operation of this system because it can be visually determined by this system around which part in front of the vehicle the objects (or their fragments) existing in macro blocks added with color indexes are estimated to exist.

The language description creating part 242 creates environment description data written in the XML format to indicate in which positions in an image what objects exist. FIG. 32A shows an image subject to description creation, and FIG. 32B shows an example of a description created in the language description creating part 242.

As shown in FIG. 32A, a view pattern is used as a typical template of scene description, and as shown in FIG. 32B, for each of dynamic objects, semi-static objects, and static objects, in which position (which partial area of the view pattern) what objects exist is described.

Without being limited to the above-described descriptions, the language description creating part 242 may be constructed to describe a pattern produced by extracting a combination of common elements by statistically analyzing many scene description examples, or a pattern produced by extracting scenes having a specific attribute (e.g., high danger level) from a given viewpoint (e.g., traffic safety).

Figure 33:
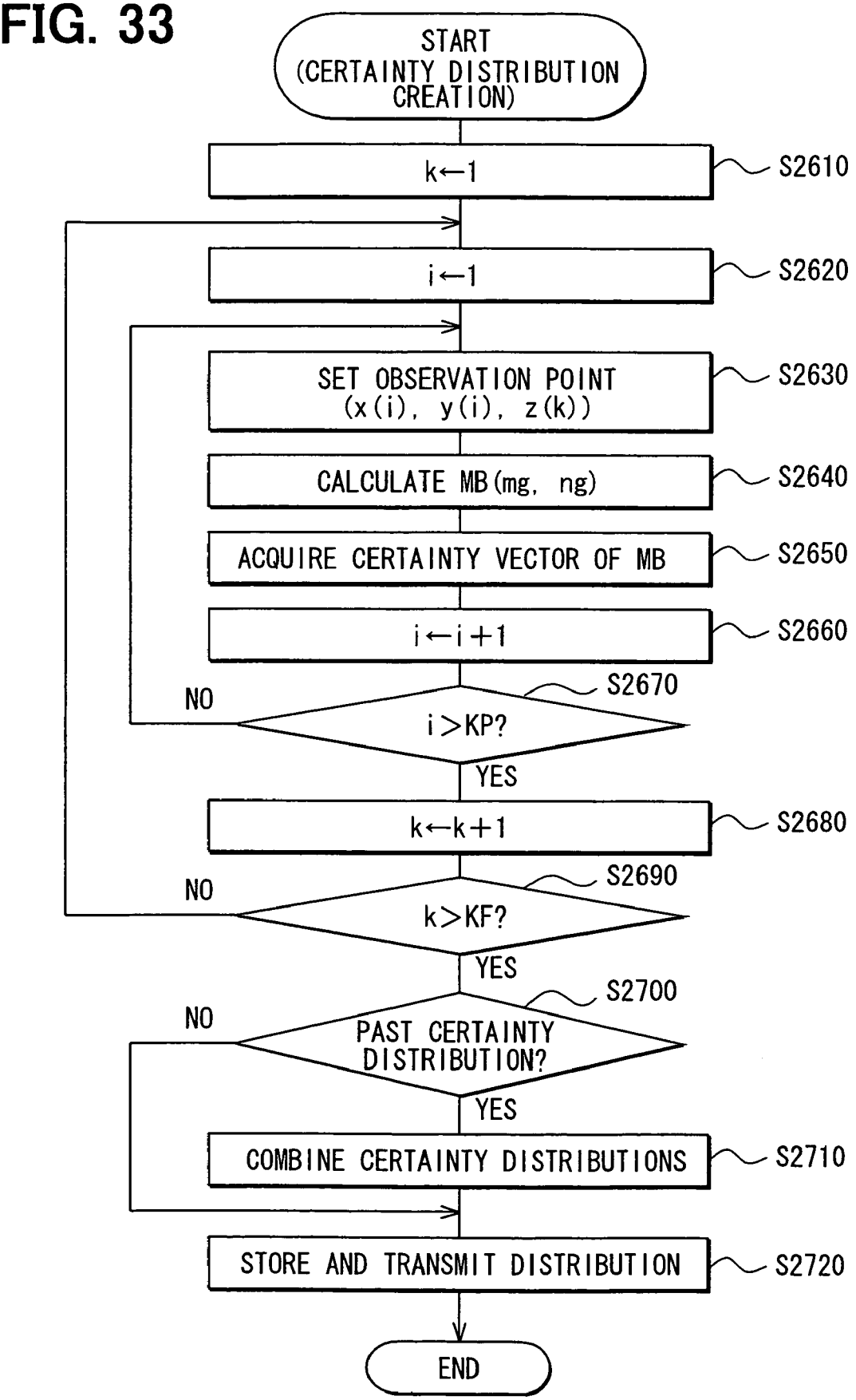
FIG. 33 is a flow chart showing certainty degree space creation processing.

The certainty degree space distribution creation processing is executed by the certainty degree distribution creating part 243 when creating a space distribution of certainty degrees. This processing is described with reference to a flow chart shown in FIG. 33.

In this processing, the certainty degree distribution creating part 243 sets a parameter k indicating an observation count (identifies a frame subject to processing) to one (S2610), and sets a parameter i for identifying an observation point to one (S2620).

Next, it sets an observation point P=(x(i), y(i), z(k)) (S2630), and determines or calculates a macro block MB (mg, ng) corresponding to the set observation point P (S2640). The x(i), y(i), and z(k) are coordinates on a road structure model (see FIG. 19), mg is a horizontal coordinate of the macro block, and ng is a vertical coordinate of it.

It acquires a certainty degree vector c of the macro block MB (mg, ng) in an image frame at time Tk (S2650), increments the parameter i (S2660), then determines whether the parameter i is greater than the number KP of setting points (S2670). When negative determination is made in S2670, since there are other observation points to be observed, it returns to S2630 to repeat the processings of S2630 to S2670. On the other hand, when affirmative determination is made in S2670, since all observation points to be observed for a frame identified by the parameter k have been observed, it increments the parameter k (S2680), then determines whether the parameter k is greater than a set count KF (S2690).

When negative determination is made in S2690, further continue the observation, it returns to S2620 to repeat the processings of S2620 to S2690. On the other hand, when affirmative determination is made in S2690, to terminate the observation, it proceeds to the next step.

As a result, a space distribution of the certainty degrees of objects constituting the certainty degree vector has been obtained in a range of a depth direction determined by z(1) to z(k) with respect to each of KP observation points with horizontal positions and vertical positions fixed.

The certainty degree distribution creating part 243 determines whether a past certainty degree space distribution exists (S2700), on determining that a past certainty degree space distribution exists, combines the past certainty degree space distribution with the certainty degree space distribution acquired in the processings of S2610 to S2690 (S2710), stores the combined certainty degree space distribution (S2720), and terminates this processing. On the other hand, on determining in S2700 that a past certainty degree space distribution does not exist, the certainty degree distribution creating part 243 stores the certainty degree space distribution acquired in the processings of S2610 to S2690 (S2720), and terminates this processing.

Thus, this processing obtains a space distribution of certainty degrees by obtaining a certainty degree vector while moving an observation point P on an x-y plane identified by (x(i), y(i)) in the z-axis direction (depth direction).

Figures 34A, 34B:
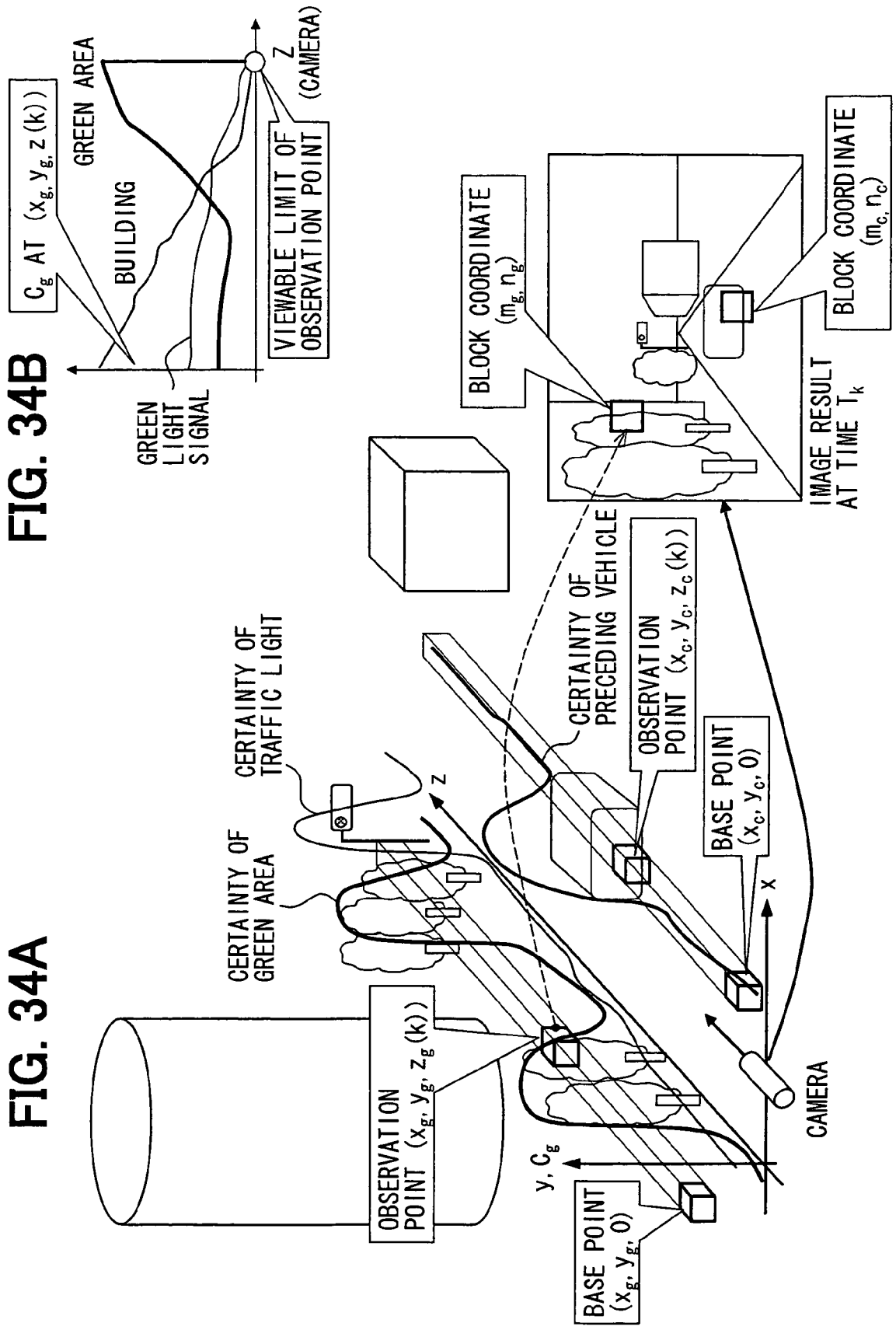
FIGS. 34A and 34B are explanatory diagrams concerning a space distribution of certainty degrees.

FIG. 34A is an explanatory diagram showing a certainty degree space distribution associated with an object space distribution.

For example, when a box-type road structure model is applied to an observation image, and a horizontal position xg corresponding to a wall at the left of a road structure model is fixed as an X coordinate, a space area included in a rectangular parallelepiped (corresponds to the size of the macro block) including a base point (xg, yg, 0) in the drawing will be successively observed partially. An initial position of a camera is in a position in a somewhat minus direction of the z axis because the base (xg, yg, 0) must be at a position within a visual field.

When this processing has been performed with (xg, yg, 0) as a base point, a certainty degree distribution shown in FIG. 34B is obtained.

Figure 35:
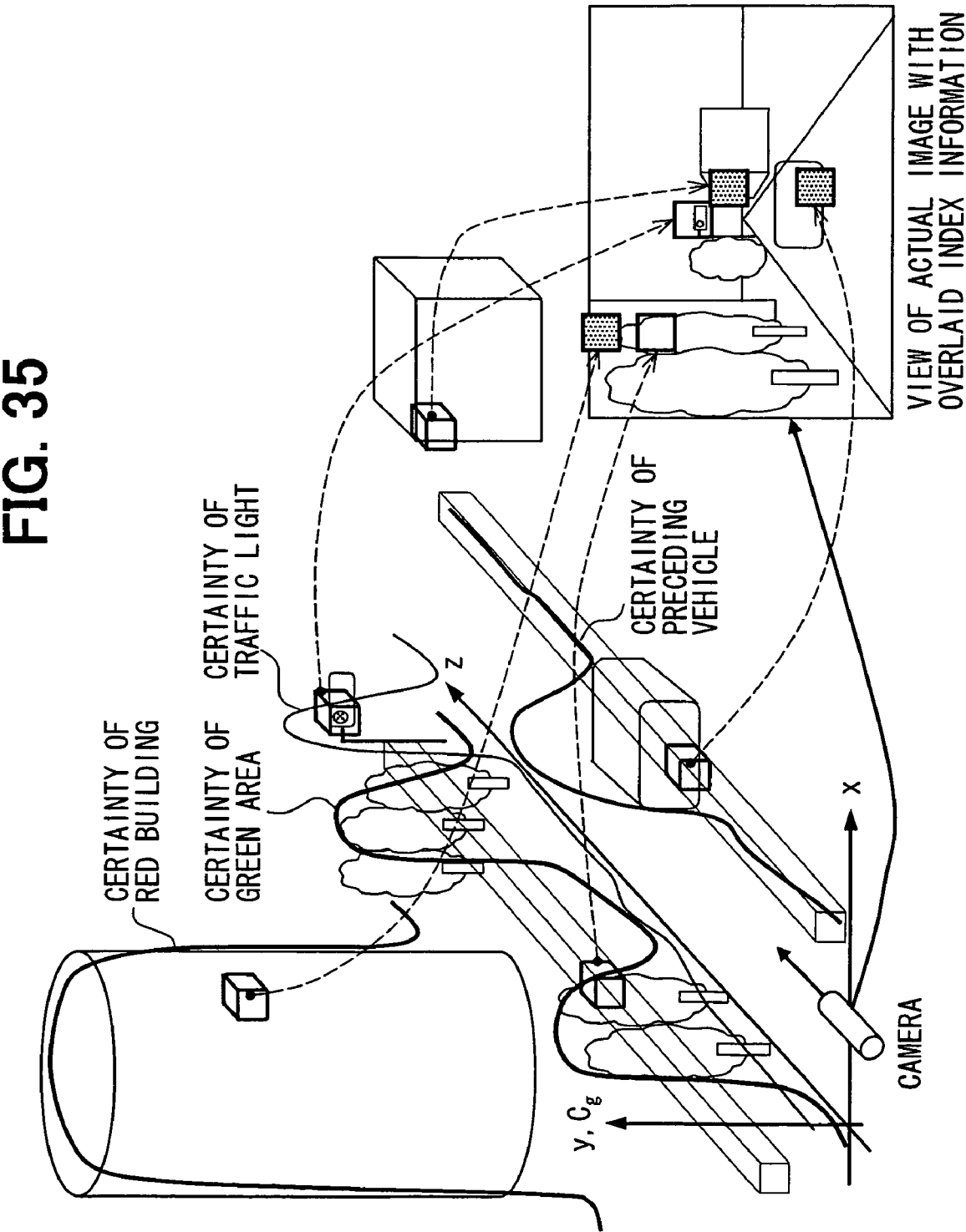
FIG. 35 is an explanatory diagram concerning a space distribution of certainty degrees.

When the certainty degree space distribution thus obtained has a sufficient accuracy, since it is equivalent to three-dimensional arrangement information of objects, as shown in FIG. 35, an object index image can be created which shows to what object what portion corresponds, for video photographed by a camera of any viewpoint in the vicinity of objects. The creation of such an image requires that the positional postures of the camera be identified by GPS-capable absolute coordinates, and like the drawing of three-dimensional graphics, target areas can be displayed using the positional postures by perspective transformation.

Figure 36A:
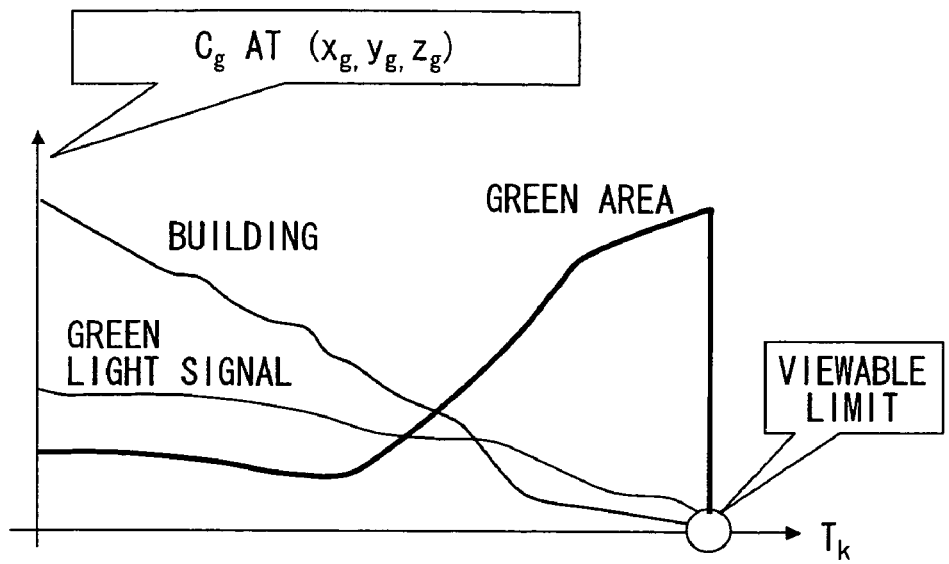
FIGS. 36A and 36B are explanatory diagrams concerning time variance characteristic of certainty degrees.

The above certainty degree space distribution is a distribution obtained by moving observation points. However, with an observation point fixed to an unknown object (one point on the road structure model in the case of a static object), the certainty degree distribution creating part 243 may be constructed to obtain a certainty degree vector while tracking the observation point on the screen by motion compensation or the like. In this case, as shown in FIG. 36A, a track (time change characteristic) of the certainty degree vector at the fixed observation point can be obtained.

Figure 36B:
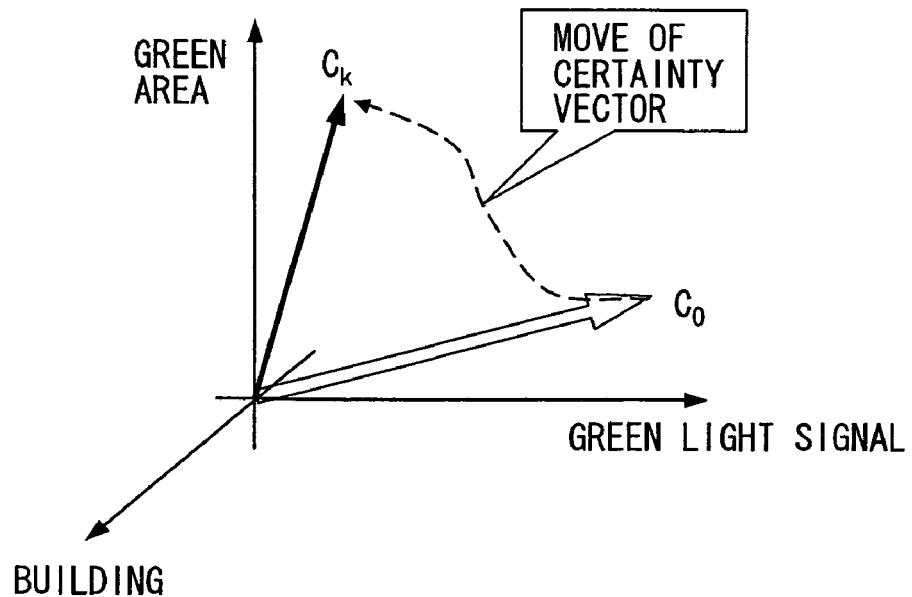

Although a track of the certainty degree vectors thus obtained changes with situations at particular times, unless undefined object are used as observation targets, as shown in FIG. 36B, finally, it converges to an axis direction corresponding to a correct object. Accordingly, such time change characteristics of certainty degree vectors may be included as one of restriction rules used by the estimating part 224.

As described above, recognition result data (environment description data, OBI data, etc.) representative of recognition results in the environment recognition device 204 is stored in the metadata database 206b, and created data produced by adding the recognition result data and other created data (measurement matrix, regression coefficient matrix, certainty degree distribution data, etc.) is provided to the outside of the vehicle via the communication processing part 205. Display data created in the environment recognition device 4 is provided to a display device constituting the man-machine IF part 208, or display devices of other on-board equipment via the communication processing part 205, and displayed in the display devices.

The search processing part 207 checks the content of an inquiry profile inputted from a user via the man-machine IF part 208 against metadata (environment description data, OBI data) stored in the metadata database 206b to search for an image and objects in the image that match the inquiry profile, and displays the search result in the display device of the man-machine IF part 208.

Moreover, when an image matching the inquiry profile does not exist in the vehicle database 206, the search processing part 207 transmits the query to the outside of the vehicle (an information center and other vehicles) via the communication processing part 205. When receiving a query from the outside of the vehicle via the communication processing part 205, it performs response processing for it.

Since environment description data is described by a representation close to a natural language, an inquiry profile used for queries may also be described by a representation close to a natural language such as "yellow building," and "a scene with a yellow triangular road sign.

FIG. 37C shows the result of searching metadata shown in FIG. 37A by using an inquiry profile created in the format of FIG. 37B, and FIG. 37D shows the display of the search result as a three-dimensional graphics.

The profile shown in FIG. 37B can be constructed using words extracted from a natural language such as "caution point," and "green building."

Search targets may be surrounding things such as "red building," "green area," and "stop lights in front of vehicle," surrounding environments such as "congestion in Hakone," "road surface in xxx skiing ground," "congestion status," and "weather of Mt. Fuji," and operation conditions such as "scene of 100 km/h or faster," "right turn scene at intersection," "scene of interchange tollgate," "traveling scene in tunnel," "traveling scene at rain," and "operation condition at sudden stop."

FIG. 12A is a block diagram showing an outline construction of an information center 250 that collects measurement matrixes from the on-board systems 201 of individual vehicles, performs statistical processing, and provides processing results to the on-board system.

Figure 12B:
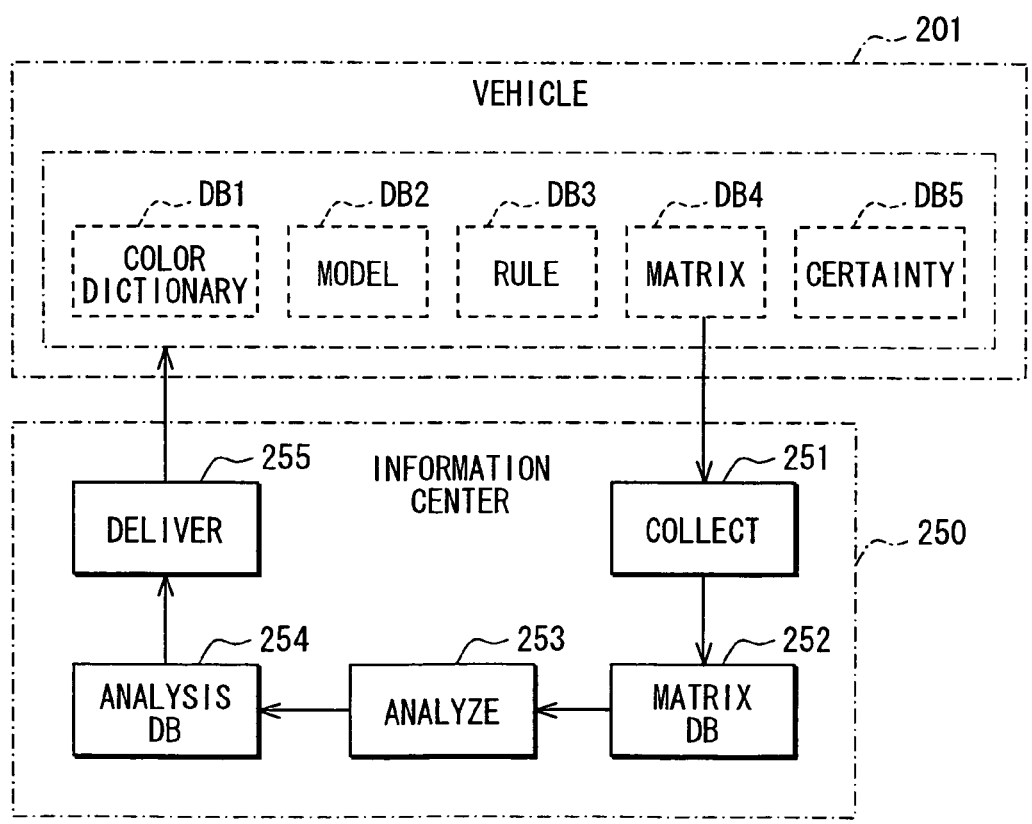
FIG. 12B is a block diagram showing an information center and a relationship between the information center and the on-board system.

As shown in FIG. 12B, the information center 250 comprises: an information collecting part 251 that collects measurement matrixes and other related data from the on-board systems 201 of individual vehicles; a measurement matrix storage part 252 that stores measurement matrixes collected by the information collecting part 251; a statistical analysis processing part 253 that executes various statistical analysis processings, based on measurement matrixes stored in the measurement matrix storage part 252; an analysis result storage part 254 that stores analysis results in the statistical analysis processing part 253; and an information delivering part 255 that delivers analysis results stored in the analysis result storage part 254 to the on-board systems 1 and the like, by delivery in response to requests from the on-board systems 1 or periodical delivery in a broadcasting form.

The measurement matrix storage part 252 stores measurement matrixes (environment information and image characteristics) collected from the on-board systems 201 along with the collection position information as time-series events. Accordingly, the statistical analysis processing part 253 performs the same processing as the regression coefficient creating part 232 and the certainty degree distribution creating part 243 in the environment recognition device 204, that is, the creation of a regression counting matrix and certainty degree distribution data, by using measurement matrixes collected on a larger scale.

On receiving information delivered from the information center 250, the on-board system 201, based on the received information, updates a color dictionary DB1 of the color dictionary storage part, view models and road structure models of the model storage part DB2, restriction rules of the rule storage part DB3, measurement matrixes and regression coefficient matrixes of the measurement matrix storage part DB5, and the initial values of certainty degree vectors of the certainty degree initial value storage part DB4.

Since the information center 250 uses information collected from many on-boards systems 201, more reliable regression coefficient matrixes and certainty degree distribution data can be created than those created by the on-board systems 201 alone.

When the information center 250 has been constructed to accumulate environment description data created in the on-board systems 201, a highly reliable database of road environment information including not only video but also traffic conditions and surrounding environments can be built. In this case, the information center 250 can deliver new knowledges about road environments ("xx intersection has a high danger level," "poor visibility," and "liable to cause traffic congestion"), and real time information ("occurrence of accident," "occurrence of disaster," etc.) to the vehicles and pedestrians who request services.

Use of the delivered information can help to build a traffic system that provides information about vehicles in blind spots at intersections having poor visibility, and various warning systems that tell caution points, disaster and accident locations, and congestion locations, or detect blind spots in green areas that change with seasons.

When the information center 250 is constructed to accumulate certainty degree distribution data created in the on-board system 201, since uniform environment information is prepared in the form of a space distribution of certainty degrees, without using special probe vehicles, the latest data necessary to create a road traffic database can be collected cheaply and in high volume.

As has been described above, in this embodiment, by estimating objects by using a certainty degree vector C, the environment recognition device 204 obtains the certainty degrees of plural object candidates without immediately narrowing down objects being recognition results to one object, and determines a final object by using the certainty degrees as reference information. Yet, the certainty degree vector C is created by integrating a certainty degree vector Ca based on rule base estimation and a certainty degree vector Cb based on statistical estimation, and further modified using various factors.

Accordingly, according to the environment recognition device 204, since estimation can be advanced with plural object candidates held, an object is determined from various references based on plural methods, and various factors are reflected in the determination of the object by corrections, an accurate recognition result can be obtained.

In the environment recognition device 204, since the number of objects (that is, objects subject to the calculation of a certainty degree) constituting a certainty degree vector is limited, the load on estimation processing in the estimating part 24 can be reduced.

Furthermore, in the environment recognition device 204, the statistical data collecting and analyzing part 230 autonomously creates a measurement matrix, and autonomously creates a regression coefficient matrix Wr used for the calculation of a certainty degree vector Cb based on statistical estimation, on the basis of the created measurement matrix. When there is a lack in explanatory variables (factor information) constituting the measurement matrix, it also makes up for the lacking information by estimating it by regression analysis.

Therefore, according to the environment recognition device 204, since not only a regression coefficient matrix Wr matching a present situation can always be used by autonomous creation of the regression coefficient matrix Wr but also a highly reliable regression coefficient matrix Wr is created based on a measurement matrix with lacking portions covered, the accuracy of estimation can be further increased.

In the environment recognition device 204, since a situation during photographing is included in the measurement matrix as an explanatory variable, even when photographing conditions change, the calculation of the certainty degree vector Cb based on statistical estimation, and by extension, the estimation of objects can be performed with high accuracy.

According to the environment recognition device 204, since the screen is split into plural partial areas by using a view pattern, restriction rules about the positions of macro blocks can be easily applied, and rough three-dimensional information of the macro blocks is obtained by creating a distance map by projecting a road structure model into an image, restriction rules about three-dimensional positional relationships among objects can be applied by a simple method.

In the on-board system 201 of this embodiment, the environment recognition device 204 creates environment description data that describes a result of recognizing objects by a representation close to a natural language by the XML format, stores the environment description data in the vehicle database 206 in association with image data, and provides it to the outside of the vehicle (the information center and other vehicles) via the communication processing part 205.

Therefore, according to the on-board system 201, images stored in the vehicle database 206 can be searched using an inquiry profile described by a representation close to a natural language, and situations shown in the images can be transmitted highly efficiently and rapidly.

By using such a on-board system 201, various transportation systems and warning systems can be efficiently built.

In this embodiment, the block average color calculating part 211 corresponds to an image data acquiring unit and an average color calculation unit; the color determining part 212 corresponds to a color information adding unit; the object determining part 225 corresponds to an object determining unit; the estimating part 224 corresponds to a certainty degree calculating unit; S2220 corresponds to a target object selecting unit; S2230 to S2290 correspond to a partial certainty degree calculating unit; S2300 corresponds to a certainty degree integrating unit; and S2250, S2280, and S2330 correspond to a certainty degree correcting unit. Furthermore, the measurement matrix creating part 231 corresponds to a measurement matrix creating unit and a lacking information estimating unit; the regression coefficient creating part 232 corresponds to a regression coefficient calculating unit; the model storage part corresponds to a view pattern storage unit and a model storage unit; the model selecting part 222 corresponds to a view pattern selecting unit; and the distance map creating part 223 corresponds to a distance map creating unit and a distance map modifying unit.

The second embodiment may be modified in various ways.

For example, in the above embodiment, a view pattern is selected taking the presence or absence and the position of a light source into account. However, without taking the existence or absence and the position of a light source into account, a view pattern may be selected by changing the thresholds of color indexes used in the color determining part 212 according to various environmental conditions such as weather.

In the above embodiment, a certainty degree vector Ca based on rule base estimation, and a certainty degree vector Cb based on statistical estimation are created separately, and these are integrated to obtain a single certainty degree vector C(L). However, one of them may be used as an initial value of the other.

Factors (factors described as restriction rules) used to create the certainty degree vector Ca based on rule base estimation, and factors (factors incorporated into a measurement matrix) used to create the certainty degree vector Cb based on statistical estimation are exchangeable with each other, and may be overlapped wholly.

Furthermore, the certainty degree vectors may be modified using factors used to set the initial values of the certainty degree vectors. Conversely, the initial values of the certainty degree vectors may be set using factors used to modify the certainty degree vectors.

A post-integration certainty degree vector C may be modified using factors used to modify pre-integration certainty degree vectors Ca and Cb. Conversely, pre-integration certainty degree vectors Ca and Cb may be modified using factors used to modify a post-integration certainty degree vector C.

In the above embodiment, the environment recognition device 204 is applied to the on-board system 201 to recognize general road environments. However, for example, the environment recognition device 204 may be applied to robots and robotic vehicles that move autonomously while recognizing surrounding things and environment within limited environments such as theme parks. In this case, when a distance map is created, instead of road structure models, scene structure models that match views in the theme parks need to be used.

In such robots and robotic vehicles, the image recognition and description device as described in the above-described embodiment probably support image-based environment understanding. For example, detailed image recognition modules such as sign recognition-board recognition, and person recognition enable relatively robust environment recognition by being positioned as lower modules of the environment recognition device 204.

Although excellent modules have been so far developed to individually recognize the contents of signs and the behavior of persons, it has been the largest cause of incorrect recognition that a portion to be recognized in an image is unknown. However, by adopting the above construction with the environment recognition device 204 applied, adequate guidelines can be given to this problem.

What is claimed is:

1. An environment recognition device comprising:
an on-board camera mounted on a vehicle;
an object specifying unit that specifies a target object to be recognized;
an image data acquiring unit that acquires image data based on a color image in front of the vehicle imaged by the on-board camera;
an average color calculating unit that calculates, based on the image data acquired by the image data acquiring unit, an average color of each of pixel blocks produced by splitting the color image by a preset size;
a color information adding unit that determines to which of color indexes provided in advance the average color calculated in the average color calculating unit belongs, and stores a determination result in association with the pixel block as color information;
a color histogram creating unit that accumulates along one direction on the color image the number of the pixel blocks that aimed color indexes match the color information associated by the color information adding unit, and creates a color histogram formed by one-dimensionally arranging accumulated values, for each of the color indexes and in time series in units of frames of the image data; and
an object information adding unit that creates information about a target object specified by the object specifying unit on the basis of the color histograms created by the color histogram creating unit, and stores the created information as object information in association with the image data acquired by the image data acquiring unit.

2. The environment recognition device according to claim 1,
wherein the direction in which the color histogram creating unit accumulates the number of the pixel blocks is a vertical direction in the color image, and individual elements of the color histogram are associated with positions of a horizontal direction orthogonal to the vertical direction.

3. The environment recognition device according to claim 1,
wherein the color histogram creating unit sets, according to the target object, a range of pixel blocks to be accumulated.

4. The environment recognition device according to claim 1, further comprising:
a color-specific evaluation value calculating unit that, for each of the color histograms created in the color histogram creating unit, uses weight coefficients set to be larger for positions in which the target object exists more probably, of the positions of a horizontal direction to which individual elements of the color histograms correspond, performs weighting additions for elements of the color histograms, and calculates results of accumulating operation results of the weighting additions for a monitoring period set according to the target object as color-specific evaluation values,
wherein the object information adding unit uses the sum of the color-specific evaluation values calculated in the color-specific evaluation value calculating unit as a total evaluation value, and when the total evaluation values is larger than a preset evaluation threshold, determines that the target object exists in the color image, and outputs the determination result as the object information.

5. The environment recognition device according to claim 4,
wherein the color-specific evaluation value calculating unit sets a monitoring period to a value inversely proportional to a vehicle speed of the vehicle when the vehicle speed is equal to or greater than a preset lower limit, and sets the monitoring period to a preset fixed value when the vehicle speed is smaller than the preset lower limit.

6. The environment recognition device according to claim 4,
wherein the color-specific evaluation value calculating unit comprises:
a variable element creating unit that defines an arrangement formed by respectively associating standard distances according to objects with the color indexes as a distance vector, defines an arrangement formed by respectively associating load coefficient vectors formed by associating the load coefficients with individual elements of the color histograms with the color indexes as a load coefficient matrix, and creates the distance vector and the load coefficient matrix that are suitable to the target object specified in the object specifying unit;
a period vector creating unit that defines an arrangement formed by respectively associating the monitoring periods with the color indexes as a period vector, and creates the period vector on the basis of the distance vector created in the variable element creating unit, a frame rate of the color image, and a vehicle speed of the vehicle mounting the device;
a matrix calculation unit that defines an arrangement formed by respectively associating color histograms created in the color histogram creating unit with the color indexes as a color histogram matrix, and calculates an evaluation unit vector that performs a matrix calculation between the histogram matrix and the load coefficient matrix created in the variable element creating unit to calculate an evaluation unit vector formed by arranging the weighting addition values respectively corresponding to the color indexes; and
an accumulation operation unit that creates a color-specific evaluation vector formed by arranging the color-specific evaluation values respectively associated with the color indexes by accumulating individual elements of the evaluation unit vector calculated in the matrix calculation unit according to the contents of the period vector created in the period vector creating unit,
wherein the object information adding unit calculates a total evaluation value of the target object by adding individual elements of the color-specific evaluation vector created in the accumulation operation unit.

7. The environment recognition device according to claim 3, further comprising:
a scene classification dictionary storage unit that stores a scene classification dictionary storing plural scenes representative of a typical view of the color image, the plural scenes being respectively associated with objects likely to exist in the scenes,
wherein the object specifying unit successively reads an object associated with a scene specified from the outside from the scene classification dictionary storage unit, and specifies it as the target object.

8. An environment recognition device comprising:
an on-board camera mounted on a vehicle;
an object specifying unit that specifies a target object to be recognized;
an image data acquiring unit that acquires image data based on a color image in front of the vehicle imaged by the on-board camera;

an average color calculating unit that calculates the average color of each of pixel blocks produced by splitting the color image by a preset size, based on the image data acquired by the image data acquiring unit;

a color information adding unit that determines to which of color indexes provided in advance the average color calculated in the average color calculating unit belongs, and stores the determination result in association with the pixel block as color information;

an object information adding unit that creates, based on the color information respectively associated with the pixel blocks by the color information adding unit, information on the target object specified in the object specifying unit, and stores the created information as object information in association with the image data acquired by the image data acquiring unit;

a template storage unit that stores plural templates representative of a position of a wiper in the color image;

a binarizing unit that creates a binary image added with different values for pixel blocks added with color information corresponding to a black color index by the color information adding unit, and pixel blocks added with other color information;

a wiper detecting unit that detects a wiper in a position other than a stop position when not used, by performing pattern matching between the templates stored in the template storage unit and the binary image created by the binarizing unit; and a frequency calculating unit that calculates the number of times a wiper was detected in the wiper detecting unit for a preset observation period, wherein the object information adding unit outputs information indicating that the wiper is operating, when the frequency calculated in the frequency calculating unit exceeds a preset operation determination threshold, as the object information.

9. The environment recognition device according to claim 8, further comprising:

a cumulative addition unit that, based on the image data captured from the image acquiring unit when a wiper of the vehicle mounting the device is operating, classifies the binary image created in the binarizing unit into groups by macro blocks added with color information corresponding to a black color index, the macro blocks being identified by the addresses of macro blocks on an edge of the binary image, and creates a cumulatively added image formed by cumulatively adding the binary image belonging to same groups for each of the groups in units of the pixel blocks; and a template creating unit that, for the cumulatively added image created in the cumulative addition unit, creates a template formed by adding different values for pixel blocks with a cumulatively added value equal to or greater than a preset existence determination threshold and pixel blocks with a cumulatively added value smaller than the existence determination threshold, as the template, and stores the template in the template storing unit.

10. The environment recognition device according to claim 8, further comprising:

a candidate extracting unit that defines a pixel block added with color information corresponding to a red color index by the color information adding unit as a red pixel block, and extracts the two red pixel blocks placed in a horizontal direction as tail light candidates; and an inter-vehicle distance estimating unit that estimates an inter-vehicle distance by determining which of vehicle width conditions a positional relationship of the tail light candidates extracted in the candidate extracting unit satisfies, the vehicle width conditions being respectively associated with plural stages of inter-vehicle distances, wherein the object information adding unit outputs a vehicle position represented by the positions of the tail light candidates and the inter-vehicle distance estimated in the inter-vehicle distance estimating unit as the object information.

11. The environment recognition device according to claim 10, further comprising:

a lighting determination unit that determines whether the tail light candidates extracted in the candidate extracting unit are in a turned-on condition, based on the luminance of the tail light candidate, wherein the object information adding unit outputs a determination result in the lighting determination unit as the object information.

12. An environment recognition device comprising:

an on-board camera mounted on a vehicle;

an object specifying unit that specifies a target object to be recognized;

an image data acquiring unit that acquires image data based on a color image in front of the vehicle imaged by the on-board camera;

an average color calculating unit that calculates the average color of each of pixel blocks produced by splitting the color image by a preset size, based on the image data acquired by the image data acquiring unit;

a color information adding unit that determines to which of color indexes provided in advance the average color calculated in the average color calculating unit belongs, and stores the determination result in association with the pixel block as color information;

an object information adding unit that creates, based on the color information respectively associated with the pixel blocks by the color information adding unit, information on the target object specified in the object specifying unit, and stores the created information as object information in association with the image data acquired by the image data acquiring unit;

a candidate extracting unit that defines a pixel block added with color information corresponding to a red color index by the color information adding unit as a red pixel block, and extracts the two red pixel blocks placed in a horizontal direction as tail light candidates;

an inter-vehicle distance estimating unit that estimates an inter-vehicle distance by determining which of vehicle width conditions a positional relationship of the tail light candidates extracted in the candidate extracting unit satisfies, the vehicle width conditions being respectively associated with plural stages of inter-vehicle distances;

wherein the object information adding unit outputs a vehicle position represented by the positions of the tail light candidates and the inter-vehicle distance estimated in the inter-vehicle distance estimating unit as the object information;

vehicle color extracting unit that extracts the color of macro blocks that exist in a section between the tail light candidates extracted in the candidate extracting unit or vertically to the section, as the color of a preceding vehicle, wherein the object information adding unit outputs an extraction result in the vehicle color extracting unit as the object information.

13. The environment recognition device according to claim 8, further comprising:

an abnormal condition determining unit that determines an occurrence of an abnormal condition when the object information stored in the object information adding unit and information about the target object supplied from outside of the device do not match.

14. An environment recognition device, comprising:

an on-board camera mounted on a vehicle;

an image data acquiring unit that acquires image data based on a color image in front of the vehicle imaged by the on-board camera;

an average color calculating unit that calculates, based on the image data acquired by the image data acquiring unit, an average color of each of pixel blocks produced by splitting the color image by a preset size;

a color information adding unit that determines to which of color indexes provided in advance the average color calculated in the average color calculating unit belongs, and stores the determination result in association with the pixel block as color information;

a color histogram creating unit that accumulates along one direction on the color image the number of the pixel blocks that aimed color indexes match the color information associated by the color information adding unit, and creates a color histogram formed by one-dimensionally arranging the accumulated values, for each of the color indexes and in time series in units of frames of the image data;

a difference calculating unit that calculates an inter-frame difference of color histograms created in the color histogram creating unit, for each of the color indexes; and a caution calling situation detecting unit that detects, based on a calculation result in the difference calculating unit, a caution calling situation appearing on a color screen.

15. An environment recognition device, comprising:

an on-board camera mounted on a vehicle;

an image data acquiring unit that acquires image data based on a color image in front of a vehicle imaged by an on-board camera;

an average color calculating unit that calculates, based on the image data acquired by the image data acquiring unit, an average color of each of pixel blocks produced by splitting the color image by a preset size;

a color information adding unit that determines to which of color indexes provided in advance the average color calculated in the average color calculating unit belongs, and stores the determination result in association with the pixel block as color information;

a full screen accumulated value creating unit that creates a full screen accumulated value produced by accumulating over the whole of the color image the number of the pixel blocks that aimed color indexes match the color information associated by the color information adding unit, in time series in units of frames of the image data;

a difference calculating unit that calculates an inter-frame difference of the full screen accumulated value created in the full screen accumulated value creating unit; and a caution calling situation detecting unit that detects, based on a calculation result in the difference calculating unit, a caution calling situation appearing on a color screen.

16. The environment recognition device according to claim 15, wherein the full screen accumulated value creating unit creates the full screen accumulated value on a red color index, and the caution calling situation detecting unit detects as the caution calling situation a case where weather data supplied from an outside indicates that it is raining, and the inter-frame difference of the full screen accumulated value calculated in the difference calculating unit is equal to or greater than a preset approach threshold.

17. An environment recognition device comprising:

an on-board camera mounted on a mobile unit;

an image data acquiring unit that acquires image data based on a color image imaged by the camera;

an average color calculating unit that calculates, based on the image data acquired by the image data acquiring unit, an average color of a pixel block for each of pixel blocks produced by splitting the color image by a preset size;

a color information adding unit that determines to which of color indexes provided in advance the average color calculated in the average color calculating unit belongs, and stores a determination result in association with the pixel block as color information;

a certainty degree calculating unit that calculates, with matters and attributes to be extracted from the color image as objects, based on the color information stored in the color information adding unit, a certainty degree that an aimed pixel block constitutes an aimed object, for each of the pixel blocks and for each of the objects; and an object determining unit that determines an object to be associated with the pixel block, based on a calculation result in the certainty degree calculating unit; wherein the certainty degree calculating unit comprises:

plural partial certainty degree calculating units that obtain the certainty degree by using mutually different methods;

a certainty degree integration unit that obtains a certainty degree by integrating calculation results in the plural partial certainty degree calculating units for each of the objects; and wherein at least one of the plural partial certainty degree calculating units obtains the certainty degree by statistical estimation based on statistical analysis;

in the statistical estimation, a measurement matrix is formed by arranging the certainty degrees and factor information that influence the calculation of the certainty degrees in association with each other, and the certainty degree is calculated based on regression coefficients obtained by subjecting a measurement matrix to regression analysis, and extracted information which is an actual measurement value of the factor information extracted from the image data acquired by the image data acquiring unit.

18. The environment recognition device according to claim 17, wherein the certainty degree calculating unit includes a target object selecting unit that selects, based on the color information, the objects subject to the calculation of the certainty degree.

19. The environment recognition device according to claim 17, wherein at least one of the plural partial certainty degree calculating units obtains the certainty degree by rule base estimation based on preset restriction rules.

20. The environment recognition device according to claim 17, further comprising:

a measurement matrix creating unit that creates the measurement matrix based on information obtained from the image data acquired by the image data acquiring unit, and instruction data inputted from an outside; and a regression coefficient calculating unit that determines a regression coefficient from the measurement matrix created by the measurement matrix creating unit.

21. The environment recognition device according to claim 20, further comprising:
a lacking information estimating unit that, when information is lacking in the factor information constituting the measurement matrix created by the measurement matrix creating unit, estimates lacking information by regression analysis.

22. The environment recognition device according to claim 17,
wherein the factor information includes information representative of physical characteristics of pixel blocks constituting the image.

23. The environment recognition device according to claim 17,
wherein the factor information includes information representative of a situation during image photographing.

24. The environment recognition device according to claim 17,
wherein the certainty degree calculating unit includes a certainty degree correcting unit that corrects a certainty degree obtained in either of the partial certainty degree calculating unit and the certainty degree integrating unit, using rule base estimation based on preset restriction rules.

25. The environment recognition device according to claim 24,
wherein the certainty degree correcting unit at least uses the preset restriction rules for estimating whether an object shown in the pixel block is a moving matter or a standing matter, based on a motion vector obtained from the image data.

26. The environment recognition device according to claim 24,
wherein the certainty degree correcting unit determines a past pixel block corresponding to a present pixel block, based on the motion vector obtained from the image data, and at least uses the restriction rules about information on the determined past pixel block.

27. The environment recognition device according to claim 24,
wherein the certainty degree correcting unit at least uses the restriction rules about characteristics of a same color area formed by pixel blocks that have same color information and are adjacent to each other.

28. The environment recognition device according to claim 17, further comprising:
a view pattern storage unit that stores view patterns representative of typical, static environments, by splitting a screen of the color image by partial areas having same characteristics; and
a view pattern selecting unit that selects a view pattern matching the image data acquired by the image data acquiring unit,
wherein the certainty degree calculating unit uses characteristics of the partial region to which the pixel block belongs, for the calculation of the certainty degree.

29. An environment recognition device comprising:
an on-board camera mounted on a mobile unit;
an image data acquiring unit that acquires image data based on a color image imaged by the camera;
an average color calculating unit that calculates, based on the image data acquired by the image data acquiring unit, an average color of a pixel block for each of pixel blocks produced by splitting the color image by a preset size;
a color information adding unit that determines to which of color indexes provided in advance the average color calculated in the average color calculating unit belongs, and stores a determination result in association with the pixel block as color information;
a certainty degree calculating unit that calculates, with matters and attributes to be extracted from the color image as objects, based on the color information stored in the color information adding unit, a certainty degree that an aimed pixel block constitutes an aimed object, for each of the pixel blocks and for each of the objects;
an object determining unit that determines an object to be associated with the pixel block, based on a calculation result in the certainty degree calculating unit;
a view pattern storage unit that stores view patterns representative of typical, static environments, by splitting a screen of the color image by partial areas having same characteristics; and
a view pattern selecting unit that selects a view pattern matching the image data acquired by the image data acquiring unit,
wherein the certainty degree calculating unit uses characteristics of the partial region to which the pixel block belongs, for the calculation of the certainty degree;
a model storage unit that stores road structure models representative of typical patterns of a three-dimensional structure in a vicinity of roads shown in the color image in association with the view patterns; and
a distance map creating unit that creates a distance map showing three-dimensional positions of individual pixel blocks by projecting a road structure model corresponding to a view pattern selected in the view pattern selecting unit into the screen comprised of the pixel blocks,
wherein the certainty degree calculating unit uses information of the three-dimensional positions of the pixel blocks determined from the distance map, for the calculation of the certainty degree.

30. The environment recognition device according to claim 29, further comprising:
a distance map modifying unit that, for each of partial areas constituting the view pattern selected in the view pattern selecting unit, defines a range of color information belonging to the partial area, uses the definition as a determination condition, and when color information of the pixel block does not satisfy the determination condition set for a partial area in which the pixel block is located, determines the pixel block as being different from a background area and modifies the distance map.

31. The environment recognition device according to claim 24,
wherein the object determining unit determines an object having a largest certainty degree calculated in the certainty degree calculating unit as an object to be associated with the pixel block.

32. The environment recognition device according to claim 31,
wherein the object determining unit excludes objects which obviously cannot exist in the color image from determination candidates, based on information about objects obtained from the outside.

* * * * *